US007096222B2

(12) United States Patent
Kern et al.

(10) Patent No.: US 7,096,222 B2
(45) Date of Patent: Aug. 22, 2006

(54) METHODS AND SYSTEMS FOR AUTO-INSTANTIATION OF STORAGE HIERARCHY FOR PROJECT PLAN

(75) Inventors: Jonathan Kern, Quakertown, PA (US); Mikhail Okrugin, St. Petersburg (RU)

(73) Assignee: Borland Software Corporation, Cupertino, CA (US)

( * ) Notice: Subject to any disclaimer, the term of this patent is extended or adjusted under 35 U.S.C. 154(b) by 400 days.

(21) Appl. No.: 10/165,530

(22) Filed: Jun. 7, 2002

(65) Prior Publication Data

US 2002/0184250 A1 Dec. 5, 2002

Related U.S. Application Data

(63) Continuation-in-part of application No. 09/944,697, filed on Aug. 31, 2001, now Pat. No. 6,968,343.

(60) Provisional application No. 60/367,430, filed on Mar. 25, 2002, provisional application No. 60/296,707, filed on Jun. 7, 2001, provisional application No. 60/230,054, filed on Sep. 1, 2000.

(51) Int. Cl.
*G06F 17/30* (2006.01)

(52) U.S. Cl. ........................... 707/100; 707/1; 707/10; 707/104.1; 717/104

(58) Field of Classification Search .............. 707/1–10, 707/100–104.1, 200–206; 717/100, 103, 717/104, 110; 705/8; 706/16, 59; 715/530
See application file for complete search history.

(56) References Cited

U.S. PATENT DOCUMENTS 5,551,028 A 8/1996 Voll et al. .................. 395/600
5,764,902 A 6/1998 Rothrock .................... 395/200
6,006,193 A * 12/1999 Gibson et al. ................. 705/8
6,011,917 A * 1/2000 Leymann et al. ........... 717/104
6,014,673 A * 1/2000 Davis et al. ................ 707/202
6,028,997 A * 2/2000 Leymann et al. ........... 717/104
6,065,009 A * 5/2000 Leymann et al. ............. 707/10
6,067,548 A * 5/2000 Cheng .................... 707/103 R
6,182,080 B1 1/2001 Clements .................... 707/102
6,308,188 B1 * 10/2001 Bernardo et al. ........... 715/530
6,308,224 B1 * 10/2001 Leymann et al. ........... 719/310
6,892,376 B1 * 5/2005 McDonald et al. ......... 717/103
2002/0035593 A1 3/2002 Salim et al. ................ 709/202
2004/0078373 A1 * 4/2004 Ghoneiny et al. ............ 707/10

OTHER PUBLICATIONS

Gruhn et al., Workflow management based on process model repositories, Apr. 19, 1998, IEEE, 379-388.*
Schuster et al., A Configuration Management Approach for Large Workflow Management Systems, 1999, ACM, 177-186.*
Ailamaki et al., Scientific workflow management by database management, Jan. 7, 1998, IEEE, 1-10.*

* cited by examiner

*Primary Examiner*—Shahid Alam
*Assistant Examiner*—Jean Bolte Fleurantin
(74) *Attorney, Agent, or Firm*—MacCord Mason PLLC

(57) ABSTRACT

Methods and systems consistent with the present invention allow a user to create a storage hierarchy definition in association with a workflow that models a process, to generate a plan from the workflow that reflects an instance of the process, and to generate a container in accordance with the storage hierarchy definition when the plan is generated from the workflow. The container may then be used to store an artifact that is used or produced by the plan in accordance with methods and systems of the present invention.

32 Claims, 53 Drawing Sheets

```
<?xml version="1.0" encoding="UTF-8" ?>
- <process group="" name="Logic Branch Project">
    <description />
    <role name="Assembler" />
  - <activity id="10" name="Get Parts" responsiblerole="Assembler">
      <description />
      <defduration units="units" value="1" />
      <predecessors_id id="11" />
      <successors_id id="1522" />
      <out_aritfacts id="1527" />
    </activity>
  - <activity id="1523" name="Left" responsiblerole="Assembler">
      <description />
      <defduration units="units" value="1" />
      <predecessors_id id="1522" />
      <successors_id id="1524" />
      <out_aritfacts id="1529" />
    </activity>
  - <activity id="1524" name="Left Special" responsiblerole="Assembler">
      <description />
      <defduration units="units" value="1" />
      <predecessors_id id="1523" />
      <successors_id id="1526" />
      <out_aritfacts id="1531" />
    </activity>
  - <activity id="1525" name="Right" responsiblerole="Assembler">
      <description />
      <defduration units="units" value="1" />
      <predecessors_id id="1522" />
      <successors_id id="1526" />
      <out_aritfacts id="1533" />
    </activity>
  - <activity id="1526" name="Complete Assembly" responsiblerole="Assembler">
      <description />
      <defduration units="units" value="1" />
    - <onEntry>
        - <![CDATA[
        sendMail(getOwnerEmail(), "Debugging period started",
        "All the SCR files should be placed into the '%SCR_FOLDER%' folder");
      ]]>
      </onEntry>
    - <onExit>
      - <![CDATA[
      sendMail(getOwnerEmail(), "Debugging finished. No more SCRs found", "");
      ]]>
      </onExit>
      <predecessors_id id="1524" />
      <predecessors_id id="1525" />
      <successors_id id="12" />
      <out_aritfacts id="1535" />
    </activity>
```

FIG. 33B

```
                        3392         3393
  - <artifact id="1527" identity="linkable1" name="Document is INITIAL">
      <description>The condition becomes true when the %Document% artifact gets the
          INITIAL state. To make this condition valid you should define the %Document%
          parameter and optionally define the document template and the application to
3394      open the document.</description>
      <type>linkable</type>
      <link link="%Document%" />
      <state>INITIAL</state>
      <event id="1528" />                    3395
    </artifact>
  - <artifact id="1529" identity="linkable1" name="Document is LEFT">
      <description>The condition becomes true when the %Document% artifact gets the
          LEFT state. To make this condition valid you should define the %Document%
          parameter and optionally define the document template and the application to
          open the document.</description>
      <type>linkable</type>
      <link link="%Document%" />
      <state>LEFT</state>
      <event id="1530" />
    </artifact>
  - <artifact id="1531" identity="linkable1" name="Document is LEFT SPECIAL">
      <description>The condition becomes true when the %Document% artifact gets the
          LEFT SPECIAL state. To make this condition valid you should define the
          %Document% parameter and optionally define the document template and the
          application to open the document.</description>
      <type>linkable</type>
      <link link="%Document%" />
      <state>LEFT SPECIAL</state>
      <event id="1532" />
    </artifact>         3397         3398
  - <artifact id="1533" identity="linkable1" name="Document is RIGHT">
      <description>The condition becomes true when the %Document% artifact gets the
          RIGHT state. To make this condition valid you should define the %Document%
          parameter and optionally define the document template and the application to
          open the document.</description>
      <type>linkable</type>
      <link link="%Document%" />
      <state>RIGHT</state>
      <event id="1534" />                    3399
    </artifact>
  - <artifact id="1535" identity="linkable1" name="Document is APPROVED">
      <description>The condition becomes true when the %Document% artifact gets the
          APPROVED state. To make this condition valid you should define the
          %Document% parameter and optionally define the document template and the
          application to open the document.</description>
      <type>linkable</type>
      <link link="%Document%" />
      <state>APPROVED</state>
      <event id="1536" />
    </artifact>
```

FIG. 33C

```
                       3366                                                     3340
- <logic id="1522" name="L or Rt Handed?" responsiblerole="Assembler">
     <description />        3324                              3338
   - <script>
     - <![CDATA[
      approved()
       ]]>
     </script>
3308 <predecessors_id id="10" />——— 3368
     <other_path_id id="1525" />——— 3370
     <other_path_id id="1523" />——— 3374
     <defpath_id id="1525" />——— 3378
   </logic>
- <syncbar id="11">——— 3362
     <description />
3318 <startBar>T</startBar>
     <successors_id id="10" />
   </syncbar>
- <syncbar id="12">
     <description />
3320 <endBar>T</endBar>
     <predecessors_id id="1526" />
   </syncbar>
- <event id="1528" name="??Event_name">
     <description>??Event_desc</description>
     <type>REQUEST-GUARD</type>
     <request>PROPPATCH</request>
   </event>
- <event id="1530" name="??Event_name">
     <description>??Event_desc</description>
     <type>REQUEST-GUARD</type>
     <request>PROPPATCH</request>
   </event>
- <event id="1532" name="??Event_name">
     <description>??Event_desc</description>
     <type>REQUEST-GUARD</type>
     <request>PROPPATCH</request>
   </event>
- <event id="1534" name="??Event_name">
     <description>??Event_desc</description>
     <type>REQUEST-GUARD</type>
     <request>PROPPATCH</request>
   </event>
- <event id="1536" name="??Event_name">
     <description>??Event_desc</description>
     <type>REQUEST-GUARD</type>
     <request>PROPPATCH</request>
   </event>
</process>
```

```
<?xml version="1.0" encoding="UTF-8" ?>
- <process group="" name="Serial & Parallel">
    <description />
    <role name="Worker" />
4702 - <activity id="10" name="Serial 1" responsiblerole="Worker">
        <description />
        <defduration units="hours" value="9" />   4704
        <predecessors_id id="11" />
        <successors_id id="1522" />
    </activity>
4706 - <activity id="1523" name="Parallel 1" responsiblerole="Worker">
        <description />
        <defduration units="hours" value="24" />   4710
        <predecessors_id id="1522" />
        <successors_id id="1525" />
    </activity>
4708 - <activity id="1524" name="Parallel 2" responsiblerole="Worker">
        <description />
        <defduration units="hours" value="24" />   4712
        <predecessors_id id="1522" />
        <successors_id id="1525" />
    </activity>
4714 - <activity id="1526" name="Serial 2" responsiblerole="Worker">
        <description />
        <defduration units="hours" value="24" />   4716
        <predecessors_id id="1525" />
        <successors_id id="12" />
    </activity>
  - <syncbar id="11">
        <description />
        <startBar>T</startBar>
        <successors_id id="10" />
    </syncbar>
  - <syncbar id="12">
        <description />
        <endBar>T</endBar>
        <predecessors_id id="1526" />
    </syncbar>
  - <syncbar id="1522" name="SyncBarH1">
        <description />
        <predecessors_id id="10" />
        <successors_id id="1523" />
        <successors_id id="1524" />
    </syncbar>
  - <syncbar id="1525" name="SyncBarH2">
        <description />
        <predecessors_id id="1523" />
        <predecessors_id id="1524" />
        <successors_id id="1526" />
    </syncbar>
</process>
```

```
<?xml version="1.0" encoding="UTF-8" ?>
- <A:plan name="Serial_And_Parallel" userid="JK" xmlns:A="workflow">
  - <A:description>
    - <![CDATA[
    No Description
      ]]>
    </A:description>
  - <A:task activityID="10" caption="Serial 1"
      link="Sample_Project_Plans/Serial_And_Parallel/Task_2.xml" name="Task_2"
      owner="Worker"
      processURL="http://localhost:8080/webdav/ProcessGroup2/Process1.xml"
      type="general" userid="JK">
     <A:start>2001 8 1 9</A:start>          4804
4802 <A:finish>2001 8 1 18</A:finish>       4806
     <A:supertask name="Task_1" />
     <A:user>JK</A:user>
     <A:successor name="Task_3" />
     <A:successor name="Task_4" />
    </A:task>
  - <A:task activityID="1523" caption="Parallel 1"
      link="Sample_Project_Plans/Serial_And_Parallel/Task_3.xml" name="Task_3"
      owner="Worker"
      processURL="http://localhost:8080/webdav/ProcessGroup2/Process1.xml"
      type="general" userid="JK">
     <A:start>2001 8 1 18</A:start>         4812
4808 <A:finish>2001 8 2 18</A:finish>       4816
     <A:supertask name="Task_1" />
     <A:user>JK</A:user>
     <A:predecessor name="Task_2" />
     <A:successor name="Task_5" />
    </A:task>
  - <A:task activityID="1524" caption="Parallel 2"
      link="Sample_Project_Plans/Serial_And_Parallel/Task_4.xml" name="Task_4"
      owner="Worker"
      processURL="http://localhost:8080/webdav/ProcessGroup2/Process1.xml"
      type="general" userid="JK">
     <A:start>2001 8 1 18</A:start>         4814
4810 <A:finish>2001 8 2 18</A:finish>       4818
     <A:supertask name="Task_1" />
     <A:user>JK</A:user>
     <A:predecessor name="Task_2" />
     <A:successor name="Task_5" />
    </A:task>
  - <A:task activityID="1526" caption="Serial 2"
      link="Sample_Project_Plans/Serial_And_Parallel/Task_5.xml" name="Task_5"
      owner="Worker"
      processURL="http://localhost:8080/webdav/ProcessGroup2/Process1.xml"
      type="general" userid="JK">
     <A:start>2001 8 2 18</A:start>         4822
4820 <A:finish>2001 8 3 18</A:finish>       4824
     <A:supertask name="Task_1" />
     <A:user>JK</A:user>
     <A:predecessor name="Task_3" />
     <A:predecessor name="Task_4" />
    </A:task>
  - <A:task activityID="NONE" caption="Serial And Parallel"
      link="Sample_Project_Plans/Serial_And_Parallel/Task_1.xml" name="Task_1"
      processURL="http://localhost:8080/webdav/ProcessGroup2/Process1.xml"
      type="general" userid="JK">
     <A:start>2001 8 1 8</A:start>
     <A:finish>2001 8 3 18</A:finish>
     <A:user>JK</A:user>
     <A:subtask name="Task_2" />
```

```
  <?xml version="1.0" encoding="UTF-8" ?>
- <users>
  - <user>                                                      5610
       <id>PH</id>
       <name>Pointy Hair</name>
5602   <email>ph@company.com</email>                                        5612
       <password>ZGV364==</password>
           url= "Software_Projects/Hello-World_App/Users_1.xml"
    </user>
  - <user>
       <id>MQ</id>
       <name>Mister Quality</name>
5604   <email>mq@company.com</email>
       <password>ZGV636==</password>
           url= "Software_Projects/Hello-World_App/Users_1.xml"
    </user>
  - <user>
       <id>MB</id>
       <name>Mister Build</name>
5606   <email>mb@company.com</email>
       <password>ZGV835==</password>
           url= "Software_Projects/Hello-World_App/Users_1.xml"
    </user>
  - <user>
       <id>MT</id>
       <name>Mister Tee</name>
5608   <email>mt@company.com</email>
       <password>ZGV470==</password>
           url= "Software_Projects/Hello-World_App/Users_1.xml"
    </user>
  </users>
```

```
<?xml version="1.0" encoding="UTF-8" ?>
- <A:plan name="Serial_And_Parallel" userid="JK" xmlns:A="workflow">
  - <A:description>
    - <![CDATA[
    No Description
      ]]>
    </A:description>
  - <A:task activityID="10" caption="Serial 1"
        link="Sample_Project_Plans/Serial_And_Parallel/Task_2.xml" name="Task_2"
        owner="Worker"
        processURL="http://localhost:8080/webdav/ProcessGroup2/Process1.xml"
        type="general" userid="JK">
      <A:start>2001 8 1 8</A:start>
      <A:finish>2001 8 1 18</A:finish>
      <A:supertask name="Task_1" />
      <A:user>JK</A:user>
      <A:successor name="Task_3" />
      <A:successor name="Task_4" />
    </A:task>
  - <A:task activityID="1523" caption="Parallel 1"
        link="Sample_Project_Plans/Serial_And_Parallel/Task_3.xml" name="Task_3"
        owner="Worker"
        processURL="http://localhost:8080/webdav/ProcessGroup2/Process1.xml"
        type="general" userid="JK">
      <A:start>2001 8 1 18</A:start>
      <A:finish>2001 8 2 18</A:finish>
      <A:supertask name="Task_1" />
      <A:user>JK</A:user>
      <A:predecessor name="Task_2" />
      <A:successor name="Task_5" />
    </A:task>
  - <A:task activityID="1524" caption="Parallel 2"
        link="Sample_Project_Plans/Serial_And_Parallel/Task_4.xml" name="Task_4"
        owner="Worker"
        processURL="http://localhost:8080/webdav/ProcessGroup2/Process1.xml"
        type="general" userid="JK">
      <A:start>2001 8 1 18</A:start>
      <A:finish>2001 8 2 18</A:finish>
      <A:supertask name="Task_1" />
      <A:user>JK</A:user>
      <A:predecessor name="Task_2" />
      <A:successor name="Task_5" />
    </A:task>
  - <A:task activityID="1526" caption="Serial 2"
        link="Sample_Project_Plans/Serial_And_Parallel/Task_5.xml" name="Task_5"
        owner="Worker"
        processURL="http://localhost:8080/webdav/ProcessGroup2/Process1.xml"
        type="general" userid="JK">
      <A:start>2001 8 2 18</A:start>
      <A:finish>2001 8 3 18</A:finish>
      <A:supertask name="Task_1" />
      <A:user>JK</A:user>
      <A:predecessor name="Task_3" />
      <A:predecessor name="Task_4" />
    </A:task>
  - <A:task activityID="NONE" caption="Serial And Parallel"
        link="Sample_Project_Plans/Serial_And_Parallel/Task_1.xml" name="Task_1"
        processURL="http://localhost:8080/webdav/ProcessGroup2/Process1.xml"
        type="general" userid="JK">
      <A:start>2001 8 1 8</A:start>
      <A:finish>2001 8 3 18</A:finish>
      <A:user>JK</A:user>
      <A:subtask name="Task_2" />
```

FIG. 60

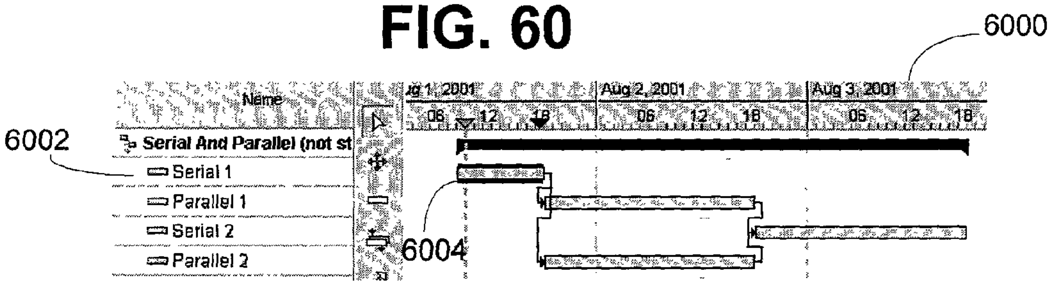

```
<?xml version="1.0" encoding="UTF-8" ?>
- <A:FilePropertyMap xmlns:A="adrenalin:">
    <A:factstart xmlns:A="workflow">2001 8 1 9</A:factstart>
    <A:factfinish xmlns:A="workflow">2001 8 1 14</A:factfinish>
    <A:ProjectTask xmlns:A="Serial 1" />
  </A:FilePropertyMap>
```

FIG. 62

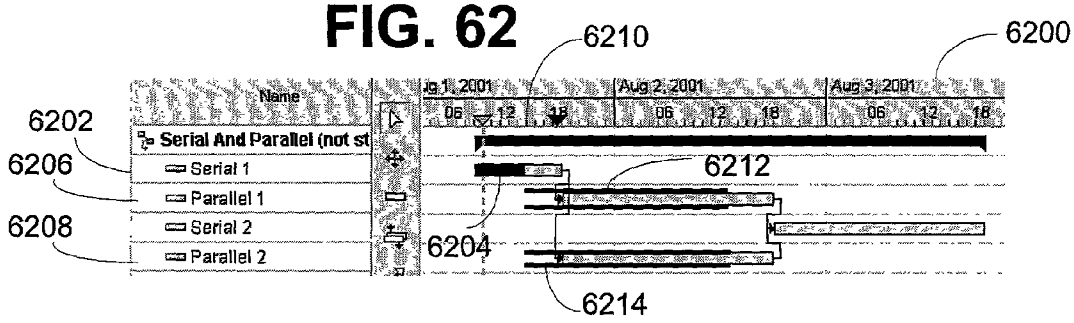

```
<?xml version="1.0" encoding="UTF-8" ?>
- <A:FilePropertyMap xmlns:A="adrenalin:">
    <A:factstart xmlns:A="workflow">2001 8 1 14</A:factstart>
    <A:factfinish xmlns:A="workflow">2001 8 2 0</A:factfinish>
    <A:ProjectTask xmlns:A="Parallel 1" />
    <A:ProjectTask xmlns:A="Parallel 2" />
  </A:FilePropertyMap>
```

FIG. 64

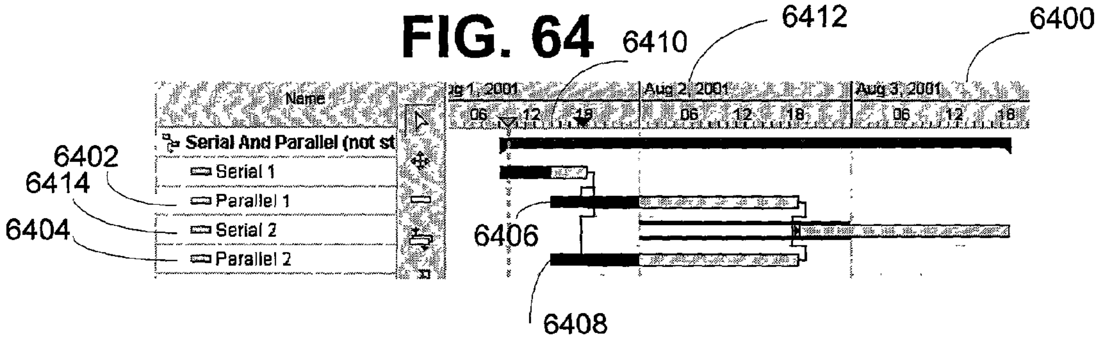

6500

```
<?xml version="1.0" encoding="UTF-8" ?>
- <A:FilePropertyMap xmlns:A="adrenalin:">
      <A:factstart xmlns:A="workflow">2001 8 2 0</A:factstart>
      <A:factfinish xmlns:A="workflow">2001 8 2 12</A:factfinish>
      <A:ProjectTask xmlns:A="Serial 2" />
  </A:FilePropertyMap>
```

```
- <process group="" name="SampleForStorageHierachy" processType="Normal">
    <description>This is a sample process developed to support patent documentation.</description>
  - <artifactHolder>
    - <Artifact id="0" name="Specification">
        <description>Record user requirements</description>
        <LinkReference link="/specifications/spec.doc" />
        <Template link="ArtifactTypsGroup3/ArtifactType1.xml" />
      </Artifact>
   </artifactHolder>
    <role name="developer" />
    <role name="architect" />
    <role name="teamleader" />
    <role name="author" />
    <role name="translator" />
    <role name="spec writer" />
  - <activity id="10" name="Task A" responsiblerole="teamleader">
      <description>Do the "A" thing.</description>
      <defduration units="days" value="1" />
      <predecessors_id id="11" />
      <successors_id id="12" />
      <out_artifacts id="0" />
      <reqd_artifacts id="0" />
   </activity>
  - <syncbar id="11">
      <description />
      <startBar>true</startBar>
      <successors_id id="10" />
   </syncbar>
  - <syncbar id="12">
      <description />
      <endBar>true</endBar>
      <predecessors_id id="10" />
   </syncbar>
  </storagehierarchy>
  storargehierarchydefURL="http://localhost:8080/webdav/ProcessGroup2/process1~xml"
  </storagehierarchy>
</process>
```

```
- <A:FilePropertyMap xmlns:A="adrenalin:">
  - <A:commands xmlns:A="commands">
      <command>| /| | source| createFolder</command>
      <command>| /source| | problem_domain| createFolder</command>
      <command>| /source| | user_interface| createFolder</command>
      <command>| /source| | data_management| createFolder</command>
      <command>| /source| | system_integration| createFolder</command>
      <command>| /| | documentation| createFolder</command>
      <command>| /documentation| | user_guides| createFolder</command>
      <command>| /documentation| | help| createFolder</command>
      <command>| /| | specifications| createFolder</command>
      <command>| /source| | developer| addRole</command>
      <command>| /documentation| | author| addRole</command>
      <command>| /specifications| | spec writer| addRole</command>
      <command>| /documentation| | translator| addRole</command>
      <command>| /source| | architect| addRole</command>
      <command>| /source| | team leader| addRole</command>
    </A:commands>
    <A:Type xmlns:A="workflow">Process</A:Type>
    <A:displayname xmlns:A="VFS">SampleForStorageHierachy</A:displayname>
```

METHODS AND SYSTEMS FOR AUTO-INSTANTIATION OF STORAGE HIERARCHY FOR PROJECT PLAN

CROSS-REFERENCE TO RELATED APPLICATIONS

This application claims the benefit of the filing date of U.S. Provisional Application No. 60/296,707, entitled "Development Tool For Modeling Workflow," filed on Jun. 7, 2001, and U.S. Provisional Application No. 60/367,430, entitled "Development Tool For Modeling Workflow," filed on Mar. 25, 2002; and is a continuation-in-part of U.S. patent application Ser. No. 09/944,697, entitled "Methods And Systems For Integrating Process Modeling And Project Planning," filed on Aug. 31, 2001, now U.S. Pat. No. 6,968,343, which claims the benefit of the filing date of U.S. Provisional Application No. 60/230,054, entitled "Development Tool For Modeling Workflow," filed on Sep. 1, 2000, and U.S. Provisional Application No. 60/296,707, entitled "Development Tool For Modeling Workflow," filed on Jun. 7, 2001; all of which are incorporated herein by reference.

The following identified U.S. patent applications are also relied upon and are incorporated by reference in this application:

U.S. patent application Ser. No. 09/945,081, entitled "Methods and Systems for Improving a Workflow Based on Data Mined from Plans Created from the Workflow," filed on Aug. 31, 2001;

U.S. patent application Ser. No. 09/944,696, entitled "Methods and Systems for Animating a Workflow and a Project Plan," filed on Aug. 31, 2001;

U.S. patent application Ser. No. 09/944,847, entitled "Methods and Systems for Optimizing Resource Allocation Based on Data Mined from Plans Created from a Workflow," filed on Aug. 31, 2001; and U.S. patent application Ser. No. 10/165,405, entitled "Methods And Systems For Linking Tasks To A Workflow," and filed on the same date herewith.

FIELD OF THE INVENTION

The present invention relates to a method and system for integrating a business process or workflow with a project plan. More particularly, the invention relates to a method and system for creating and activating a project plan based on a workflow, for managing the execution of the activated project plan, and for tracking the progress of the activated project plan.

BACKGROUND OF THE INVENTION

To become more efficient and competitive, businesses and industries have striven to capture and streamline the business processes or workflows they use to operate and manage their respective enterprises. In general, a workflow is a model of a process. More specifically, a workflow can be viewed as a structured set of activities designed to produce a specific output for a particular customer (internal or external to an enterprise) or market. Although conventional software tools define the steps performed by the workflow, conventional tools do not schedule the resources (e.g., the people, equipment, or software technologies) responsible for completing each activity. Conventional tools also do not prepare a timeline identifying the beginning or end of each activity. Thus, conventional tools do not prepare a schedule for completing the workflow.

Businesses and industries also use other conventional software tools, such as Microsoft Project™, to build and manage a project plan for their respective enterprises. A plan represents an instance of the workflow. More specifically, a plan can be viewed as a working schedule for a project to produce a product or artifact, such as a computer, bicycle, or software build, for the respective enterprise. These other conventional software tools typically display the working schedule in the form of an interactive Gantt chart, i.e., a chart to which the user can make updates. A Gantt chart is the linear, time-based representation of a project schedule, usually laid out on a horizontal plane where the times/dates increase to the right. These Gantt charts show the temporal relationships between the different tasks in a project, where the tasks are arranged along the vertical axis. Gantt charts are typically used to lay out an initial plan/timeline for the project, and then to track the actual progress of a project from start to finish. The modern software-based Gantt chart also identifies the resource(s) responsible for completing each task of the plan, the dependencies between the tasks, and, once the project has begun, the status of each task.

The conventional tools that support the building and managing of a project plan, however, do not provide direct links between projects and the workflows or business processes that the enterprise has defined and seeks to implement to gain business advantage and economies of efficiencies. Likewise, the conventional tools that enterprises use to define and manage workflows are not linked to project plans. Because both workflows and project plans do not exist on the same tool, workflows and project plans cannot be integrated or synchronized to keep the workflows and project plans "in step" with each other. Thus, there is a need in the art for a tool that avoids the limitations of these conventional software tools.

SUMMARY OF THE INVENTION

Methods and systems consistent with the present invention provide a workflow modeling and project planning integration tool that overcomes the limitations of conventional tools. Contrary to conventional tools that do not allow a user to integrate a business process or workflow with a project plan, the integration tool, in accordance with methods and systems consistent with the present invention, allows a user to model a business process or workflow, to create and activate or start a project plan based on the workflow, to manage the execution of the activated plan, and to track the progress of the activated project plan. In addition, the tool may include a Web-based "Distributed Authoring and Versioning" server that operates as a virtual file system to allow more than one user to view the same workflow or project plan, to provide persistent storage, to monitor the progress of an activated project plan, to simultaneously create plans from the same workflow, and to have essentially unlimited access to the power of the tool through the ubiquity of the Internet. "Versioning" is a term well-known in the art for capturing the state of an entity at given points in time.

Method and systems consistent with the present invention also allow a user to increase the performance efficiency of the enterprise by enforcing an enterprise strategy or vision for storing artifacts (e.g., records, documents, or files) of a plan upon all enterprise affiliates that are involved in creating or using the artifacts during the execution of the plan. In particular, the user is allowed to define a storage hierarchy in association with a workflow that models a process, to generate a plan from the workflow that reflects an instance of the process, and to automatically generate container(s) in accordance with the storage hierarchy definition when the plan is generated from the workflow. As a result, users may move easily from participating in one project plan created from a workflow to a different plan created from the same workflow and still have a sense of familiarity with the organization of the artifacts of the different plan.

In accordance with methods consistent with the present invention, a method is provided in a data processing system. The data processing system has a workflow that models a process. The method comprises the steps of defining a storage hierarchy in association with the workflow, generating a plan from the workflow that reflects an instance of the process, and automatically generating a container in accordance with the storage hierarchy definition when the plan is generated from the workflow.

In accordance with methods consistent with the present invention, a method is provided in a data processing system. The data processing system has a workflow that models a process. The method comprises the step of defining a storage hierarchy in association with the workflow wherein the storage hierarchy definition includes a container identification and a role associated with the container identification. The method also includes the steps of receiving a user prompt to generate a plan from the workflow, generating a container having the container identification and the role in accordance with the storage hierarchy definition in response to the user prompt to generate the plan from the workflow, and managing access to the container based on the role.

In accordance with articles of manufacture consistent with the present invention, a computer-readable medium is provided. The computer-readable medium contains instructions for controlling a data processing system to perform a method. The data processing system has a workflow that models a process. The method comprises the steps of defining a storage hierarchy in association with the workflow, generating a plan from the workflow that reflects an instance of the process, and automatically generating a container in accordance with the storage hierarchy definition when the plan is generated from the workflow.

In accordance with articles of manufacture consistent with the present invention, a computer-readable medium is provided. The computer-readable medium contains instructions for controlling a data processing system to perform a method. The data processing system has a workflow. The method comprises the steps of defining a storage hierarchy in association with the workflow wherein the storage hierarchy definition includes a container identification and a role associated with the container identification, receiving a user prompt to generate a plan from the workflow, generating a container having the container identification and the role in accordance with the storage hierarchy definition in response to the user prompt to generate the plan from the workflow, and managing access to the container based on the role.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIGS. 33A–C depict an exemplary workflow definition file produced by the tool of FIG. 2 for the workflow depicted in FIG. 6;

FIG. 47 depicts an exemplary workflow definition file produced by the tool of FIG. 2 for the workflow of FIG. 5;

FIG. 48 depicts an exemplary plan definition file created from the workflow definition file of FIG. 47;

FIG. 56 depicts an exemplary resource file created by the tool of FIG. 2;

FIG. 59 depicts an exemplary plan definition file created from the workflow of FIG. 5;

FIGS. 60, 62, 64 and 66 depict the actual timeline showing the execution of the plan depicted in FIG. 58;

FIGS. 61, 63, and 65 depict the properties of the executing tasks of FIGS. 62, 64, and 66;

FIG. 69 depicts an exemplary workflow definition file produced by the tool of FIG. 2 when the workflow of FIG. 68 is created;

FIG. 75 depicts an exemplary storage hierarchy definition file produced by the tool of FIG. 2 in association with the workflow of FIG. 68;

DETAILED DESCRIPTION OF THE INVENTION

Methods and systems consistent with the present invention provide an integrated workflow modeling and project planning integration tool that improves the efficiency and reduces the operating cost of an enterprise or business conglomerate. Contrary to conventional tools that do not allow a user to integrate a workflow and a project plan, the integration tool allows a user to model a business process or workflow, to create and activate a project plan based on the workflow, and to track the progress of the activated project plan. The tool also allows the workflow to be reused to create more than one project plan based on the workflow. The tool simultaneously manages the execution of the plans. Moreover, the integration tool may include a virtual file system server, such as a Web-based "Distributed Authoring and Versioning" (WebDAV) server that operates as a virtual file system for computers on a network. With the WebDAV server, more than one user on different computer systems may view the same workflow or project plan, monitor the progress of an activated project plan, or simultaneously create and activate different plans from the same workflow.

System Overview

While methods and systems consistent with the present invention may apply to any enterprise in any industry, they will be further described below with reference to the software industry to provide clarity, consistency, and to demonstrate the invention as applied to one of the more difficult process industries. More particular, methods and systems consistent with the present invention will be described with reference to a software development business process that is applicable to the software industry.

Figure 1:
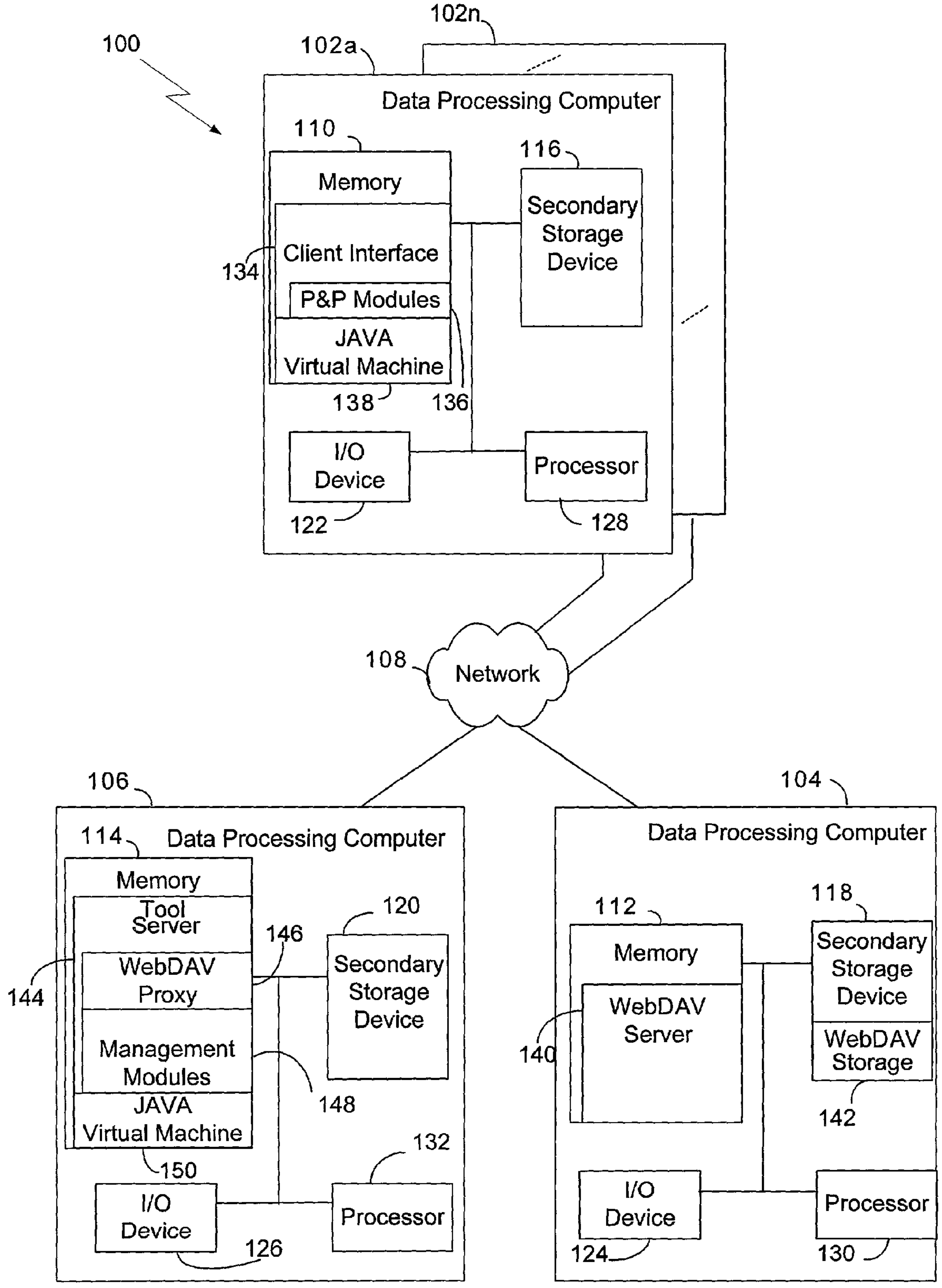
FIG. 1 depicts a data processing system suitable for practicing methods and systems consistent with the present invention.

FIG. 1 depicts a data processing system 100 suitable for practicing methods and systems consistent with the present invention. Data processing system 100 includes a group of computers 102*a*, 104, and 106 that are connected via a network 108. Network 108 may be any known physical or wireless network capable of supporting a data transmission between two computer systems, such as a Local Area Network (LAN), a Wide Area Network (WAN), the Internet, or leased phone lines.

As further explained herein, computer 102*a* may actually be one of multiple computers (i.e., computers 102*a* and

102*n*) used by affiliates of an enterprise or business conglomerate to communicate with one another via network 108. The enterprise affiliates may be employees, managers, administrators, suppliers, customers, other computer applications, other computer systems, or other users within the enterprise who may need to create, view, or receive information regarding an activated project plan in accordance with methods and systems consistent with the present invention.

Each computer 102*a*, 104, and 106 includes a memory (110, 112, and 114, respectively), a secondary storage device (116, 118, and 120, respectively), an I/O device (122, 124, and 126, respectively), and a processor (128, 130, and 132, respectively). Memory 110 in computer 102*a* includes a Client Interface 134 to a Web-based "Distributed Authoring and Versioning" (WebDAV) server 140 in memory 112. Client Interface 134 has Process and Plan modules 136 that collectively allow an enterprise affiliate to create a reusable workflow and to create and activate a project plan based on the reusable workflow.

Memory 110 in computer 102*a* also includes a target processor interpreter, such as a Java™ Virtual Machine 138. To permit the Client Interface 134 to run on most any computer, the Client Interface 134 may be developed using the Java™ Programming Language. Thus, Client Interface 134 may include Java™ bytecodes. The Java™ Virtual Machine 138 interprets the Java™ bytecodes of the Client Interface 134 so that the Client Interface 134 may execute on computer 102*a*.

The WebDAV server 140 in memory 112 of computer 104 operates as a virtual file system for computers 102*a*, 102*n*, and 106 on the network 108. To operate as a virtual file system, WebDAV Server 140 communicates on the network 108 using the WebDAV protocol, and stores files on WebDAV storage 142. In one implementation, WebDAV storage 142 may be a known database, such as Oracle, DB2, MS Structured Query Language (SQL) storage, or any Java Database Connectivity (JDBC)-compliant database. In this implementation, WebDAV Server 140 includes a database management system (DBMS) or a JDBC interface to control access to the WebDAV storage 142.

In accordance with methods and systems consistent with the present invention, two separate enterprise affiliates using their respective Client Interfaces 134 on their respective computers 102*a* and 102*n* may independently request and view the same workflow or plan stored on WebDAV Storage 142. In addition, the Client Interface 134 allows any enterprise affiliate to create, delete, move, and copy workflows, project plans, and associated roles/resource lists on WebDAV server 140. Furthermore, properties of a process, a plan, or a task of a plan may be added, located, or changed on WebDAV Storage 142 by Client Interface 134 using known methods of the WebDAV protocol.

The WebDAV protocol is a set of known extensions to the standard HyperText Transfer protocol (HTTP) that allows enterprise affiliates using client computers 102*a* and 102*n* to collaboratively store, edit, and manage files remotely on a Web Server, such as WebDAV Server 140 using network 108. As known to one skilled in the art, HTTP defines how messages sent to or from a Web server on the Internet are formatted and transmitted. HTTP also defines what actions a Web server or Web browser of a computer on the Internet should take in response to various commands submitted as part of an HTTP message.

The WebDAV protocol defines a WebDAV resource to be a collection (e.g., a directory or folder on WebDAV Storage 142) or a collection member (e.g., a file or Web page on WebDAV Storage 142). Each WebDAV resource has a content file and properties associated with the content file. The properties include the creation date, the author, and the access rights for the WebDAV resource. The WebDAV protocol specifies the methods to create, delete, move, and copy a WebDAV resource. It also specifies the methods to add, find, or change a property of a WebDAV resource. The WebDAV protocol and the HTTP extensions that comprise the WebDAV protocol are more clearly described in the following reference, which is incorporated herein by reference: HTTP Extensions For Distributed Authoring—WebDAV, RFC 2518, Standards Track, Proposed Standard, February 1999, available at http://andrew2.andrew.cmu.edu/rfc/rfc2518.html.

Memory 114 in computer 106 includes a Tool Server 144. The Tool Server 144 includes a WebDAV proxy 146 and Management Modules 148. WebDAV proxy 146 mediates communication between the Client Interface 134 and the WebDAV server 140. The messages or requests directed to the WebDAV server 140 from the Client Interface 134 are initially sent to the WebDAV proxy 146, as discussed in detail below. The WebDAV proxy 146 passes these messages and requests to the Management Modules 148. Each of the Management Modules 148 is configured to inform the WebDAV proxy 146 when a message or request has been serviced. If none of the Management Modules 148 services the message or request, then the WebDAV proxy 146 sends the message or request to the WebDAV Server 140 via the network 108. If, on the other hand, the Management Modules 148 are able to service the message or request, the message or request is not sent to the WebDAV Server 140. The types of messages or requests serviced by the Management Modules 148 include activating a project plan, notifying various enterprise affiliates assigned to each task of the plan, and managing the execution of the plan to the enterprise affiliates.

In another implementation, memory 114 in computer 106 includes a WebDAV servlet (not shown), which is an application designed to perform as a WebDAV Engine in lieu of WebDAV Server 140. The WebDAV servlet may be started by and executed within the Tool Server 144. In this implementation, WebDAV servlet is persistent. Thus, once WebDAV servlet is started, it stays in memory and can fulfill multiple requests. WebDAV servlet is configured to control access to WebDAV Storage 142, which may be included in secondary storage 120 in computer 106.

Memory 114 in computer 106 also includes a target processor interpreter, such as a Java™ Virtual Machine 150. As with the Client Interface 134 on computer 102*a*, the Tool Server 144 includes Java™ bytecodes that the Java Virtual Machine 150 interprets so that the Tool Server 144 may execute on computer 106.

In another implementation, the data processing system 100 may operate in a local host configuration rather than across the network 108. In this implementation, the memory 110 of computer 102*a* may include the Tool Server 144 and the WebDAV Server 140. In addition, the secondary storage device 116 may include the WebDAV Storage 142.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as Internet; or other forms of RAM or ROM.

Figure 2:
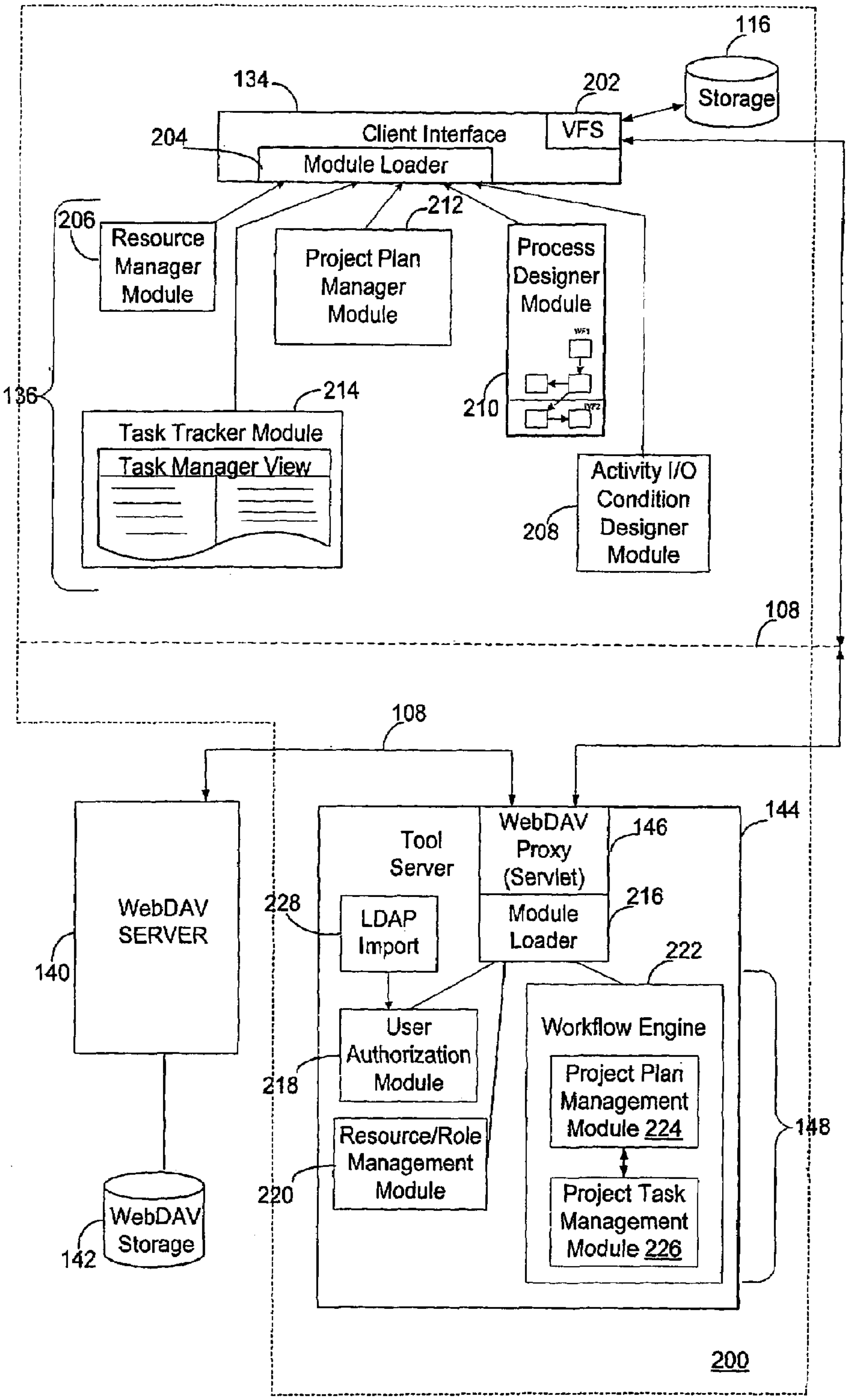
FIG. 2 depicts an architectural overview of the workflow modeling and project planning integration tool used to perform methods and systems consistent with the present invention.

FIG. 2 depicts a functional architectural overview of the workflow modeling and project planning integration tool 200 used to integrate workflow modeling and project planning. As shown in FIG. 2, the tool 200 includes the Client Interface 134 as well as the Tool Server 144. Although part of the same tool 200, the Client Interface 134 and the Tool Server 144 may be located on different computer systems, as discussed above.

The Client Interface 134 includes a Virtual File System ("VFS") Interface 202 that is configured to allow the Client Interface 134 to connect to the secondary storage device 116 for local file access or to connect to the WebDAV Storage 142 via the WebDAV proxy 146 for virtual file access. To allow the WebDAV proxy 146 to mediate communication between the Client Interface 134 and the WebDAV Storage 142, the VFS Interface 202 is configured to send the virtual file access requests from the Client Interface 134 to a Uniform Resource Locator (URL) or network address for the WebDAV proxy 146. For example, the URL for the WebDAV proxy 146 may be "http://www.ToolServer.com/WebDAVproxy." A URL typically consists of an access protocol (e.g., http), a domain name (e.g., www.ToolServer.com), and, optionally, the path to a file or resource residing on that server (e.g., WebDAVproxy). If the Tool Server 144, where the WebDAV proxy 146 is located, has an IP address of 192.168.5.1 and an assigned port address of 8088, then the URL for the WebDAV proxy translates to "http://192.168.5.1:8088/WebDAVproxy."

As discussed above, the VFS Interface 202 initially sends the requests that the Client Interface 134 directs to the WebDAV Storage 142 to the WebDAV proxy 146. The WebDAV proxy 146 sends these requests to the Management Modules 148. After the Management Modules 148 review these requests, the WebDAV proxy 146 sends the request to the WebDAV server 140 if the Management Modules 148 do not respond to the requests from the Client Interface 134. If the request is to be sent to the WebDAV server 140, the Tool Server 144 directs the request to a URL or network address for the WebDAV server 140.

The Client Interface 134 also includes a module loader 204 to load the Process and Plan modules 136. As one skilled in the art will appreciate, Client Interface 134 may be developed so that the functionality provided by Process and Plan modules 136 is not loaded by a known module loader 204, but integrally incorporated within the element corresponding to the Client Interface 134. The Process and Plan modules 136 produce the requests to store or modify the various client files on the WebDAV storage 142. As further described below, the various types of client files include a condition model, a user profile, a resource profile, a workflow definition file, and a plan definition file. Each of these files has properties defined in accordance with the WebDAV protocol. The various types of client files follow a schema or document type definition that is known to the Tool Server 144 so that the Tool Server 144 can identify the type of client file sent by the Client Interface 134 and intercepted by the WebDAV Proxy 146. In addition, each type of client file has a unique identifier, such as a URL network address, which the Tool Server 144 may use to locate the associated client file for processing. The various types of client files are discussed in context with the general description of the Process and Plan modules 136 and also further discussed with the implementation details of creating a workflow and a project plan from the workflow. Although XML files are used to represent the client files used with methods and systems consistent with the present invention, one skilled in the art will recognize that any file type can be used to represent the client files.

The Process and Plan Modules 136 include a Resource Manager Module 206, an Activity I/O Condition Designer Module 208, a Process Designer Module 210, a Project Plan Manager Module 212, and a Task Tracker Module 214. The Resource Manager Module 206 allows an enterprise affiliate with system administrative privileges or permissions, such as a project manager, to create, modify, and store a user profile for an enterprise affiliate. The user profile identifies the access control rights that are associated with the enterprise affiliate, such as whether the enterprise affiliate may create or edit or delete a project plan based on a workflow or whether the enterprise affiliate is limited to viewing an existing workflow or plan. When the Client Interface 134 sends a request to the WebDAV Server 140 to store the user profile, the Client Interface 134 may specify that the user profile be stored with a unique identifier so that the Tool Server 144 may later locate the user profile for further processing. For example, the Client Interface 134 may request that the unique identifier be a location or URL where the user profile is to be stored on the WebDAV Storage 142. If the unique identifier is stored as a property of the user profile on the WebDAV storage 142, the Client Interface 134 sends a request to the WebDAV Server 140 to set the value of the property.

The Resource Manager Module 206 also allows an enterprise affiliate to create, modify, and store the role profiles that may be assigned to an activity of a workflow that is modeled using the tool 200. The role profile identifies a group of resources that may be assigned to complete a task created from the activity. The role profile is a type of client file that the Client Interface 134 may store on WebDAV storage 142 with a unique identifier (e.g., a URL for the role profile) to locate the role profile at a later time. A role profile may include a Rolename that represents a "capability" or "skill set" for the role. For example, using methods and systems consistent with the present invention, an enterprise affiliate may identify one of the following Rolenames to the Resource Manager Module 206 so that the associated role profiles are later available to assign when defining a software development process: Manager, Analyst, Software Architect, Software Developer, Tester, Hardware Architect, and Editor.

In addition to the above, the Resource Manager Module 206 further allows an enterprise affiliate to create, modify, and store the resource profiles (e.g., the person, equipment, or systems, such as a development facility) that may be assigned to a task of a plan created from a workflow. The resource profile includes a resource ID and a unique identifier for the role profile so that the Client Interface 134 may communicate to the Tool Server 144 that the identified resource has skills or capabilities corresponding to the role profile. For example, when the resource is a person, the Tool Server 144 may recognize that the person can play a given role (e.g., Analyst) in a specific activity (e.g., Requirements Analysis) in a workflow (e.g., Software Development Process) based on the skills or capabilities required by the role assigned to the activity to be performed.

The Activity I/O Condition Designer Module 208 allows an enterprise affiliate, such as a manager, to define a condition model, i.e., an input condition or an output condition, for an activity of a workflow. The Activity I/O Condition Designer Module 208 stores the condition model with a unique identifier so that the Tool Server 144 may later locate the condition model for processing, such as when a task of a plan is created from the activity of the workflow, as explained below.

As discussed above, there are two types of workflows: a document workflow and a task workflow. Similarly, there are two types of conditions: a document-type condition and a logic-type condition. The Activity I/O Condition Designer Module 208 allows the enterprise affiliate to create a condition model based on one of these two condition types. The Activity I/O Condition Designer Module 208 also allows the enterprise affiliate to assign a document-type condition model or a logic-type condition model to an activity when creating the activity in a workflow. Each document-type and logic-type condition model has properties defined by the enterprise affiliate that created the respective condition model using the Activity I/O Condition Designer Module 208.

The properties of the document-type condition model include a location property (e.g., a URL) identifying the location of the document or artifact being monitored. Thus, when executing a task based on an activity, the Client Interface 134 uses the location property to notify the resource responsible for the task where to find the document or artifact so that the resource may complete its task.

Another property of the document-type condition model is a state property that indicates the allowable states of the document or artifact. For example, the document may have the states "DRAFT" and "APPROVED." When creating the workflow, the enterprise affiliate assigns one of these allowable states as a condition for entry into or exit from the activity (or the task created from the activity). When the task is activated, the Workflow Engine 222 evaluates whether the state property of the document condition satisfies the input or output condition of the activated task before starting or closing the task.

When creating a logic-type condition model, Activity I/O Condition Designer Module 208 allows the enterprise affiliate to define the properties shown in Table 1.

TABLE 1

| Property | Description |
|---|---|
| Name | The name used to identify the condition. |
| Description | A description of the condition. |
| When to Check | This section identifies when and/or how often the condition should be checked. |
| Abs. Time | The condition is checked when this absolute time (calendar time) arrives. |
| Period | Integer expression in Javascript that defines the periodicity of condition check, where a "1" means once a minute. (If absolute time is also specified, then the condition should be checked when the absolute time arrives and periodically thereafter.) |
| URL Change | The condition is checked after URL undergoes a property or content change. |
| Task Change | The condition is checked when the task that is specified during plan creation changes its state (e.g., starts, finishes). |
| Any Request | The condition is checked when any HTTP request is detected. |
| Script | The script to run when the condition is met. The script must return "true" or "false" (a Boolean). Script is an extensible method for users to enter in ad hoc logic. |

When a plan is created from a workflow, the Client Interface 134 uses the logic-type condition model to generate a logic-type condition for entry/exit and the script (e.g., logic element) to be performed to determine if the condition is met. For example, the enterprise affiliate may indicate to the Activity I/O Condition Designer Module 208 that the condition is to check if the task is complete and that the logic to be performed is to check the status property of the task. In this case, the user or resource assigned to this task must notify the Client Interface 134 that the task is complete. In another example, the enterprise affiliate may indicate to the Activity I/O Condition Designer Module 208 that the condition is to check if the task is complete and that the logic to be performed is to check for the existence of a file in a specific directory folder on WebDAV Storage 142 in order to determine if the task is complete. In this case, the user or resource assigned to this task must create or move a file into the specific directory folder to indicate that the task is complete.

The Process Designer Module 210 allows an enterprise affiliate to create, modify, and store a workflow. When the enterprise affiliate indicates to Process Designer Module 210 that the modeled process is to be saved, Process Designer Module 210 produces a workflow definition file based on the modeled workflow object. Client Interface 134 then sends as the workflow definition file as a client file to WebDAV Server 140 to be stored on WebDAV Storage 142. Each workflow definition file produced by Process Designer Module 210 includes a unique identifier (e.g., a URL for the workflow definition file) so that Tool Server 144 may later locate the workflow definition file corresponding to the modeled workflow for further processing.

Project Plan Manager Module 212 allows an enterprise affiliate to create and activate a project plan from a workflow definition file. In general, upon request to create a project plan, Project Plan Manager Module 212 sends a query message to the WebDAV Server 140 for the workflow definition files contained in WebDAV Storage 142. As further described below, Project Plan Manager Module 212 receives the workflow definition files, allows the enterprise affiliate to select one of the workflow definition files to create a project plan, and then produces a plan definition file based on the selected workflow definition file. When instructed to save the plan by the enterprise affiliate, Project Plan Manager Module 212 sends the plan definition file as a client file to WebDAV Server 140 to be stored on WebDAV Storage 142. Each plan definition file produced by Process Designer Module 210 includes a unique identifier (e.g., a URL for the plan definition file) so that Tool Server 144 may later locate the workflow definition file corresponding to the modeled workflow for further processing.

The Task Tracker Module 214 allows an enterprise affiliate to view the tasks of an activated project plan that are assigned to a specific resource, to activate or start a task of the project plan (e.g., indicate actual start time to Client Interface 134), to open or check-out a document artifact needed to accomplish the task, to close or check-in the document artifact after accomplishing the task, and to indicate that the task is completed.

The Tool Server 144 includes a module loader 216 to load the Management Modules 148. Similar to the Client Interface 134, the Tool Server 144 may be developed so that the functionality provided by Management Modules 148 is not loaded by a known module loader 216, but integrally incorporated within the element corresponding to the Tool Server 144. Management Modules 148 include a User Authorization Module 218, a Resource/Role Management Module 220, and a Workflow Engine 222. The Workflow Engine 222 includes a Project Plan Management Module 224 and a Project Task Management Module 226.

When the Client Interface 134 requests access to a client file on the WebDAV Storage 142, the User Authorization Module 218 verifies that that the enterprise affiliate making the request has a user profile on the WebDAV Storage 142 with the proper authorization or permission to access the requested client file. The User Authorization Module 218 may be connected to a Light Directory Access Protocol (LDAP) Import Module 228, which follows a known LDAP protocol to allow the User Authorization Module 218 to obtain existing user profiles from another computer on network 108. As known to those skilled in the art, an LDAP protocol is based on "entries," where an entry is a collection of attributes that have a "distinguished name" (DN). According to the LDAP protocol, directory entries are arranged in a hierarchical tree-like structure that reflects political, geographic, and/or organizational boundaries. For example, entries representing countries may appear at the top of the tree. The entries below the countries may represent states or national organizations. Below the states or national organizations may be entries representing people (e.g., user profiles), organizational units, printers, documents, or any other accessible entity. Each level in the hierarchical tree-like structure for the directory entries may be identified by a known standardized keyword, such as "CN" for the common name of the entry (e.g., user profile), "L" for locality name, "ST" for state or province name, "O" for organization name, "OU" for organizational unit name, and "C" for country name. The LDAP Import Module 228 uses a DN to refer to the entry unambiguously via a concatenation of the hierarchical tree-like structure. After user profiles are retrieved by the User Authorization Module 218 via the LDAP import module 228, the user profiles may then be stored on the WebDAV Storage 142 by a request from the Client Interface 134.

The Resource/Role Management Module 220 reviews requests from an enterprise affiliate to assign a resource to a plan (e.g., to assign a user to a task of the plan). The Resource/Role Management Module 220 may check the resource profile corresponding to the assigned resource on the WebDAV Storage 142 to verify that the resource is not overloaded. For example, the Resource/Role Management Module 220 determines whether a resource is already assigned to another task in another plan during the same time frame, thus preventing it from being able to complete one of the tasks to which it is assigned. The Resource/Role Management Module 220 may also be connected to the LDAP Import Module 228 to allow the Resource/Role Management Module 220 to obtain existing resource profiles from another computer on network 108. The resource profiles may also be stored on WebDAV Storage 142 by a request from Client Interface 134.

The Workflow Engine 222 reviews requests to activate, deactivate, or update a plan. For example, a request to update a plan occurs if the enterprise affiliate who is an owner of a task indicates in its request that the task is complete. The Workflow Engine 222 also manages the execution of the activated plans.

High-Level Process

Figure 3:
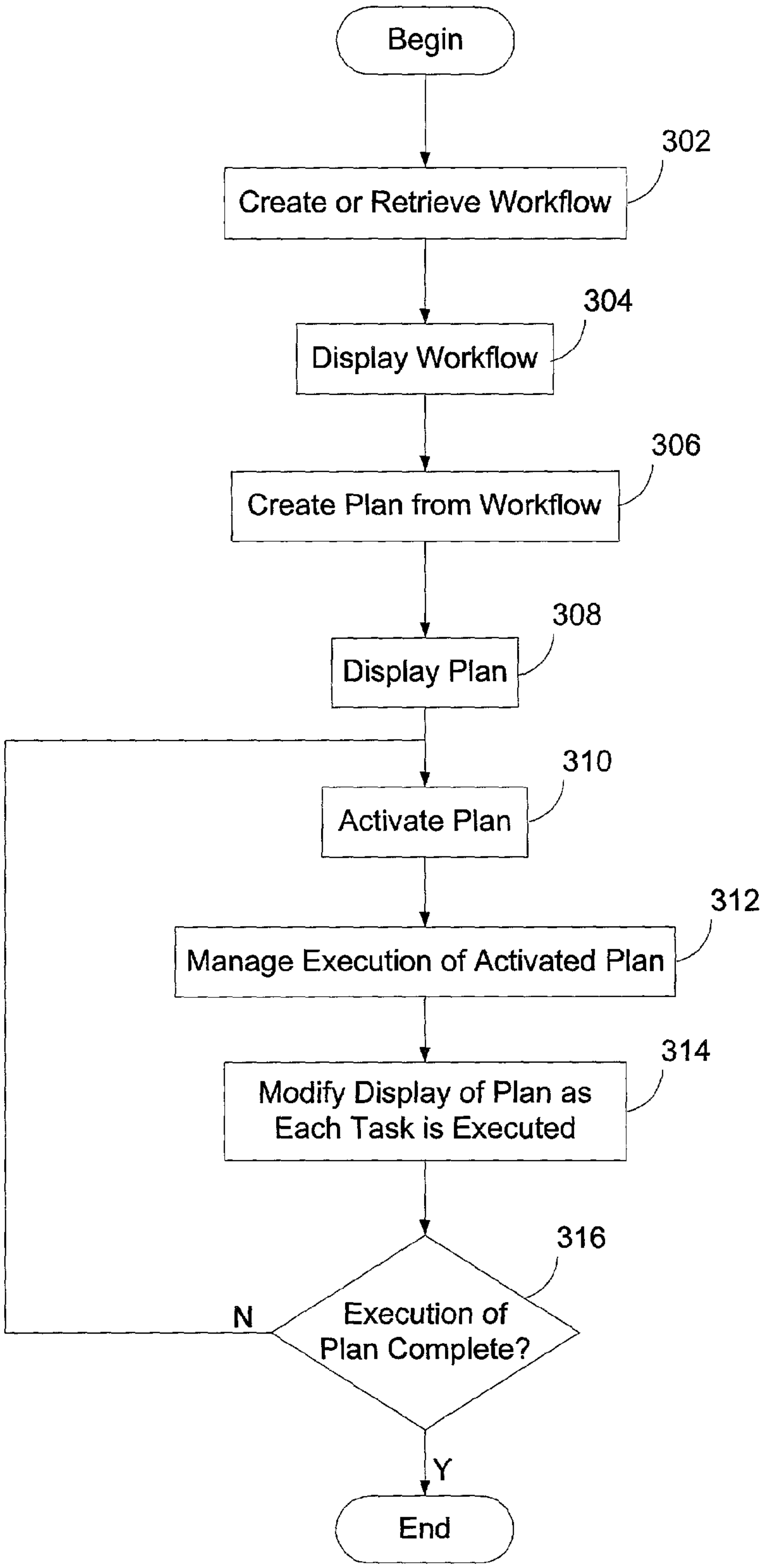
FIG. 3 depicts a flow diagram illustrating the high-level process performed by the tool of FIG. 2 in accordance with methods and systems consistent with the present invention.

FIG. 3 depicts a flow diagram illustrating the high-level process performed by the workflow modeling and project planning integration tool in accordance with methods and systems consistent with the present invention. Initially, the tool creates or retrieves a workflow (step 302). The tool then displays the workflow (step 304). The workflow comprises a set of activities that represents the steps to be performed as part of a plan executed from the workflow. Each activity has an activity description and at least one role responsible for the activity. The activity description indicates what step is to be performed by the role.

Figure 4:
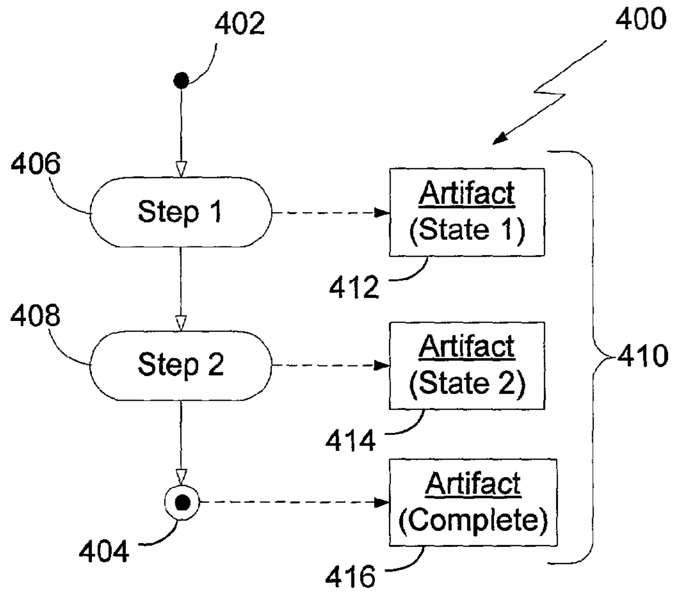
FIG. 4 depicts an exemplary document workflow modeled by an enterprise affiliate using the tool of FIG. 2.

There are two types of workflows: a document workflow and a task workflow. In a document workflow, the state of one document (or, more generally, any item or artifact) is monitored by the activities of the workflow. Thus, a document workflow cannot usually have parallel activities, which would require the parallel activities to monitor the states of more than one artifact or would require the parallel activities to monitor different states of the same artifact simultaneously. The document is in one state at a time. FIG. 4 depicts an exemplary document workflow 400. As shown, the workflow 400 includes a start element 402, an end element 404, and two activities, "Step 1" 406 and "Step 2" 408. Because "Step 1" 406 occurs directly before "Step 2" 408, "Step 1" 406 is the "predecessor activity" to "Step 2" 408. Similarly, "Step 2" 408 is the "successor activity" to "Step 1" 406. The workflow 400 is used to monitor the state of Artifact 410. In particular, in "Step 1" 406, the state of Artifact 410 is "State 1" 412, in "Step 2" 408, the state of Artifact 410 is "State 2" 414, and at the end 404 of the workflow, the state of Artifact 410 is "Complete" 416.

Figure 5:
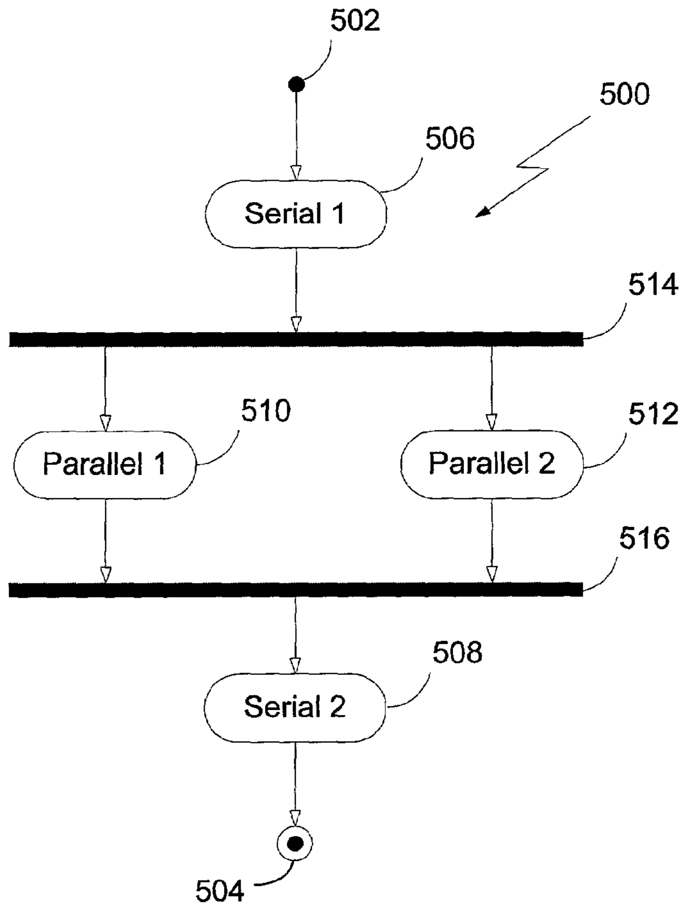
FIG. 5 depicts an exemplary task workflow modeled by an enterprise affiliate using the tool of FIG. 2.

A task workflow, on the other hand, typically has no limitations regarding the number of artifacts that may be monitored or modified by each activity of the workflow to achieve or contribute to the business process goal, such as an auditing process that determines if multiple accounts are balanced properly. FIG. 5 depicts an exemplary task workflow 500. The task workflow 500 includes a start element 502, an end element 504, two serial activities 506 and 508 and two parallel activities 510 and 512. The workflow also includes two synch bars 514 and 516, which are used to connect the ends of parallel activities. Contrary to the document workflow, the task workflow allows for parallel activities.

Figure 6:
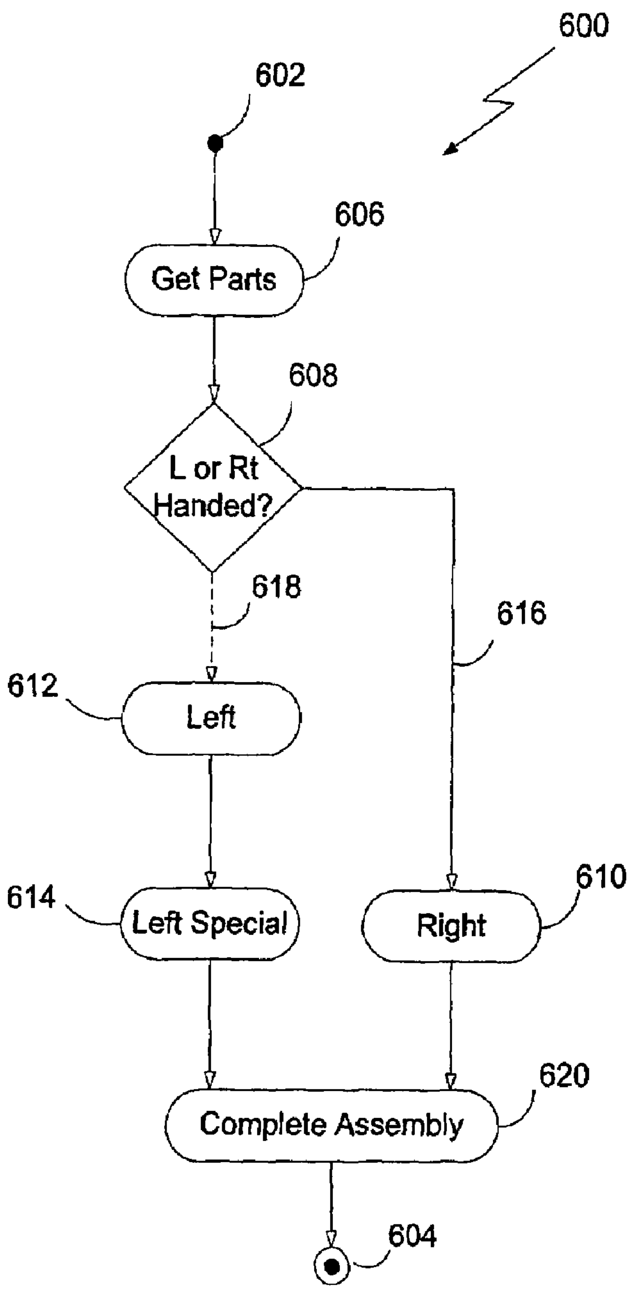
FIG. 6 depicts another exemplary workflow modeled by an enterprise affiliate using the tool of FIG. 2.

Another exemplary workflow 600 is depicted in FIG. 6. The workflow 600 includes a start element 602 and an end element 604. The first activity of the workflow 600 is "Get Parts" 606, which is followed by a logic activity, "L or Rt Handed?" 608. Logic activities have two successor activities: a "default activity" and a "non-default activity." As the name implies, the workflow generally follows the path of the default activity unless a condition is met in the logic activity, as discussed in detail below. In FIG. 6, the default activity is "Right" 610. The non-default activity is "Left" 612, which is followed by another activity "Left Special" 614. The default path is represented as a solid connector 616 while the non-default path is represented as a dotted connector 618. One skilled in the art, however, will recognize that any visible difference in the connectors, e.g., a change in type, color, shading, labeling, etc., may be used to represent both the default path as well as the non-default path. Both the default activity 610 and the non-default activities 612 and 614 are followed by another activity, "Complete Assembly" 620. In addition, though we show only two paths (616 & 618) out of the decision block 608, there could be any number of exit paths (not shown).

Figure 7:
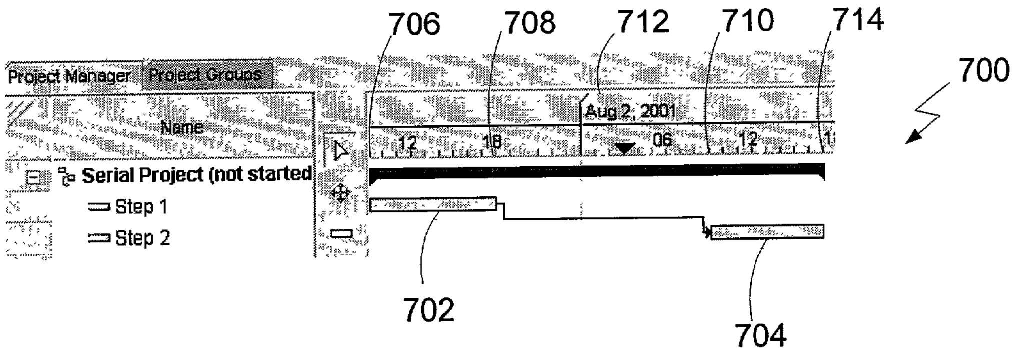
FIG. 7 depicts a timeline of the task created from the workflow of FIG. 4.

Returning to FIG. 3, the next step performed by the tool is to create a plan from the workflow (step 306). Each activity in the default path of the workflow generally corresponds to a task in the plan. The task identifies the scheduled start and stop times for the task. The tool then displays the plan (step 308). For example, the plan created from the workflow 400 depicted in FIG. 4 is shown in FIG. 7. The plan 700 includes two tasks 702 and 704 that correspond to the two activities 406 and 408 from the workflow 400. The first task 702 is scheduled to begin at 9 a.m. 706 on Aug. 1, 2001 (not shown), and end at 6 p.m. 708 on the same day. The second task 704 is scheduled to begin at 9 a.m. 710 on Aug. 2, 2001 (712) and end at 5 p.m. 714 on the same day.

Figure 8:
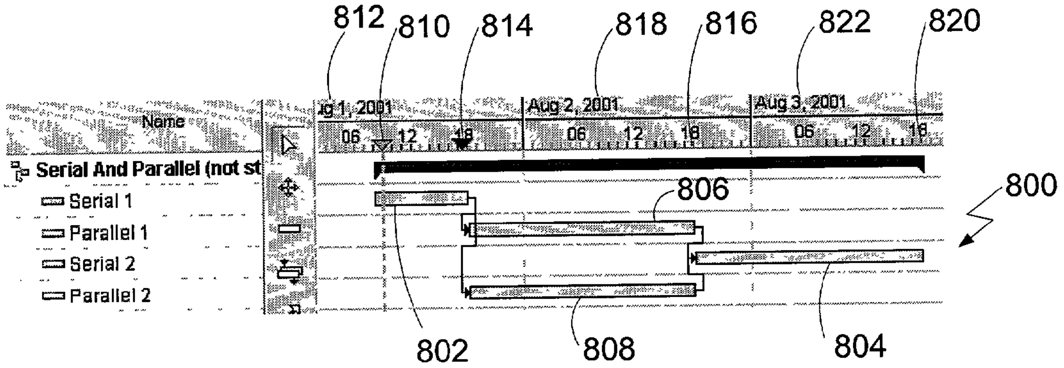
FIG. 8 depicts a timeline of the task created from the workflow of FIG. 5.

The plan 800 created from the workflow 500 depicted in FIG. 5 is shown in FIG. 8. The plan 800 includes two serial tasks 802 and 804 that correspond to the two serial activities 506 and 508 from the workflow 500. The plan 800 also includes two parallel tasks 806 and 808 that correspond to the two parallel activities 510 and 512 from the workflow 500. As shown in FIG. 8, "Serial 1" task 802 is scheduled to begin at 9 a.m. 810 on Aug. 1, 2001 (812) and end at 5:30 p.m. 814 on the same day. The parallel tasks 806 and 808 are scheduled to start at the completion of the "Serial 1" task 802, and are scheduled to end at 6 p.m. 816 on Aug. 2, 2001 (818). The "Serial 2" task 804 is scheduled to begin upon completion of the parallel tasks 806 and 808 and is scheduled to end at 6 p.m. 820 on Aug. 3, 2001 (822).

Figure 9:
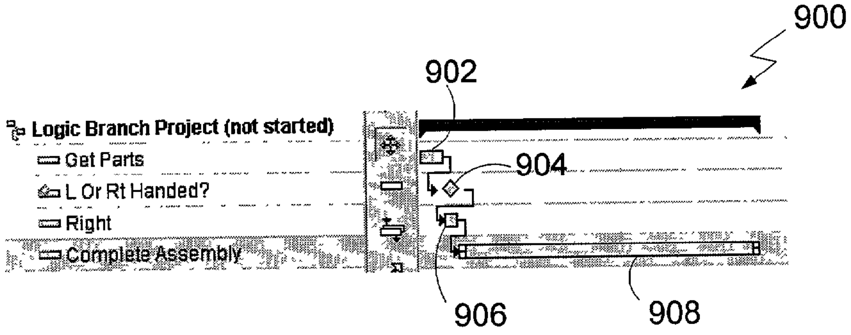
FIG. 9 depicts a timeline of the task created from the workflow of FIG. 6.

The plan 900 created from the workflow 600 depicted in FIG. 6 is shown in FIG. 9. The plan 900 includes a task 902 corresponding to the activity "Get Parts" 606, followed by a task 904 corresponding to the activity "L or Rt Handed?" 608. The following task 906 corresponds to the activity "Right" 610. The final task 908 corresponds to the activity "Complete Assembly" 620. The plan 900 depicts the default path, and does not include any of the tasks corresponding to the non-default path. Although the start and end times are not depicted in the plan 900 shown in FIG. 9, each task has a scheduled start and stop time. In addition, the tool 200 requires that an enterprise affiliate assign a resource to each task, as described below.

Returning to the high-level process of FIG. 3, the tool then activates the plan (step 310). Next, the tool manages the execution of the activated plan (step 312). The tool also modifies the display of the plan as each task is executed (step 314). The tool then determines whether the execution of the plan is complete (step 316). If the execution of the plan is complete, processing ends. Otherwise, processing continues to step 312.

Figure 10:
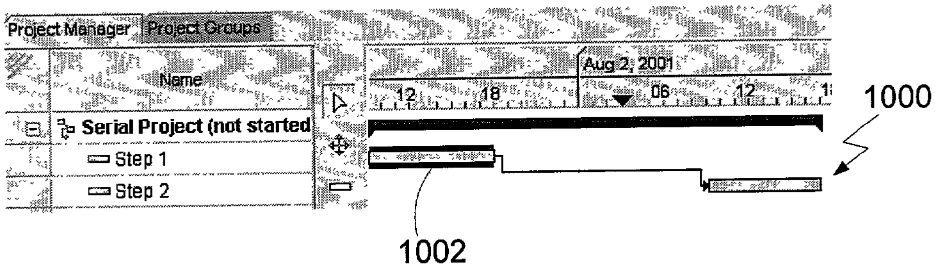
FIGS. 10–12 depict the execution of the plan depicted in FIG. 7.
Figure 11:
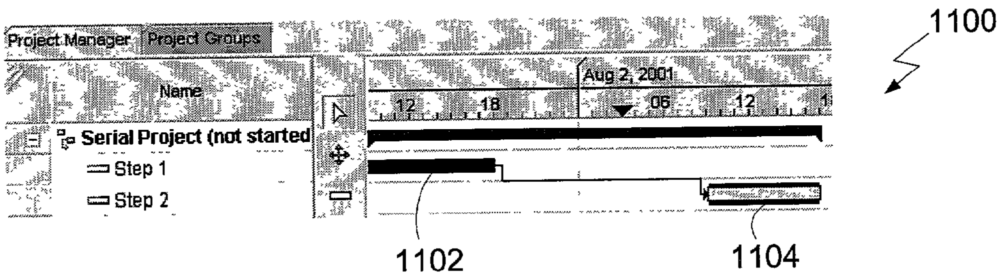
Figure 12:
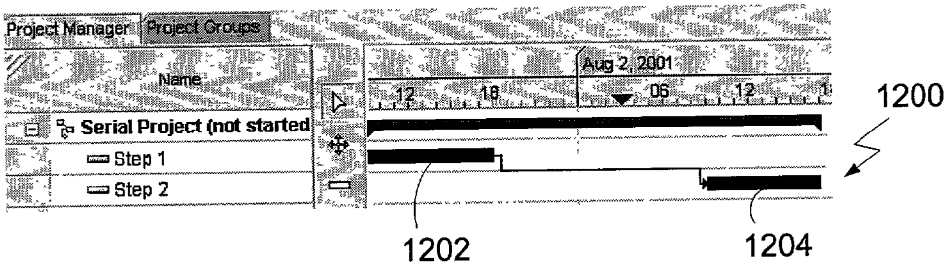

For the exemplary plan 700 depicted in FIG. 7, upon activation, the first task 702 begins execution. The tool depicts the executing task 1002 by darkening the outer borders of the block representing the task 1002, as depicted in the plan 1000 shown in FIG. 10. After completion of the task, the tool depicts the executed task 1102 as a darkened block in the plan 1100, as shown in FIG. 11. At this point, the second task 1104 begins execution, as indicated by the darkened outer borders of the task 1104. Finally, after both tasks 1102 and 1104 of the plan 1100 have been executed, both tasks 1202 and 1204 are depicted as darkened blocks in the plan 1200, as shown in FIG. 12. In this embodiment, the tool represents an executing task with darkened borders and represents an executed task as a darkened block. One skilled in the art, however, will recognize that any visible change in the blocks representing the tasks, e.g., a change in shape, color, shading, labeling, etc., may be used to represent the tasks in their various states. For example, in another implementation, color may be used to indicate active tasks; for example a gray rectangle may be used behind the task to indicate an actual activity since the actual dates may not coincide with the dates of the planned task. Thus, the representation of the tasks used in the methods, systems, and articles of manufacture consistent with the present invention are not limited to those used in the present embodiment.

Figure 13:
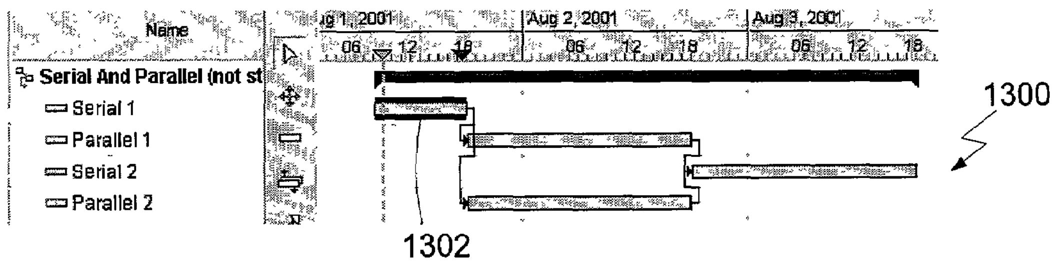
FIGS. 13–16 depict the execution of the plan depicted in FIG. 8.
Figure 14:
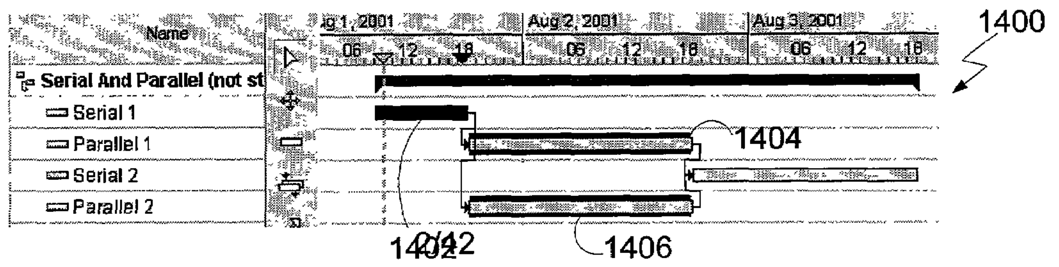
Figure 15:
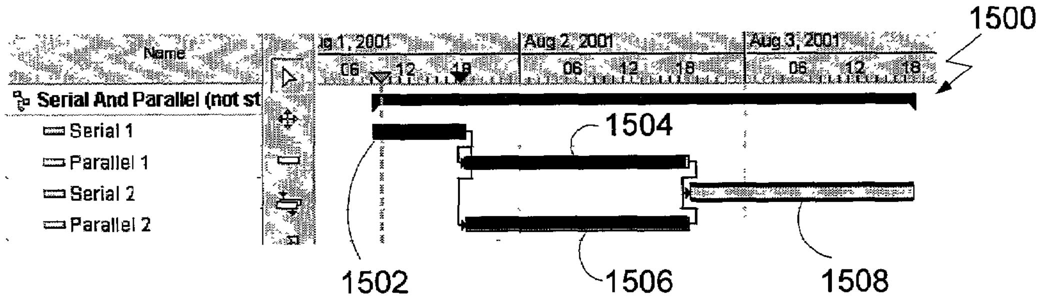
Figure 16:
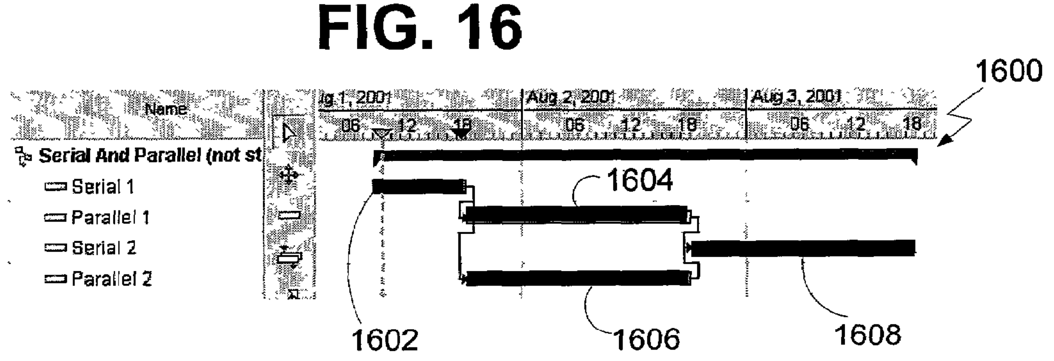

The activation and execution of the tasks of the plan 800 depicted in FIG. 8 are shown in FIGS. 13–16. FIG. 13 depicts the state of the plan 1300 while the "Serial 1" task 1302 is executing. FIG. 14 depicts the state of the plan 1400 after execution of the "Serial 1" task 1402, while the "Parallel 1" and the "Parallel 2" tasks 1404 and 1406 are executing. FIG. 15 depicts the state of the plan 1500 after execution of the "Serial 1" task 1502 and the "Parallel 1" and the "Parallel 2" tasks 1504 and 1506, while the "Serial 2" task 1508 is executing. Finally, FIG. 16 depicts the state of the plan 1600 after execution of the tasks 1602, 1604, 1606, and 1608.

As discussed above, FIG. 9 represents a plan 900 created from a workflow 600 having a. logic block 608. The activation and execution of the tasks of the plan 900 following the default path are shown in FIGS. 17–21, while the activation and execution of the tasks of the plan 900 following the non-default path are shown in FIGS. 22–27.

Figure 17:
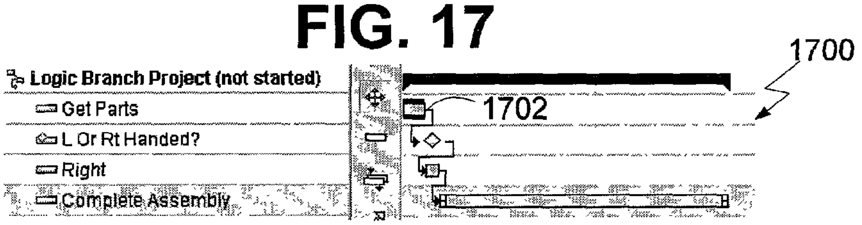
FIGS. 17–21 depict the execution of the plan depicted in FIG. 9 following the default path.
Figure 18:
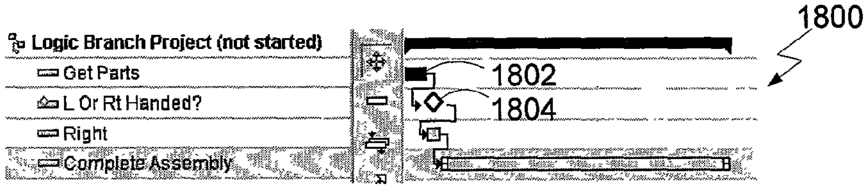
Figure 19:
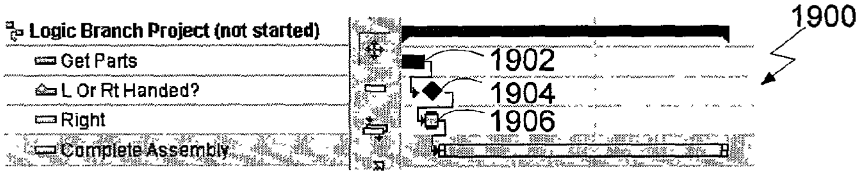
Figure 20:
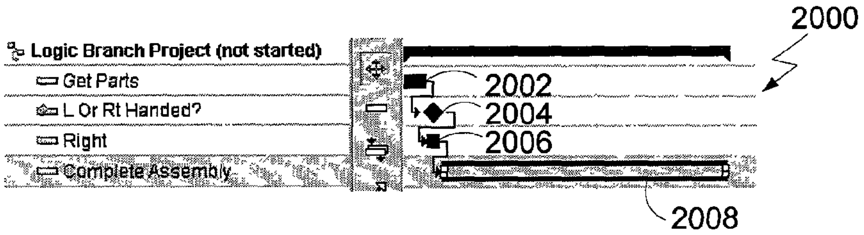
Figure 21:
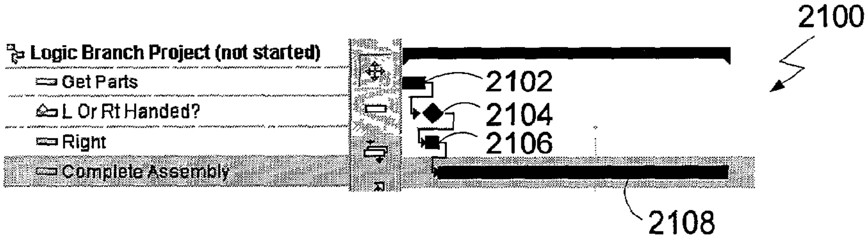

FIG. 17 depicts the state of the plan 1700 while the "Get Parts" task 1702 is executing. FIG. 18 depicts the state of the plan 1800 after the execution of the "Get Parts" task 1802, while the "L Or Rt Handed?" logic task 1804 is executing. The logic task may pop up a dialog (not shown) to prompt the resource assigned to this task to provide an answer for this "left or right-handed" question. In addition, the tool allows the question to be "answered" by running a logic script. This script may examine properties of an indicated artifact or it may execute a separate program on a separate system to compute the answer. Upon selection of the default path, the plan 1900 shown in FIG. 19 depicts both the "Get Parts" task 1902 and the "L Or Rt Handed?" logic task 1904 in executed states, while the "Right" task 1906 is depicted in an executing state. After the execution of the "Right" task 1906 is complete, the state of the plan 2000 is depicted in FIG. 20 with the "Get Parts" task 2002, the "L Or Rt Handed?" logic task 2004, and the "Right" task 2006 in executed states and with the "Complete Assembly" task 2008 in an executing state. Finally, upon completion of the "Complete Assembly" task 2008, the state of the plan 21 00 after execution of the tasks 2102, 2104, 2106, and 2108 is complete is depicted in FIG. 21.

Figure 22:
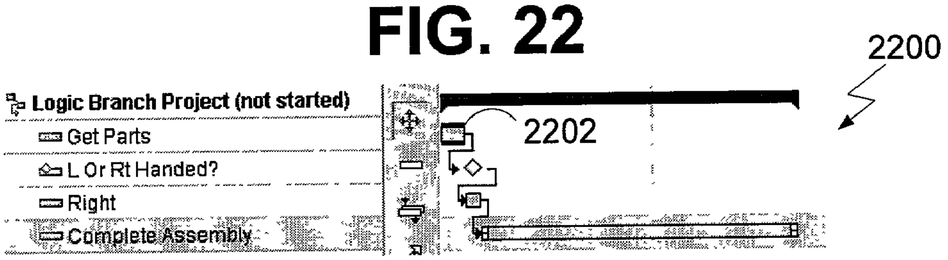
FIGS. 22–27 depict the execution of the plan depicted in FIG. 9 following the non-default path.
Figure 23:
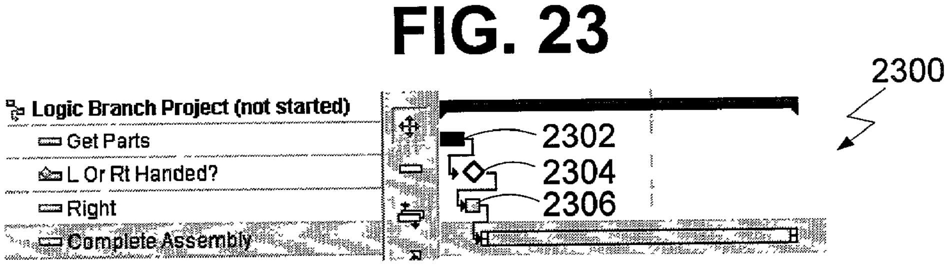
Figure 24:
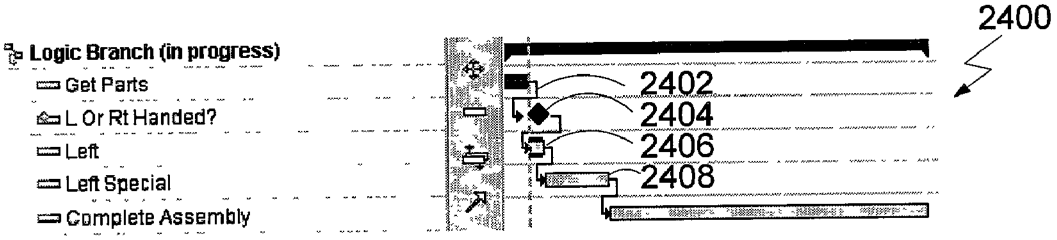
Figure 25:
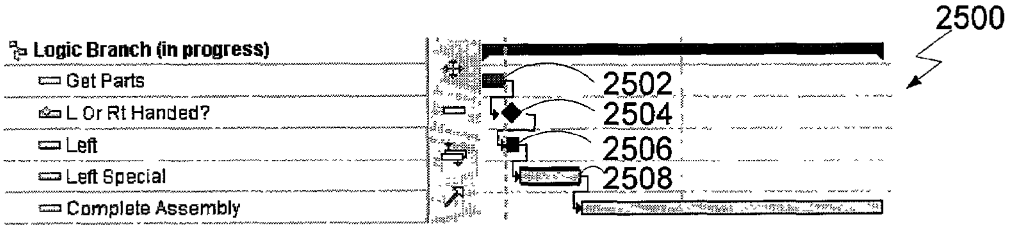
Figure 26:
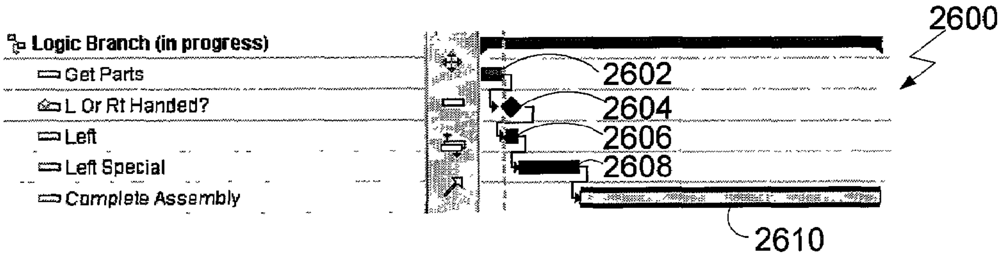
Figure 27:
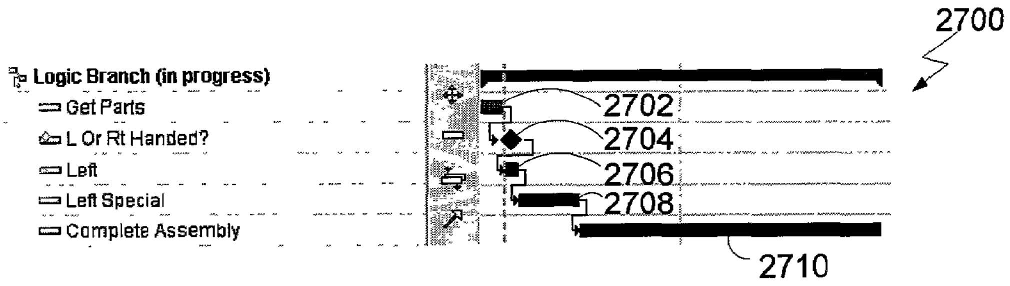

Alternatively, if the non-default path is to be chosen, the execution of the plan is initially the same as when the default path is chosen. Thus, as depicted in FIG. 22, the plan 2200 begins with the execution of the "Get Parts" task 2202. After completion of the "Get Parts" task 2202, the plan 2300 shown in FIG. 23 depicts the "Get Parts" task 2302 in an executed state while the "L Or Rt Handed?" task 2304 is shown in an executing state. At this point, the resource assigned to choose the default or the non-default path chooses the non-default path, thus completing the execution of the "L Or Rt Handed?" task 2404, as indicated in FIG. 24. Upon selection of the non-default path, the tool 200 modifies the plan 2400 to correspond to the non-default non-default path of the corresponding workflow. The plan 2400 depicts the tasks included in the non-default path. Thus, the plan 2400 includes the "Left" and "Left Special" tasks 2406 and 2408 rather than the "Right" task 2306, which is depicted in FIG. 23 before the non-default path was chosen. As shown in FIG. 24, the "Left" task 2406 is executing. FIG. 25 depicts the plan 2500 after the "Get Parts" task 2502, the "L Or Rt Handed?" logic task 2504, and the "Left" task 2506 have been executed, while the "Left Special" task 2508 is executing. Continuing with the execution of the plan, FIG. 26 depicts the state of the plan 2600 after the "Get Parts" task 2602, the "L Or Rt Handed?" logic task 2604, the "Left" task 2606, and the "Left Special" task 2608 are done executing, while the "Complete Assembly" task 2610 is executing. Finally, FIG. 27 depicts the state of the plan 2700 after completion of the tasks 2702, 2704, 2706, 2708, and 2710.

Retrieving or Creating A Workflow

Figure 28A:
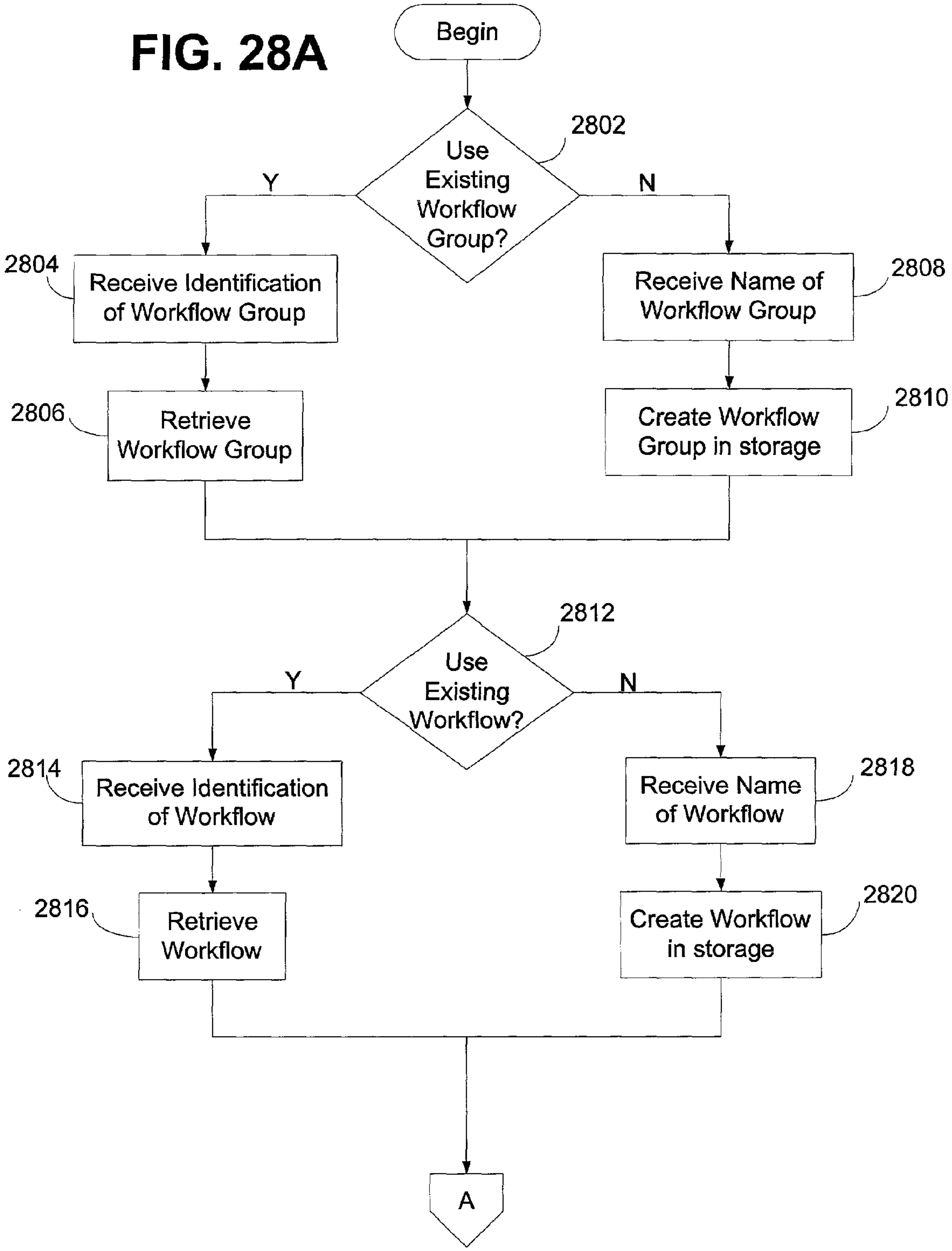
FIGS. 28A–C depict a flow diagram illustrating the creation or retrieval of a workflow by the tool of FIG. 2.
Figure 28B:
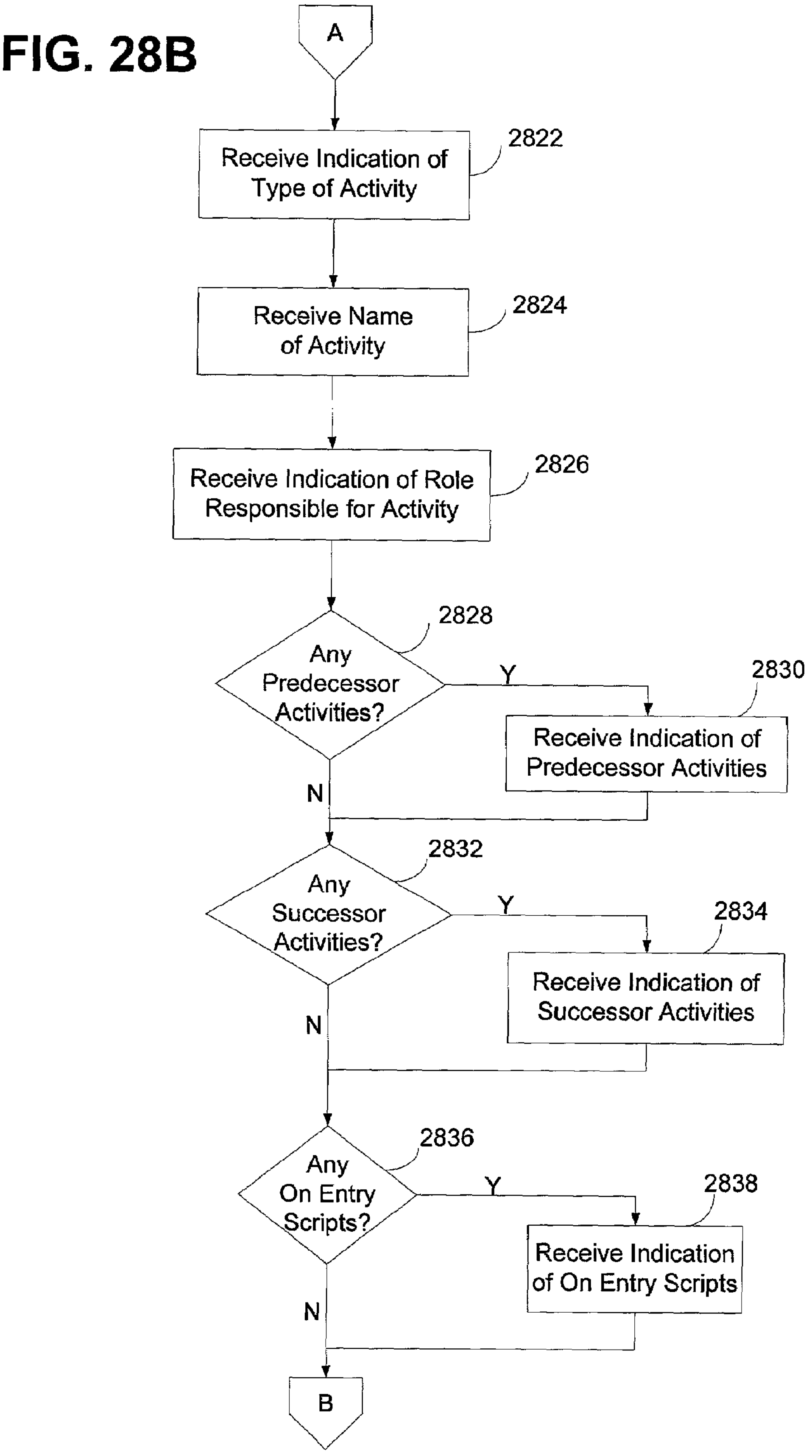
Figure 28C:
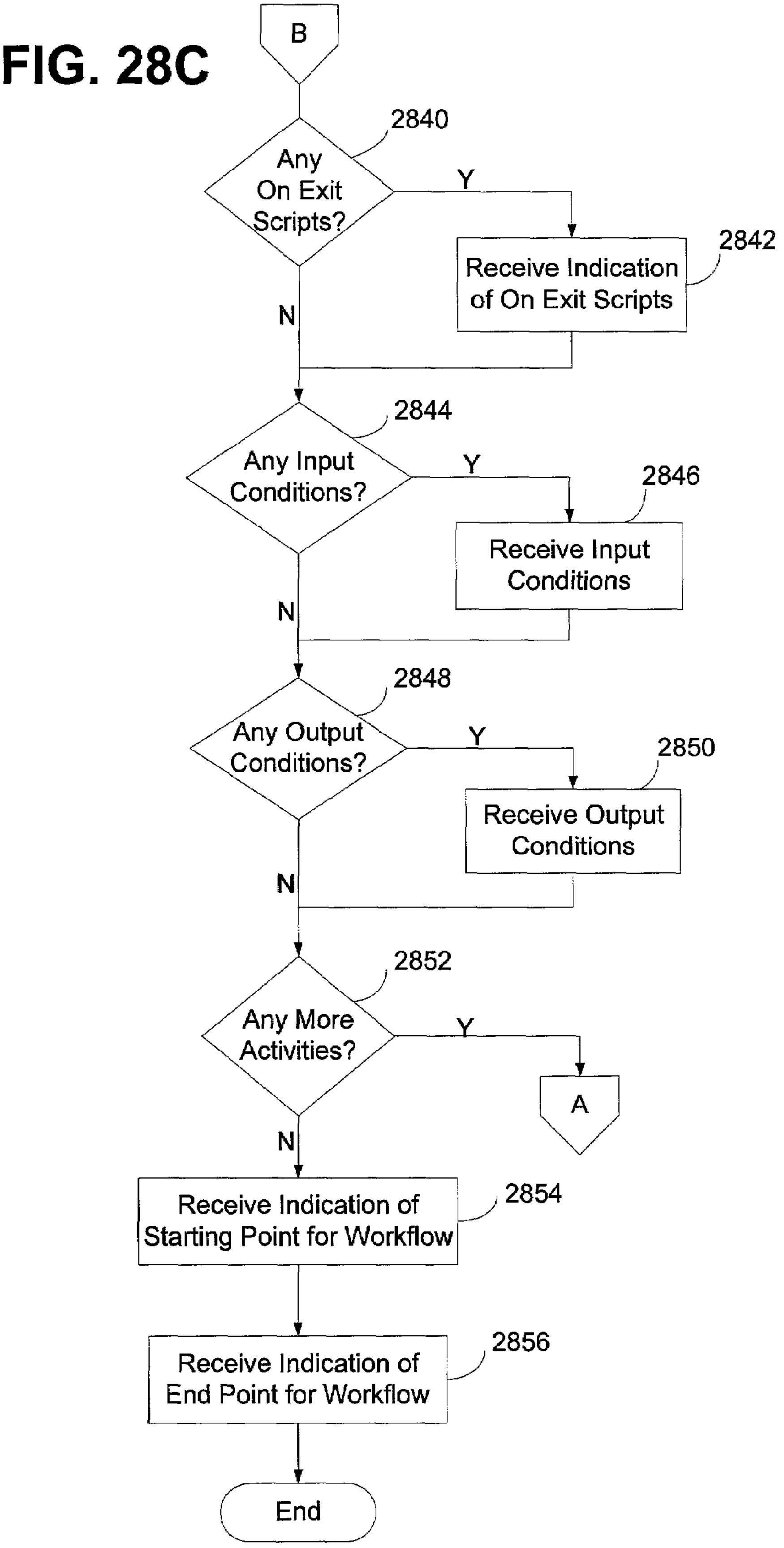

FIGS. 28A–C depict a flow diagram illustrating an exemplary process for retrieving or creating a workflow, i.e., step 302 in FIG. 3. Initially, the tool 200 determines whether to use an existing process or workflow group (step 2802). A workflow group is a collection of workflows (e.g., a directory or folder containing the collection of workflows) created by the Client Interface 134 on WebDAV Storage 142. Each workflow group is created by the Client Interface 134 on WebDAV Storage 142 with the "workflow group" property as explained further below. When creating a workflow, the Client Interface 134 allows the enterprise affiliate to store the workflow within an identified workflow group so that any enterprise affiliate using the Client Interface 134 is able to easily identify related workflows using a hierarchical relationship. For example, software-related workflows may be stored within the same workflow group so that an enterprise affiliate is able to quickly locate a desired workflow in order to create a corresponding plan using the Client Interface 134. One skilled in the art will appreciate that Client Interface 134 may store a workflow on WebDAV Storage 142 without associating the workflow with a workflow group.

Figure 29:
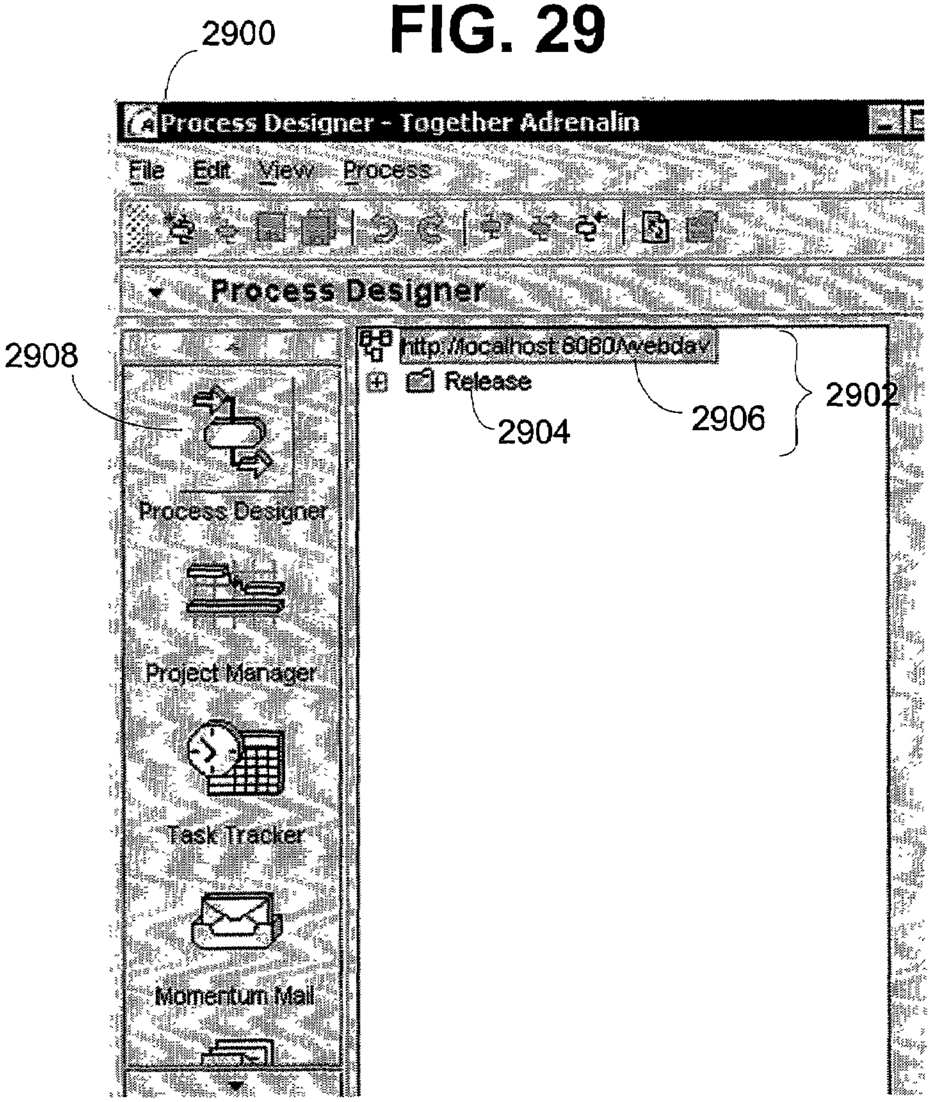
FIG. 29 depicts an exemplary user interface of the tool of FIG. 2 used to begin creating or retrieving a workflow.

The tool 200 receives user input from an enterprise affiliate with system administrative privileges or permissions, such as a process designer or a project manager, to determine whether to retrieve an existing workflow group or to create a new workflow group. If the tool 200 determines that it will use an existing workflow group, the tool 200 receives an identification of the workflow group from the enterprise affiliate (step 2804). In one implementation, the Client Interface 134 may retrieve the identifications for the workflow groups on the WebDAV Storage 142 by requesting that the folders or directories on WebDAV Storage 142 having a "workflow" property be returned by the WebDAV Server 140. The Client Interface may use any known method in accordance with WebDAV protocol to request that the WebDAV Server 140 return any directory or folder on WebDAV Storage 142 that corresponds to a workflow group. The tool 200 may then display the available workflow groups to allow the enterprise affiliate to select one of the available workflow groups. For example, as shown on the user interface 2900 depicted in FIG. 29, the tool 200 may display a hierarchical view 2902 of an identified workflow group 2904 stored on the root directory 2906 of WebDAV Storage 142. Alternatively, the enterprise affiliate may enter the identification of the desired workflow group to the tool 200 for retrieval. Using the identification, the tool 200 then retrieves the workflow group (step 2806).

Figure 30:
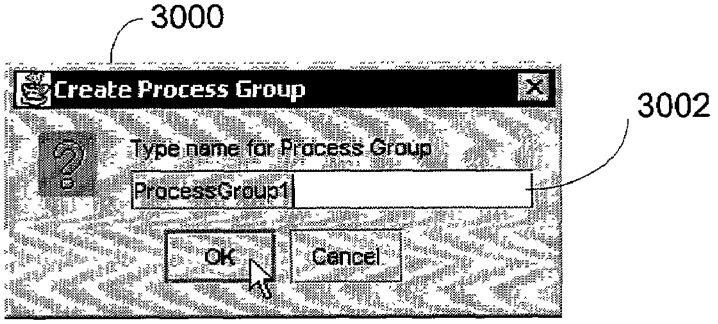
FIG. 30 depicts an exemplary user interface of the tool of FIG. 2 used to enter the name of a new workflow group.

If the tool 200 determines that a new workflow group will be created, the tool 200 receives the name of the workflow group from the enterprise affiliate (step 2808). For example, the enterprise affiliate may request a new workflow group by clicking on "Process Designer" button 2908 of the user interface 2900 depicted in FIG. 29. The enterprise affiliate may, alternatively, use any known data input technique, such as an icon or keyboard input, to indicate the request to the tool 200. Upon selecting the "Process Designer" button 2908, the tool 200 displays an exemplary user interface 3000 depicted in FIG. 30 for receiving a new workflow group identification 3002 via keyboard input from an enterprise affiliate using computer 102*a* or 102*n*.

After receiving the new workflow group identification, the tool 200 creates a new workflow group in storage (step 2810). For example, the tool 200 may create the workflow group on WebDAV Storage 142. To generate a new workflow group on WebDAV Storage 142, the Client Interface 134 sends the WebDAV Server 140 a request to create a new collection or folder on WebDAV Storage 142 with the same identification as the new workflow group identification 3002. In accordance with WebDAV protocol, the Client Interface 134 receives a response from the WebDAV Server 140 confirming that the new workflow group folder was created on WebDAV Storage 142. As previously discussed, when a new collection or folder is created using the WebDAV protocol, the WebDAV properties (e.g., "date of creation," "property name" and "lockdiscovery" properties) are created and stored in association with the new directory by the WebDAV Server 140. Thus, when generating the new workflow group, the Client Interface 134 also sets the "property name" of the new workflow group to be "workflow group" so that the Client Interface may subsequently use known WebDAV methods, such as "PropFind," to retrieve the identification of each workflow group on WebDAV Storage 142.

After retrieving an existing workflow group or creating a new workflow group, the tool 200 determines whether to use an existing workflow (step 2812). The tool 200 receives user input from an enterprise affiliate with appropriate privileges or permissions to determine whether to retrieve an existing workflow or to create a new workflow. If the tool 200 determines that it will use an existing workflow, the tool 200 receives an identification of the workflow from the enterprise affiliate (step 2814). In one implementation, the Client Interface 134 may retrieve the identifications for the workflows in the selected workflow group and display the available workflows to allow the enterprise affiliate to select one of the available workflows. Alternatively, the enterprise affiliate may enter the identification of the desired workflow to the tool 200 for retrieval. Using the identification, the tool 200 then retrieves the workflow (step 2816).

Figure 31:
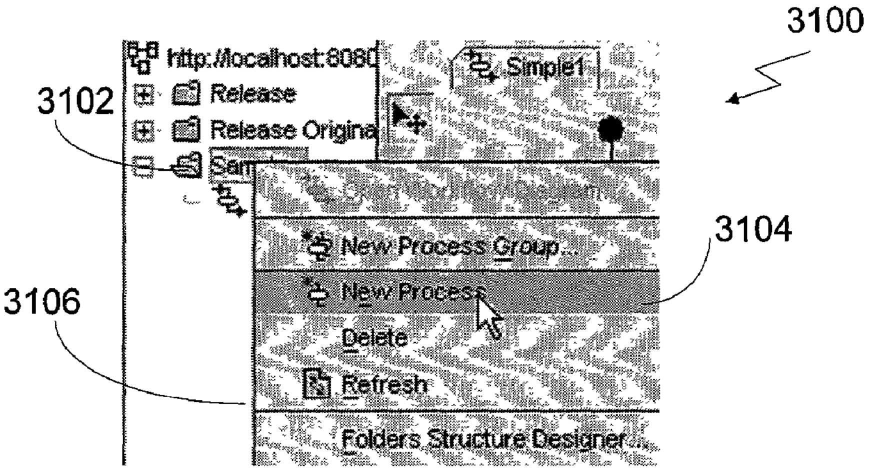
FIG. 31 depicts an exemplary user interface of the tool of FIG. 2 used to begin creating a new workflow.
Figure 32:
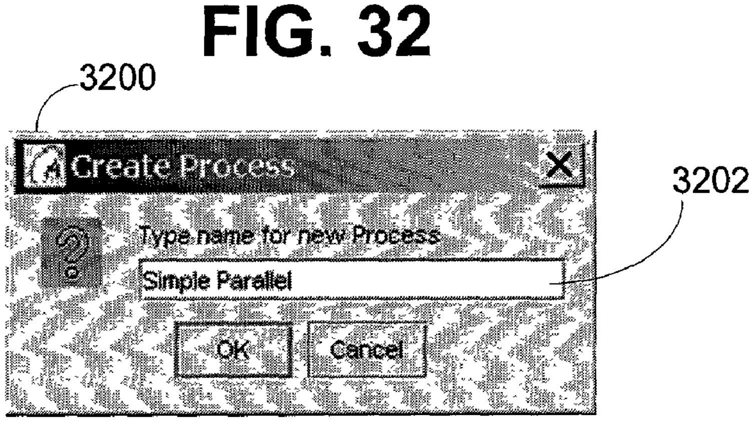
FIG. 32 depicts an exemplary user interface of the tool of FIG. 2 used to enter the name of a new workflow.

If the tool 200 determines that a new workflow will be created, the tool 200 receives the name of the workflow from the enterprise affiliate (step 2818). For example, the enterprise affiliate may request a new workflow by clicking on the desired workflow group 3102 and selecting the "New Process" option 3104 from a pull-down menu 3106 on the user interface 3100 depicted in FIG. 31. The enterprise affiliate may, alternatively, use any known data input technique, such as an icon or keyboard input, to indicate the request to the tool 200. Upon selecting the "New Process" option 3104, the tool 200 may display the exemplary dialog box 3200 depicted in FIG. 32 to the enterprise affiliate. The enterprise affiliate may then enter the name of a new workflow 3202. After receiving the name for the workflow, the tool 200 creates the workflow in storage (step 2820).

FIGS. 33A–C depict an exemplary workflow definition file 3300 that is produced by the tool 200 when the workflow 600 depicted in FIG. 6 is created. The name 3302 of the workflow, "Logic Branch Project," is identified in the workflow definition file 3300. Also, as shown in the definition file 3300, the workflow 600 does not have a workflow group 3304. The element 3306 in the workflow definition file 3300 represents the "Get Parts" activity 606. Similarly, the element 3308 (FIG. 33C) represents the "L or Rt Handed?" logic activity 608, the element 3310 represents the "Right" activity 610, the element 3312 represents the "Left" activity 612, the element 3314 represents the "Left Special" activity 614, and the element 3316 represents the "Complete Assembly" activity 620. The start element 602 is represented by the element 3318, and the end element 604 is represented by the element 3320.

Figure 34:
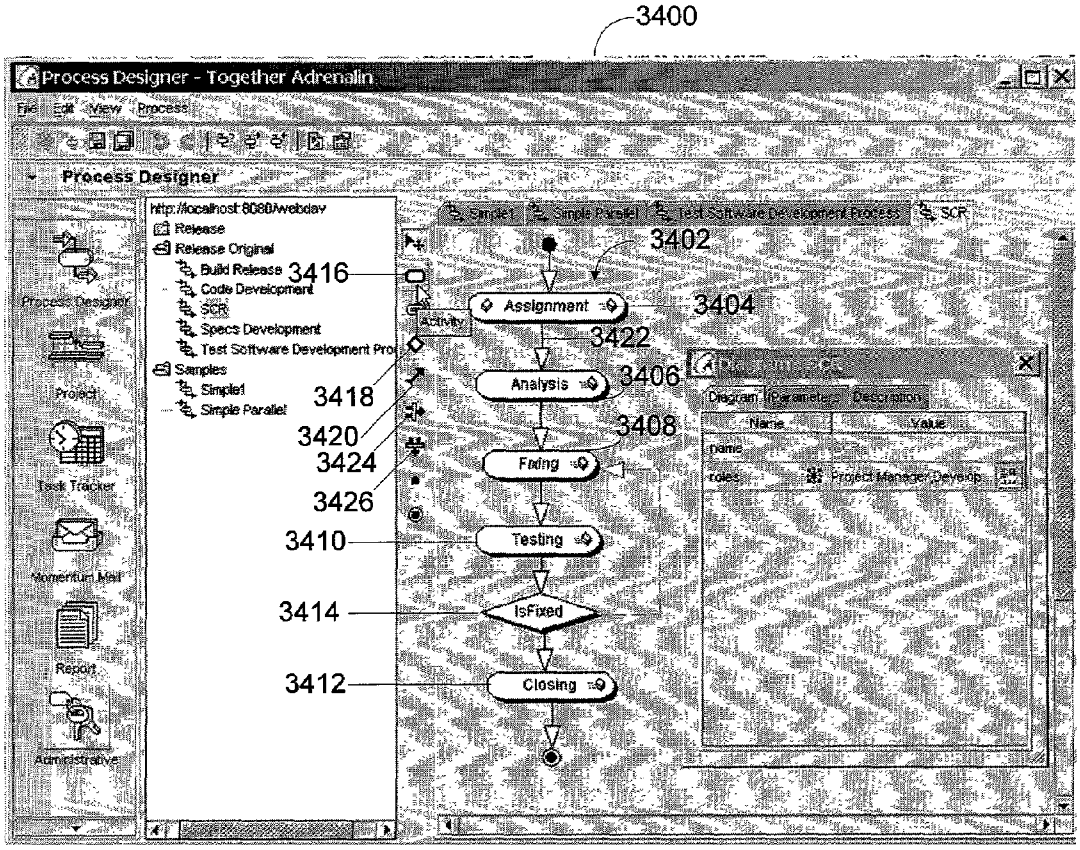
FIG. 34 depicts an exemplary user interface of the tool of FIG. 2 used to manage a workflow.

The next step performed by the tool 200 is to receive an indication of the type of activity to be created for the workflow (step 2822 in FIG. 28B). As discussed above, the activity may be a standard activity or a logic activity. For example, the workflow 3402 depicted in the user interface 3400 of FIG. 34 includes five standard activities 3404, 3406, 3408, 3410, and 3412. The workflow 3402 also includes one logic activity 3414. The selection of the type of activity may be made by clicking on the icon for a standard activity 3416 or the icon for the logic activity 3418. Alternatively, any known data input technique, such as a pull-down menu or keyboard input, may be used to select the type of activity.

After receiving an indication of the type of activity, the tool 200 receives the name of the activity (step 2824). The names of the activities depicted in the workflow 3402 are included with the activity. Thus, the name of activity 3404 is "Assignment," the name of activity 3406 is "Analysis," etc.

Returning to the example workflow 600 depicted in FIG. 6, the name of the first activity 606 is "Get Parts," which is identified by the element 3322 in the workflow definition file 3300 of FIG. 33. Similarly, the name of the logic activity 608 is "L or Rt Handed?," which is identified by the element 3324. The name of the activity 610 is "Right," as identified by the element 3326. The name of the activity 612 is "Left," as identified by the element 3328. The name of the activity 614 is "Left Special," as identified by the element 3330. Finally, the name of the activity 620 is "Complete Activity," as identified by the element 3332.

Figure 35:
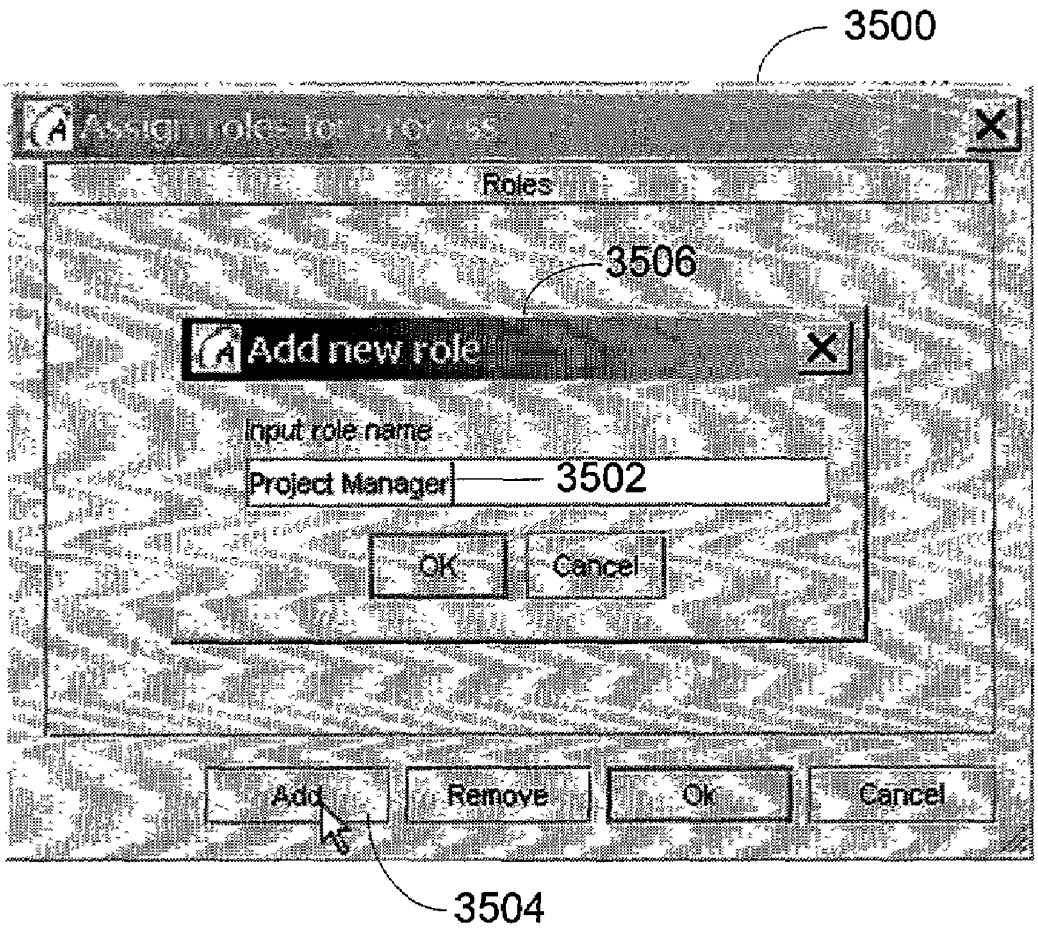
FIG. 35 depicts an exemplary user interface of the tool of FIG. 2 used to add a new role to a workflow.

After receiving a name for the activity, the tool 200 receives an indication of the role responsible for the activity (step 2826). As discussed above, the Client Interface (via Resource Manager Module 206) allows an enterprise affiliate to identify a role or role profile that may be assigned to an activity of the workflow. A role profile includes a Rolename that represents a "capability" or "skill set," which is needed to perform a task of a plan created from the workflow, where the task corresponds to the activity of the workflow. For example, FIG. 35 depicts a user interface 3500 displayed by the Client Interface to receive a role profile. In the implementation shown in FIG. 35, the Client Interface receives a Rolename 3502 (e.g., "Project Manager") for the role profile via the enterprise affiliate clicking on an "Add" button 3504 and then entering Rolename 3502 in a dialog box 3506 that is displayed by the Client Interface. In another implementation, the Client Interface may also receive as additional entries (not shown) to dialog box 3506 a skill and an associated skill level for Rolename 3502 as part of this role profile. For example, the enterprise affiliate may indicate to the Client Interface via the additional entries to dialog box 3506 that the Rolename 3502 of "Project Manager" be associated with a skill entitled "Object-oriented software programming" and with a skill strength of "7" on a scale of 10. Assuming an enterprise affiliate is developing a workflow for producing a software development tool, the enterprise affiliate may assign to activities in the workflow the "Project Manager" role profile with this skill and skill level. Thus, when a plan is created from this workflow, a resource having the appropriate skill and skill level will automatically be assigned by the Client Interface to tasks corresponding to the activities with the "Project Manager" role assignment.

The tool 200 stores the role profiles in association with the selected workflow activity on WebDAV Storage 142. The tool 200 saves significant costs in developing multiple workflows by allowing the enterprise affiliate to store the role profiles in association with the selected workflow activity on WebDAV Storage 142 so that the role profiles may be available for the enterprise affiliate to assign to an activity of another workflow that is also related to the selected workflow activity. In one implementation, the Client Interface stores the role profiles in a single role definition file (not shown) on WebDAV Storage 142. In another implementation, the Client Interface stores the role profiles in separate files (not shown) on WebDAV Storage 142. Each separate file has a name that is the same as the received Rolename 3502. In this implementation, using known WebDAV protocol, the Client Interface defines an associated WebDAV property having a common name, such as "role profile," so that the Client Interface may later retrieve the role profiles stored on WebDAV storage.

The role profiles may also be stored with the workflow definition file. As shown in the workflow definition file 3300 depicted in FIG. 33, the role profile 3334 for the "Get Parts" activity 606 indicates that the role responsible for the activity is "Assembler" 3336. Similarly, the role profile 3338 for the "L or Rt Handed?" activity 608 indicates that the role responsible for the activity is "Assembler" 3340. The role profile 3342 for the "Right" activity 610 indicates that the role responsible for the activity is "Assembler" 3344. The role profile 3346 for the "Left" activity 612 indicates that the role responsible for the activity is "Assembler" 3348. The role profile 3350 for the "Left Special" activity 614 indicates that the role responsible for the activity is "Assembler" 3352. Finally, the role profile 3354 for the "Complete Assembly" activity 620 indicates that the role responsible for the activity is "Assembler" 3356.

The next step performed by the tool 200 is to determine whether the activity has any predecessor activities (step 2828). If the activity does have a predecessor activity, the tool 200 receives an indication of the predecessor activities from the workflow definition file (step 2830). After checking for any predecessor activities and/or receiving the predecessor activities, the tool 200 determines whether the activity has any successor activities (step 2832). If the activity has a successor activity, the tool 200 receives an indication of the successor activities from the workflow definition file (step 2834). In the user interface 3400 of FIG. 34, the "Path" icon 3420 is used to connect the predecessor activity to the successor activity. For example, in the workflow 3402, a path 3422 was drawn from the "Assignment" activity 3404 to the "Analysis" activity 3406. Thus, the "Assignment" activity 3404 is the predecessor activity to the "Analysis" activity 3406, and the "Analysis" activity 3406 is the successor activity to the "Assignment" activity 3404. Alternatively, a "Vertical Fork/Join" icon 3424 or a "Horizontal Fork/Join" activity may be used to connect more than one predecessor activities to a successor activity, or to connect a predecessor activity to more than one successor activities.

In the workflow 600 depicted in FIG. 6, the activity ID 3358 of the "Get Parts" activity 606 is "10." The predecessor 3360 to the "Get Parts" activity 606 has an ID of "11" 3362, which corresponds to the start element 602. The successor 3364 to the "Get Parts" activity 606 has an ID of "1522" 3366, which corresponds to the "L or Rt Handed?" logic activity 608. The predecessor 3368 to the "L or Rt Handed?" logic activity 608 has an ID of "10" 3358, which corresponds to the "Get Parts" activity 606. Because the "L or Rt Handed?" activity 608 is a logic activity, it has both a default successor and a non-default successor. Thus, the workflow definition file 3300 identifies two paths out of the "L or Rt Handed?" logic activity 608, one path 3370 has an ID of "1525" 3372, wich corresponds to the "Right" activity 610, and the other path 3374 has an ID of "1523" 3376, which corresponds to the "Left" activity 612. The element representing the "L or Rt Handed?" logic activity 608 also identifies that the default path 3378 has an ID of "1525" 3372, which corresponds to the "Right" activity 610. The predecessor 3380 to the "Right" activity 610 and the predecessor 3382 to the "Left" activity 612 have an ID of "1522" 3366, which corresponds to the "L or Rt Handed?" logic activity 608. The remaining predecessor and successors follow this convention.

After checking for any successor activities and/or receiving the successor activities, the tool 200 determines whether the activity has any on-entry scripts (step 2836). An on-entry script is a step to be performed by the tool 200 upon entry into the activity. For example, the on-entry script may send an email notifying an interested user about the activity being started. The on-entry script may also send a dialog box to an enterprise affiliate to obtain data in real-time, or send a request to a separate device to gather input, e.g., by sending a message to a computer to receive data files. Other examples of on-entry scripts include checking stock levels and issuing reorder commands, if necessary, or paging the user assigned to perform the activity. If the activity has an on-entry script, the tool 200 receives an indication of the on-entry scripts (step 2838). After checking for any on-entry scripts and/or receiving the on-entry scripts, the tool 200 determines whether the activity has any on-exit scripts (step 2840 in FIG. 28C). An on-exit script is a step to be performed by the tool 200 upon exiting the activity. For example, the on-exit script may send an email notifying an interested user about the end of an activity. Other examples of on-exit scripts include sending a message to another device to have the other device perform enterprise application integration, notifying a downstream consumer about the activity so that the consumer knows what is coming, and placing an activity on a user's personal calendar. If the activity has an on-exit script, the tool 200 receives an indication of the on-exit scripts (step 2842). For example, the "Complete Assembly" activity 620 depicted in FIG. 6 includes both an on-entry script 3384 as well as an on-exit script 3386. Upon entering the task created from the "Complete Assembly" activity, the tool 200 sends an email to the owner indicating that the "Debugging period started" 3388. Prior to exiting the task created from the "Complete Assembly" activity, the tool 200 sends an email to the owner indicating that the "Debugging finished" 3390.

After checking for any on-exit scripts and/or receiving the on-exit scripts, the tool 200 determines whether the activity has any input (i.e., begin or starting) conditions (step 2844). If the activity has an input condition, the tool 200 receives an indication of the input conditions (step 2846). Example input conditions are to expect an artifact required for the task to have a specific status. After checking for any input conditions and/or receiving the input conditions, the tool 200 determines whether the activity has any output (i.e., exit or ending) conditions (step 2848). An example exit condition could be to automatically check the quality of an artifact generated by the task. If the artifact meets quality standards, the task completion occurs; otherwise, the task completion is rejected and the user is informed that more quality is required. If the activity has an output condition, the tool 200 receives an indication of the output conditions (step 2850). The output condition 3391 for the "Get Parts" activity 606 has an ID of "1527" 3392 (FIG. 33B), and is a document-type condition, as indicated by the "linkablel" identity 3393 in the element 3394 representing the condition 3391. In general, based on the condition 3391, the tool 200 (in particular, the Workflow Engine 222) monitors the state of an artifact for an activated "Get Parts" task created from the "Get Parts" activity 606 until the state of the artifact is the "INITIAL" state 3395 before the tool 200 continues with the next task in the plan. Similarly, the output condition 3396 for the "Right" activity 610 has an ID of "1533" 3397. The output condition 3396 for the "Right" activity 610 is also a document-type condition, as indicated by the "linkablel" identity 3398. This condition 3396 signals the tool 200 to monitor the state of an artifact until it is in the "RIGHT" state 3399.

Figure 36:
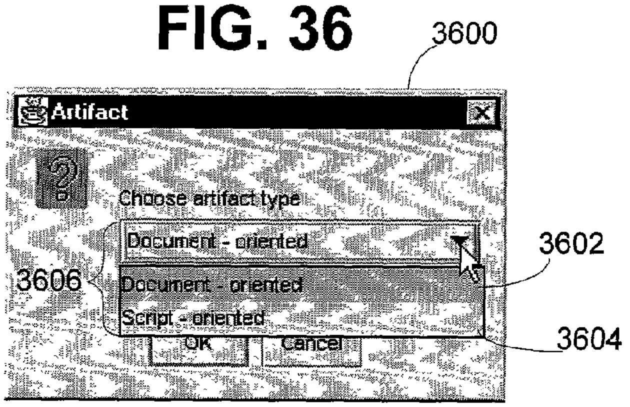
FIG. 36 depicts an exemplary user interface of the tool of FIG. 2 used to select an artifact type.

FIG. 36 depicts an exemplary user interface 3600 displayed by the Client Interface 134 to include either a document-oriented 3602 or a script (or logic)-oriented 3604 condition. As shown in FIG. 36, the Client Interface 134 may receive the request to add a condition to the activity via a pull-down menu selection 3606. The enterprise affiliate may, however, use any known data input technique to request that a condition be added to an activity, such as an icon or keyboard input, to indicate the request to the Client Interface 134. If the enterprise affiliate selects a document-oriented condition, the enterprise affiliate may be presented with the user interface 3700 depicted in FIG. 37 to identify the properties of the condition to the Client Interface 134. The condition properties 3702 include condition-name property 3704 for the document-type condition model. In the example shown in FIG. 37, the Client Interface 134 receives the condition-name property 3704 via a keyboard input by the enterprise affiliate. The Client Interface 134 uses the condition-name property 3704 to distinguish the condition model to be created from other condition models stored on WebDAV Storage 142. The Client Interface 134 may store the document-type condition model file on WebDAV Storage 142 having the same name as the condition-name property 3704. In another implementation, the Client Interface 134 may store the condition-name property 3704 as a WebDAV property stored in association with the document-type condition model file on WebDAV Storage 142.

Figure 37:
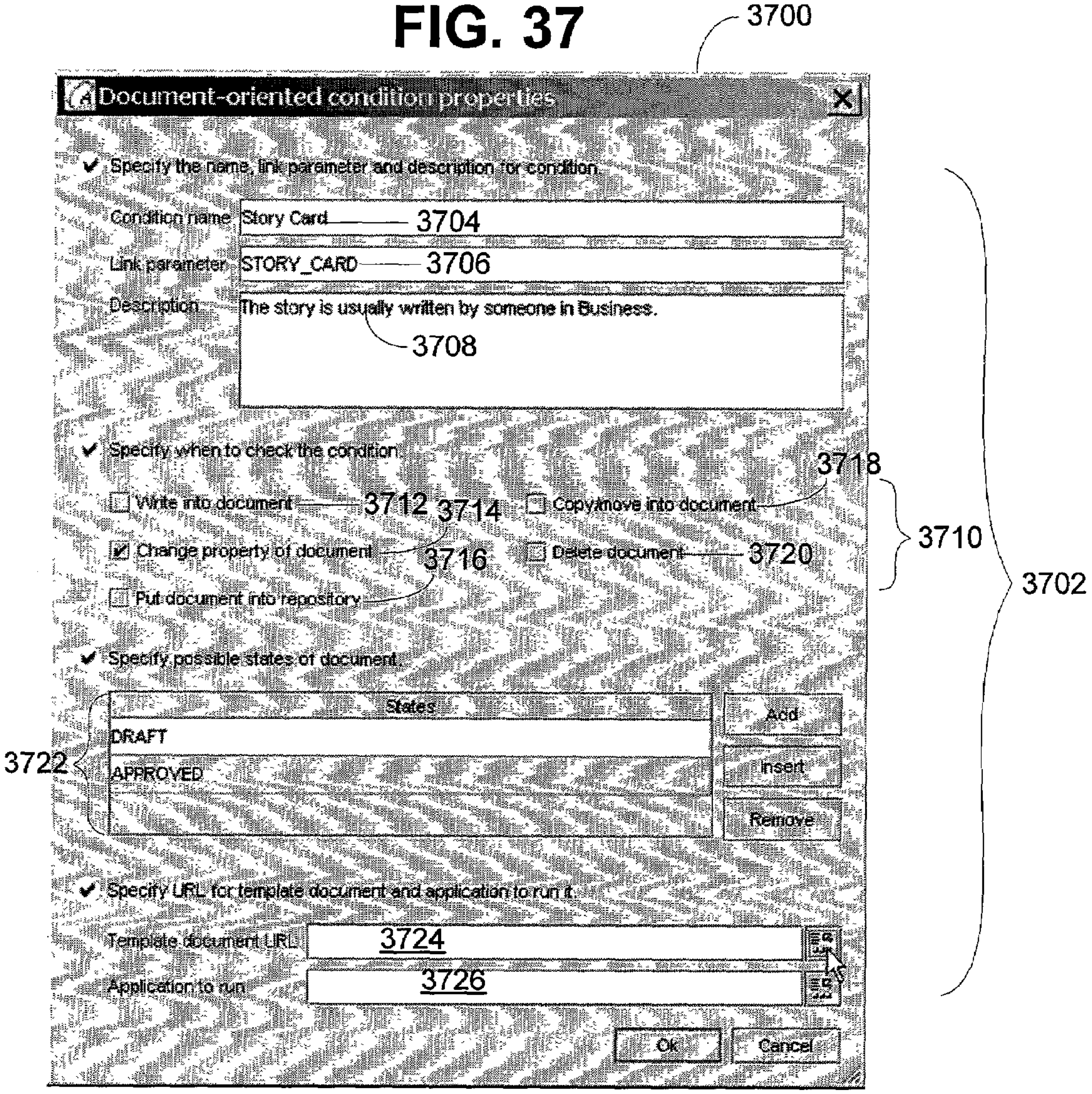
FIG. 37 depicts an exemplary user interface of the tool of FIG. 2 used to enter condition properties for a document-oriented artifact.

The Client Interface 134 also receives a link-parameter property 3706 as one of Condition properties 3702 for the document-type condition model to be created by the Client Interface. As shown in FIG. 37, the enterprise affiliate may identify link-parameter property 3706 to the Client Interface via keyboard input. Link-parameter property 3706 may be used by an enterprise affiliate in an activity-related script that is identified to the Client Interface during the creation of a workflow as described below. Thus, when executing the activity-related script in a task of a plan created from the workflow, the Workflow Engine 222 in FIG. 2 is able to locate the corresponding document condition so that the corresponding input or output condition may be evaluated by the Workflow Engine 222.

The Client Interface 134 may also receive a description property 3708 as one of Condition properties 3702 for the document-type condition model to be created by the Client Interface. When creating a workflow as described below, the Client Interface may display description property 3708 in association with condition-name property 3704 to allow an enterprise affiliate to effectively choose whether the document-type condition model should be assigned to an activity of the workflow.

The Client Interface may also receive one or more triggering-event properties 3710 for the document-type condition model. In the example shown in FIG. 37, the Client Interface may receive the triggering-event properties as one of the condition properties 3702 for the document-type condition model to be created by the Client Interface. Triggering-event properties 3710 indicate to the Workflow Engine 222 when to check the state property of a document condition as an entry or exit condition of an activated task.

Triggering-event properties 3710 may include a "Write into document" event 3712, a "Change property of document" event 3714, a "Put document into repository" event 3716, a "copy or move into document" event 3718, and a "delete document" event 3720.

Next, the Client Interface 134 receives document state properties 3722 as one of the Condition properties 3702 for the document-type condition model to be created by the Client Interface. Document state properties 3722 identify possible values for a state property of a document condition that is created using the document-type condition model. As further explained herein, an enterprise affiliate who has been identified as the responsible owner of an activated task may change the state property of a document condition (e.g., from "DRAFT" to "APPROVED") using the Client Interface, which sends a request to WebDAV Server 140 in FIG. 2 to set the state property of the document condition as indicated by the enterprise affiliate. Workflow Engine 222 in FIG. 2 may then check the state property of the document condition on WebDAV Storage 142 when triggering-events 3710 occur.

The Client Interface also receives a location property 3724 as one of Condition properties 3702 identified by the enterprise affiliate for the document-type condition model. Location property 3724 is a unique identifier or URL for a document template that the Client Interface uses to create the document condition that is then stored by the Client Interface on WebDAV Storage 142. Location property 3724 may be a location on secondary storage device 116 of computer 102*a* or a location on WebDAV Storage 142. As described in greater detail below, the document condition is created by the Client Interface 134 when a plan is instantiated or created from a workflow having an activity with an entry or exit condition created using the document-type condition model. Finally, the Client Interface receives application property 3726 as one of Condition properties 3702 identified by the enterprise affiliate for the document-type condition model. Application property 3726 is a unique identifier or URL for an application, such as Microsoft Word, that the Client Interface may run to create an instant of the document template that may be found at the location specified by location property 3724. The Client Interface uses the instant of the document template to create and store the document condition on WebDAV Storage 142.

Figure 38:
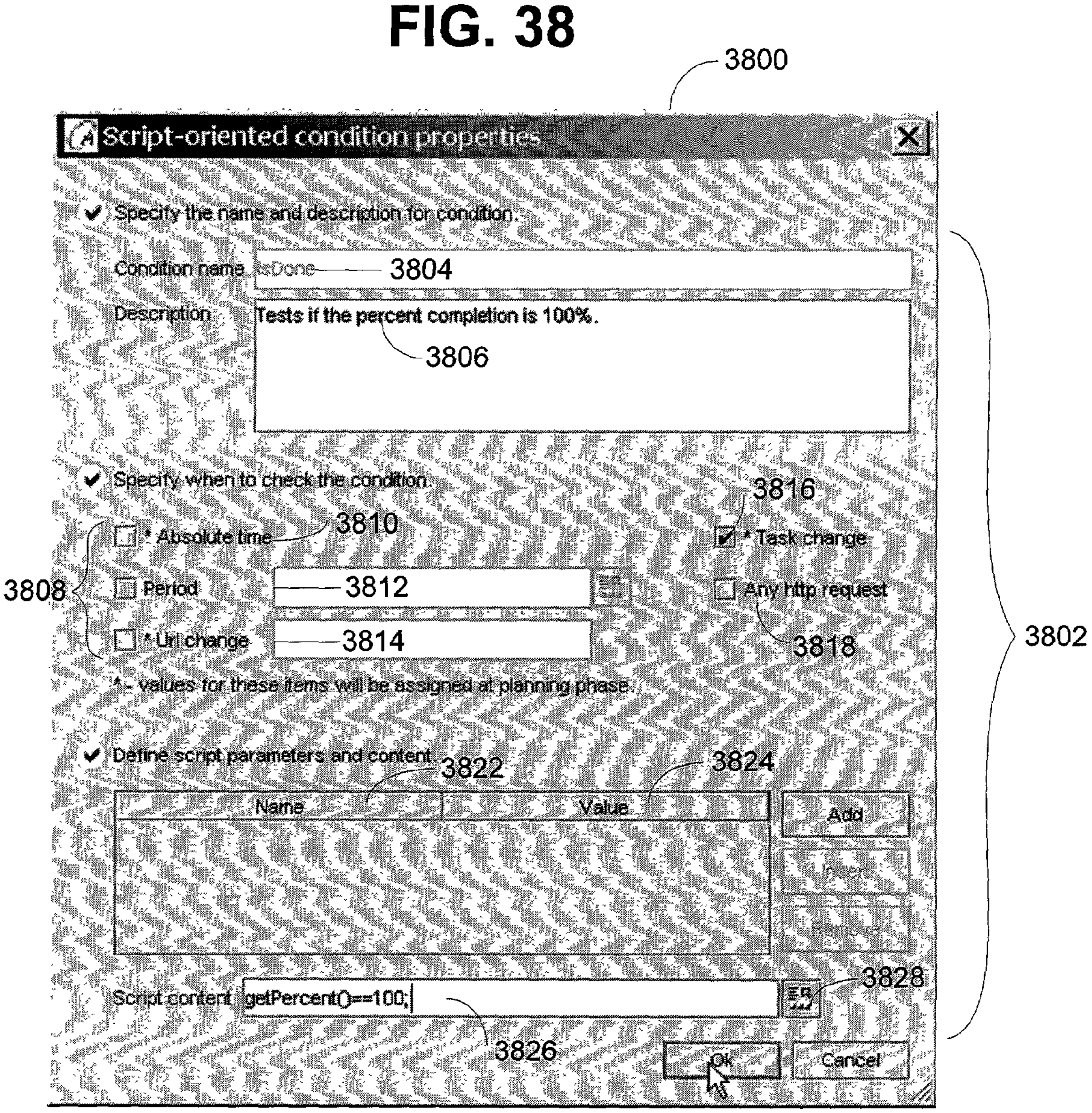
FIG. 38 depicts an exemplary user interface of the tool of FIG. 2 used to enter condition properties for a script-oriented artifact.

FIG. 38 depicts an exemplary user interface 3800 displayed by the Client Interface 134 to receive the condition properties 3802 for a logic-type condition model that is to be created by the Client Interface 134. The condition properties 3802 include a condition-name property 3804 for the document-type condition model. In the example shown in FIG. 38, the Client Interface 134 receives the condition-name property 3804 via a keyboard input by the enterprise affiliate. The Client Interface 134 uses the condition-name property 3804 to distinguish the logic-type condition model to be created from other condition models stored on WebDAV Storage 142. As described below, the Client Interface 134 stores a logic-type condition model file on WebDAV Storage 142 that has the same name as condition-name property 3804. In another implementation, the Client Interface 134 may also store condition-name property 3804 as a WebDAV property stored in association with the logic-type condition model file on WebDAV Storage 142.

In the example shown in FIG. 38, the Client Interface 134 may receive a description property 3806 as one of the Condition properties 3802 for the logic-type condition model to be created by the Client Interface 134. When creating a workflow as described below, the Client Interface 134 may display the description property 3806 in association with the condition-name property 3804 to allow an enterprise affiliate to effectively choose whether the logic-type condition model should be assigned to an activity of the workflow.

The Client Interface 134 may also receive one or more triggering-event properties 3808 for the logic-type condition model as one of the condition properties 3802 for the logic-type condition model to be created by the Client Interface 134. Triggering-event properties 3808 indicate to the Workflow Engine 222 when to check an entry or exit condition of an activated task. Triggering-event properties 3808 include: an "Absolute time" event 3810, a "Period" event 3812, a "URL change" event 3814, a "Task change" event 3816, and "any http request" event 3818. "Absolute time" event 3810 identifies a trigger for a specific data and time from the start time of the activated task. "Period" event 3812 identifies a trigger for a specific unit of time, such as once every minute. "URL change" event 3814 identifies a trigger when the contents of the directory or folder located at the URL changes. "Task change" event 3816 identifies a trigger for any time the activated task definition file or associated property changes. For example, when an enterprise affiliate that is responsible for the task uses the Client Interface 134 to identify that the task is complete, the Client Interface 134 in response sends a request to the WebDAV Server 140 to set the status property of the activated task to "FINISHED." As part of the processing for managing an activated plan as described below, the Workflow Engine 222 will receive this request before the WebDAV Server 140 and interpret the request as an example of a "Task change" event 3816. Similarly, "Any http request" event 3818 indicates to the Workflow Engine 222 to check the entry or exit condition of the activated task when any request is received from the Client Interface 134 that pertains to the activated task. For example, the Client Interface 134 may send a request to the WebDAV Server 140 to retrieve the activated task file so that a status of the activated task can be viewed by an enterprise affiliate. Workflow Engine 222 will receive this request before the WebDAV Server 140 and interpret the request as an example of an "Any http request" event 3818.

Figure 39:
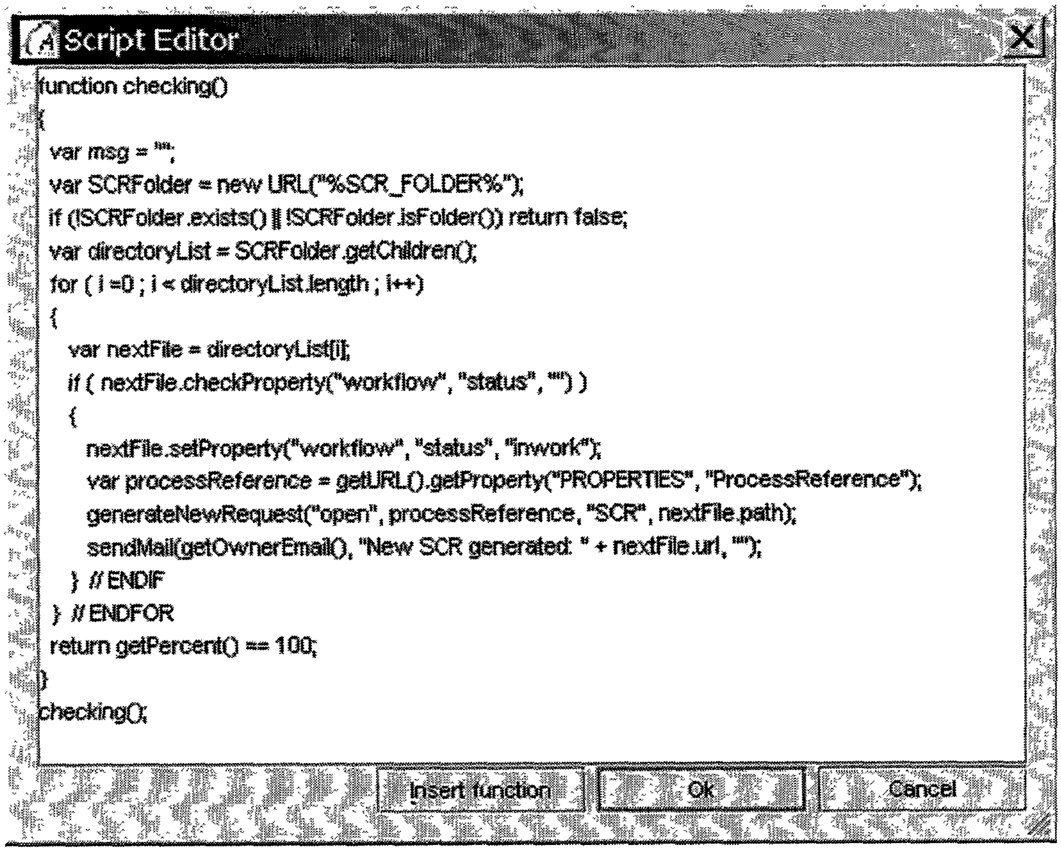
FIG. 39 depicts an exemplary user interface of a script editor for the tool of FIG. 2.

The Client Interface 134 may also receive a script 3820 as one of the condition properties 3802 for the logic-type condition model to be created by the Client Interface 134. Script 3820 is executed by the Workflow Engine 222 when a triggering-event occurs that corresponds to one of the triggering-event properties 3808 selected by the enterprise user using the Client Interface 134. As shown in FIG. 38, Script 3820 may include a script parameter 3822, a script value 3824 for script parameter 3822, and script content 3826 that may use the script parameter 3822 initialized to the script value 3824. The enterprise affiliate may provide the script content 3826 to the Client Interface 134 via a Script Editor User Interface 3900 in FIG. 39. Script Editor User Interface 3900 is displayed by the Client Interface 134 when the enterprise affiliate actuates button 3828 on user interface 3800 shown in FIG. 38. Script content 3820 may contain any known application program interface (API) script method that would be recognizable by the target processor interpreter on computer 106, such as Java™ Virtual Machine 150 in FIG. 1.

After checking for any output conditions and/or receiving the output conditions, the tool 200 determines whether there are any more activities to add to the workflow (step 2852). If there are more activities, the process continues at step 2822 for the next activity. If there are no more activities to add to the workflow, the tool 200 receives an indication of the starting point for the workflow (step 2854). Next, the tool 200 receives an indication of the ending point for the workflow (step 2856) before the process ends.

Figure 40:
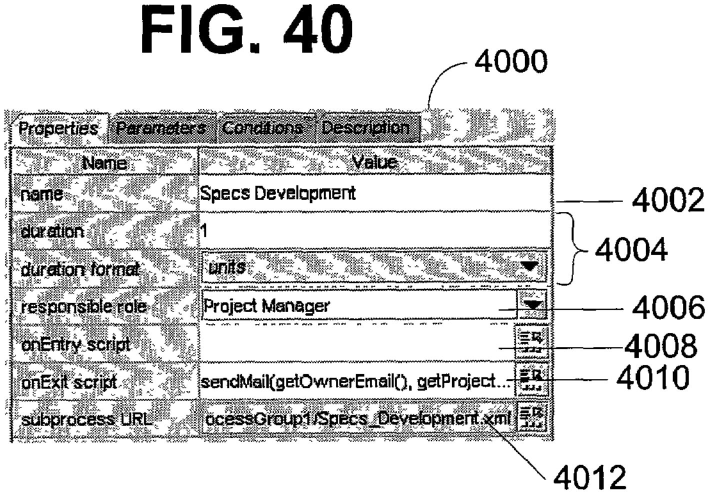
FIG. 40 depicts an exemplary user interface of the tool of FIG. 2 used to modify the properties of a workflow activity.

FIG. 40 depicts an exemplary user interface 4000 displayed by the Client Interface 134 to receive the properties of an activity of a workflow. As depicted, the name 4002 of the activity (e.g., "Specs Development"), the duration 4004 of the activity (e.g., 1 unit) and the role 4006 responsible for the activity may be entered by the enterprise affiliate responsible for creating or modifying the workflow. In addition, the enterprise affiliate may enter an on-entry script 4008 as well as an on-exit script 4010. If the activity represents an entire other workflow, the properties of the activity also include the location 4012 of the sub-process defining the workflow. This allows an enterprise to save significant resources by providing a mechanism for reusing workflows within other workflows. Thus, workflows may be modularly built from constituent workflows. For example, the defect tracking workflow depicted in FIG. 34 can be used inside many "outer" or "higher-level" processes for software development.

Creating a Plan From Workflow

Figure 41A:
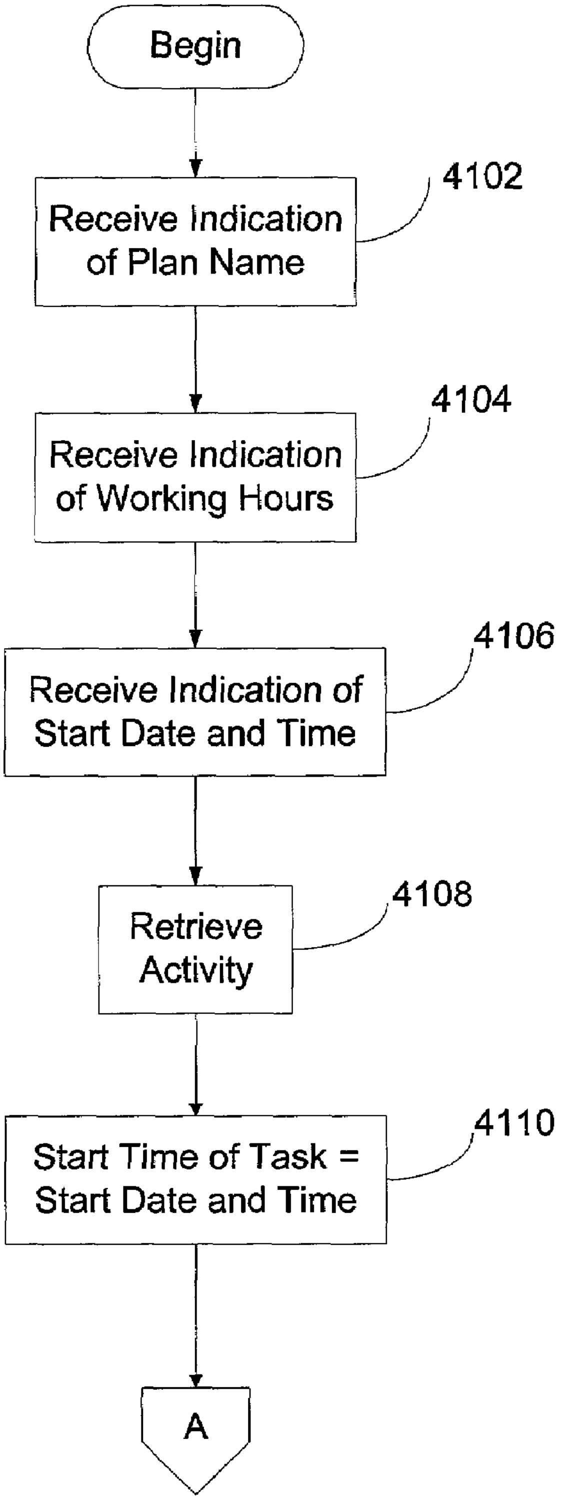
FIGS. 41A and B depict a flow diagram illustrating the creation of a plan from a workflow.
Figure 41B:
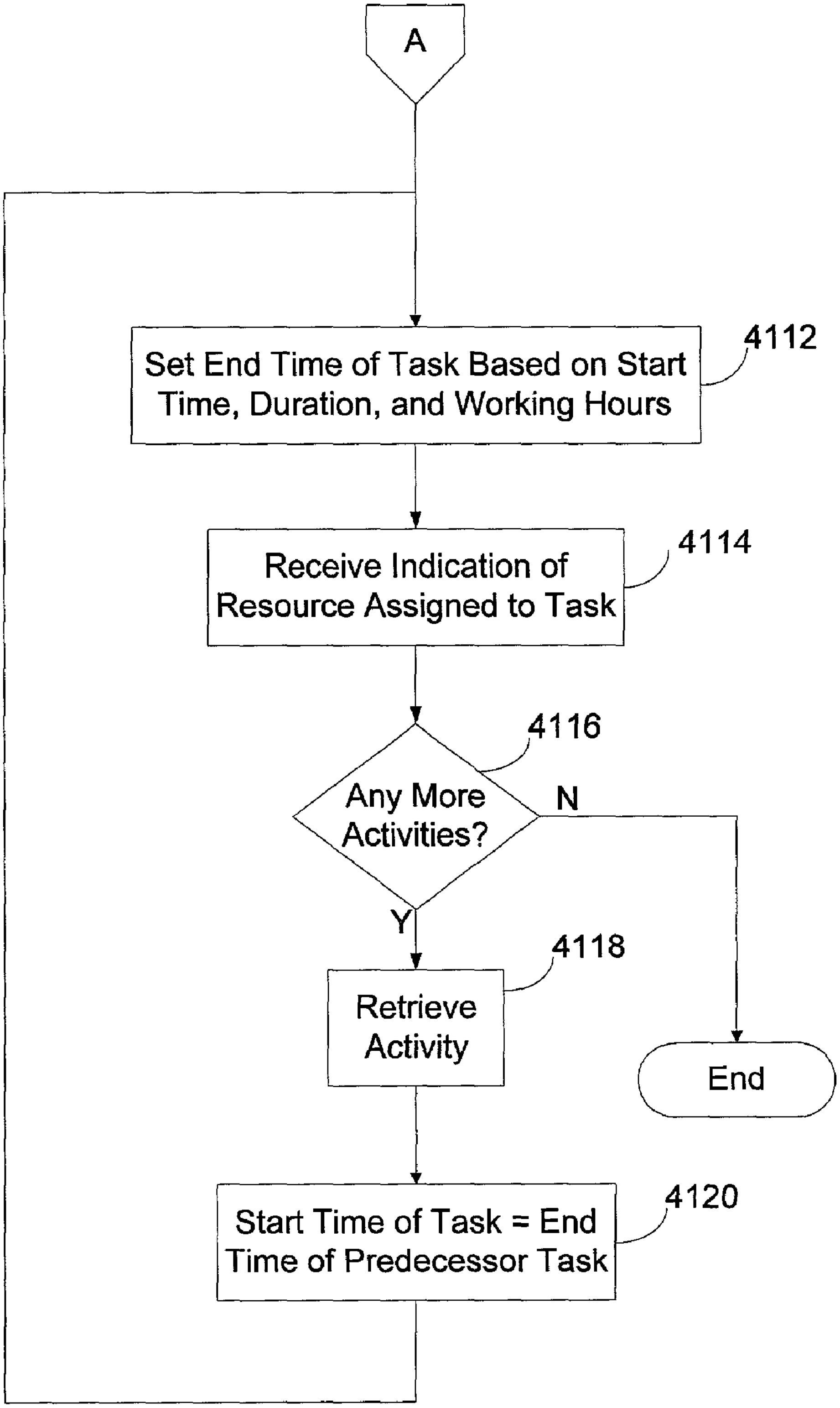
Figure 42:
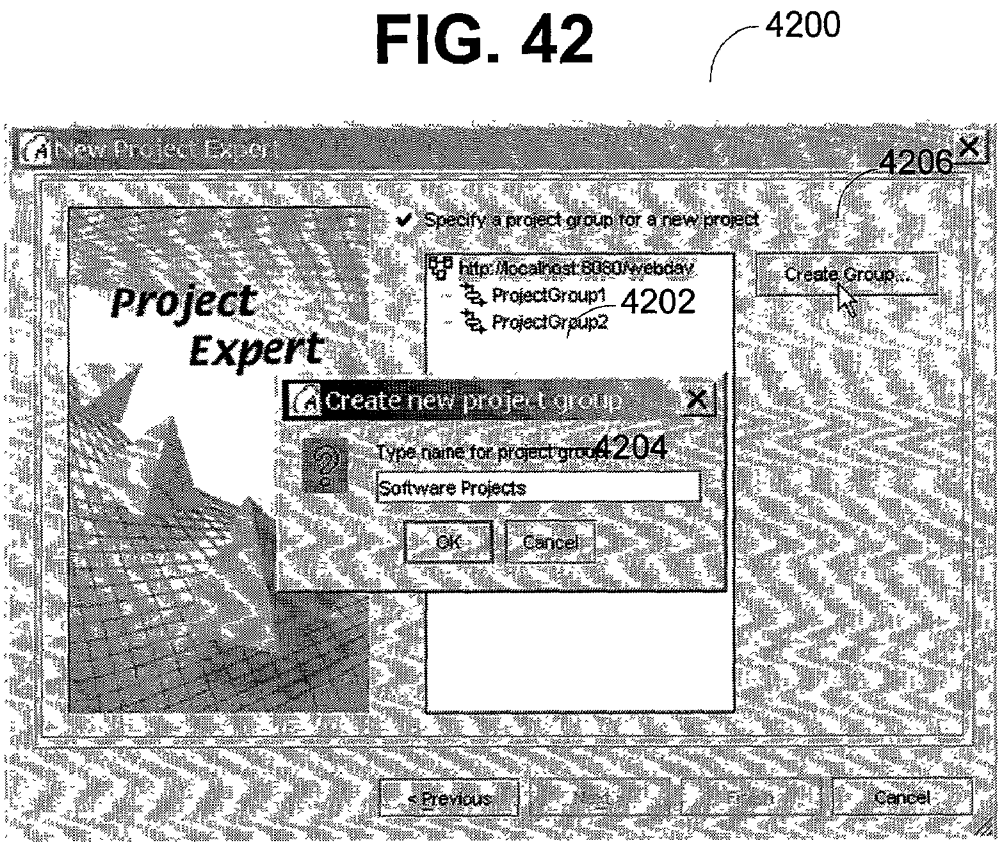
FIG. 42 depicts an exemplary user interface of the tool of FIG. 2 used to create a new plan group.

FIGS. 41A–B depict a flow diagram illustrating the process of creating a plan from a workflow, i.e., step 306 in FIG. 3. At this point, the enterprise affiliate has already selected the workflow that will be used to create the plan. Initially, the tool 200 receives an indication of the plan name (step 4102). In selecting the plan name, the Client Interface 134 allows the enterprise affiliate to store the project plan within an identified project plan group so that any enterprise affiliate using the Client Interface 134 is able to easily identify related project plans. A process plan group is a collection of project plans (e.g., a directory or folder containing the collection of project plans) created by the Client Interface 134 on WebDAV Storage 142. For example, the software-related project plans may be stored within the same project plan group so that an enterprise affiliate is able to quickly locate a desired project plan in order to create a corresponding plan using the Client Interface 134. One skilled in the art will appreciate that Client Interface 134 may store a project plan on WebDAV Storage 142 without associating the project plan with a project plan group. FIG. 42 depicts an exemplary user interface 4200 used to receive a project plan group.

Figure 43:
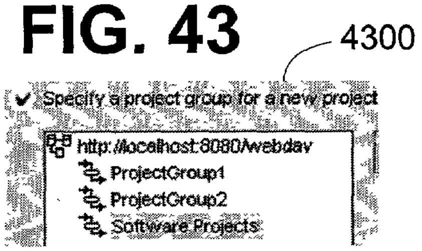
FIG. 43 depicts an exemplary user interface of the tool of FIG. 2 displaying the available plan groups.
Figure 44:
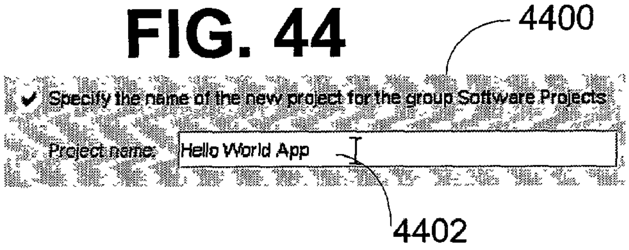
FIG. 44 depicts an exemplary user interface of the tool of FIG. 2 used to enter a plan name.

In the implementation shown in FIG. 42, the Client Interface 134 receives a dialog box 4202 to enter the name of a new project plan group 4204 (e.g., "Software Projects") after clicking on a "Create Group" button 4206. Alternatively, if the enterprise affiliate decides to select an existing project plan group, the tool 200 provides the enterprise affiliate with a list 4300 of available project groups from which the enterprise affiliate may choose, as depicted in FIG. 43. The tool 200 then provides the enterprise affiliate with a dialog box 4400 to enter the name 4402 of the project, as shown in FIG. 44.

Figure 45:
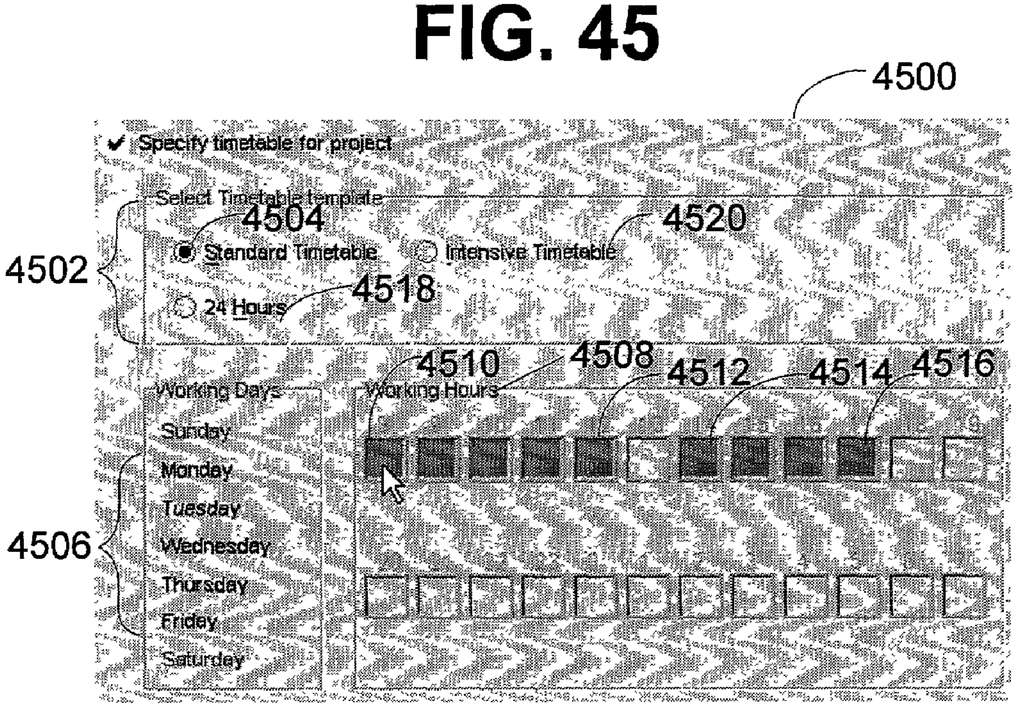
FIG. 45 depicts an exemplary user interface of the tool of FIG. 2 used to enter the working schedule.
Figure 46:
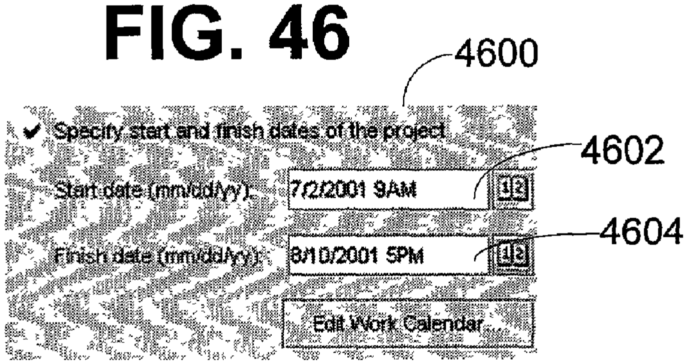
FIG. 46 depicts an exemplary user interface of the tool of FIG. 2 used to enter the scheduled start and end times for the plan.

The next step performed by the tool 200 is to receive an indication of the working hours (step 4104). FIG. 45 depicts an exemplary timetable 4500 which the enterprise affiliate may use to identify the timetable defining a workday. As shown, the enterprise affiliate may select a timetable template 4502 with predefined working hours. The Standard Timetable 4504 includes five Working Days 4506 (Monday through Friday) and Working Hours 4508 from 8 a.m. (4510) through 12 p.m. (4512) and from 1 p.m. (4514) until 5 p.m. (4516). Alternatively, the enterprise affiliate may select a 24 Hour Timetable 4518 or an Intensive Timetable 4520, i.e., more than the Standard Timetable 4504, but less than the 24 Hour Timetable 4518. The tool 200 also receives an indication of the start date and time for the project plan (step 4106). An exemplary dialog box 4600 may be used to select the start date and time 4602 and end date and time 4604.

The tool 200 then retrieves an activity from the workflow (step 4108). The tool 200 sets the start time of the task equal to the start date and time of the project plan (step 4110). Next, the tool 200 sets the end time of the task based on the start time of the task, the duration of the activity from which the task is based, and on the working hours (step 4112 in FIG. 41B). The tool 200 then receives an indication of the resource assigned to the task (step 4114).

For example, FIG. 47 depicts an exemplary workflow definition file 4700 that is produced by the tool 200 when the workflow 500 depicted in FIG. 5 is created. FIG. 48 depicts an exemplary project plan definition file 4800 created from the workflow definition file 4700. The element 4702 in the workflow definition file 4700 represents the "Serial 1" activity 506. As shown, the "Serial 1" activity 506 has a duration 4704 of 9 hours. If the working hours are determined based on the "24 Hour Timetable" 4818 and the start date and time for the project plan is 9 a.m. on Aug. 1, 2001, the start time 4804 for the "Serial 1" task 4802 is 9 a.m. on Aug. 1, 2001. The end time 4806 of the task 4802 occurs 9 hours later, i.e., at 6 p.m. on Aug. 1, 2001.

Figure 49:
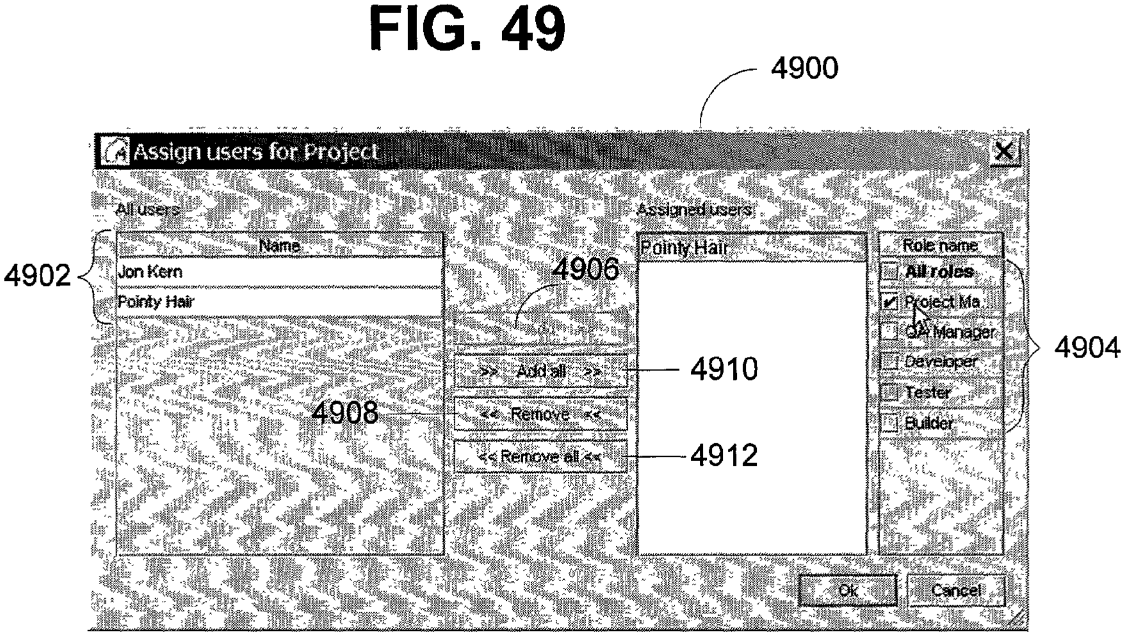
FIG. 49 depicts an exemplary user interface of the tool of FIG. 2 used to assign users to a plan.

FIG. 49 depicts an exemplary user interface 4900 displayed by the Client Interface 134 to assign users or resources to the project and to assign these users specific roles related to the roles required by the project. The tool 200 displays a list of available users or resources 4902 (on the left), a list of the assigned users (central), and a list of the roles 4904 (on the right) in a given workflow. In this embodiment, the enterprise affiliate is allowed to selectively add or remove available resources to the project by highlighting the resource and selecting either the "Add" button 4906 or the "Remove" button 4908, respectively. Alternatively, the enterprise affiliate may add or remove the resources to the project by selecting the "Add all" button 4910 or the "Remove all" 4912 button, respectively. For each resource, the user can selectively indicate (checkboxes) which roles the user should play. Thus, the enterprise affiliate may identify to the tool 200 resources that are capable of performing the role when assigned to a task in the plan. As discussed below, the tool 200 may automatically assign a resource to a role of a task in the plan based on the identified, capable resources for the role.

Figure 50:
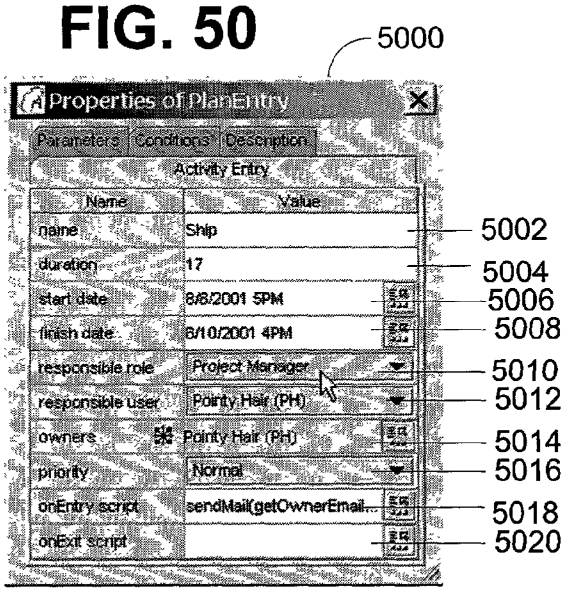
FIG. 50 depicts an exemplary user interface of the tool of FIG. 2 used to edit the properties of a plan.

The properties of an activity may be modified using the exemplary user interface 5000 depicted in FIG. 50. The user interface 5000 displays the name 5002 of the activity, the duration 5004 assigned to the corresponding activity, the start date and time 5006 for the activity, the end date and time 5008 for the activity, the responsible role 5010 assigned to the corresponding activity, the responsible resource or user 5012 assigned to the task, the owners 5014 of the task, the priority 5016 of the task, the on-entry script 5018 of the task, and the on-exit script 5020 of the task. The responsible resource 5012 of the task is the resource with the authority to notify the tool 200 when the task is complete. The owner(s) 5014 of the task, on the other hand, are notified when the task is started or completed, but do not have the authority to modify the tool 200 when the task is complete.

The next step performed by the tool 200 is to determine whether there are any more activities in the workflow (step 4116). If there are no more activities, the process ends. If there are more activities, the tool 200 retrieves the next activity (step 4118). The tool 200 then sets the start time of the task equal to the end time of the predecessor task (step 4120). The process then continues at step 4112.

Figure 51:
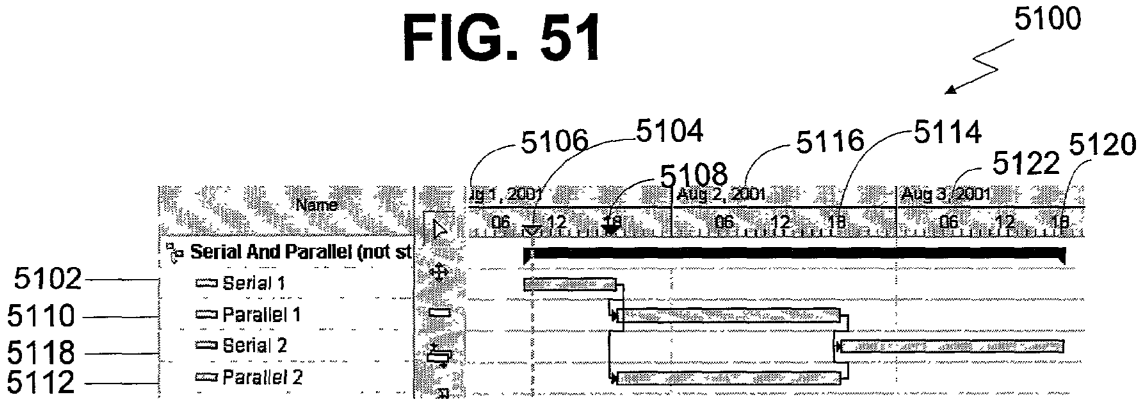
FIG. 51 depicts a timeline of the task created from the workflow of FIG. 5.

The next activities that are retrieved by the tool 200 are "Parallel 1" 510 and "Parallel 2" 512. Element 4706 and element 4708 in the workflow definition file 4700 represent these activities 510 and 512. The durations 4710 and 4712 of both of these activities is 24 hours. The start time 4812 and 4814 of these tasks 4808 and 4810 is equal to the end time 4806 of the predecessor task, i.e., 6 p.m. on Aug. 1, 2001. Because the duration 4710 and 4712 of the activities 510 and 512 is 24 hours, the end times 4816 and 4818 of these tasks 4808 and 4810 occur 24 hours later, i.e., at 6 p.m. on Aug. 2, 2001. The next activity retrieved by the tool 200 is "Serial 2" 508. The element 4714 in the workflow definition file 4700 represents this activity. The duration 4716 of the "Serial 2" activity 508 is 24 hours. The start time 4822 of the task 4820 created from the "Serial 2" activity 508 is the end time 4816 and 4818 of the predecessor task, i.e., 6 p.m. on Aug. 2, 2001. Because the duration 4716 of the "Serial 1" activity is 24 hours, the end time 4824 of the task 4820 is 6 p.m. on Aug. 3, 2001. The project plan is displayed in the Gantt chart 5100 depicted in FIG. 51. As shown, the "Serial 1" task 5102 is scheduled to execute from 9 a.m. 5104 on Aug. 1, 2001 (5106) through 6 p.m. 5108 on the same day. The "Parallel 1" task 5110 and the "Parallel 2" task 5112 are scheduled to execute from 6 p.m. 5108 on Aug. 1, 2001 (5106) through 6 p.m. 5114 on Aug. 2, 2001 (5116). Finally, the "Serial 1" task 5118 is scheduled to execute from 6 p.m. 5114 on Aug. 2, 2001 (5116) through 6 p.m. 5120 on Aug. 3, 2001 (5122). Note that an enterprise affiliate using the Client Interface 134 on the computer 102*a* may create a plan from the workflow 600 at the same time that a second enterprise affiliate using the Client Interface 134 on computer 102*n* creates a second plan from the workflow 600.

Figure 52:
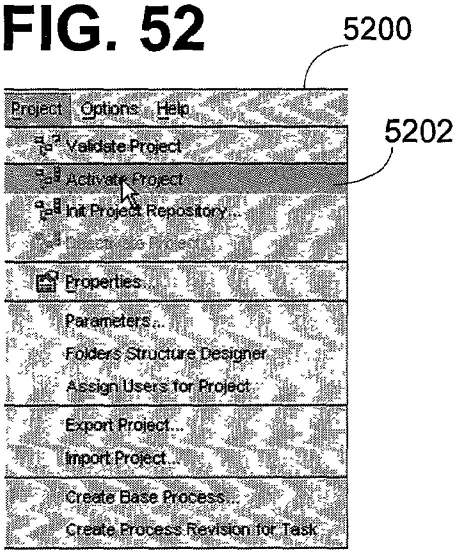
FIG. 52 depicts an exemplary timeline of the tool of FIG. 2 used to activate a plan.

After the project plan is created from the workflow, the plan may be activated. As depicted in FIG. 52, the enterprise affiliate may activate the project by selecting the "Activate Project" option 5202 from the pull-down menu 5200. The enterprise affiliate may, however, use any known data input technique, such as an icon or keyboard input, to indicate the request to Client Interface 134.

In one implementation, the Client Interface 134 then sends an activate request to the WebDAV server 140 to change the status of the plan definition file to "Active." As discussed further below, the Workflow Engine 222 may intercept this request and process the request in preparation for managing the execution of the activated plan. Once the plan is created and stored on WebDAV storage 142, any enterprise affiliate with appropriate privileges (e.g., project manager that "owns" the plan) may activate the plan using the Client Interface 134 from any computer 102*a* and 102*n*.

Adding a Resource

Figure 53:
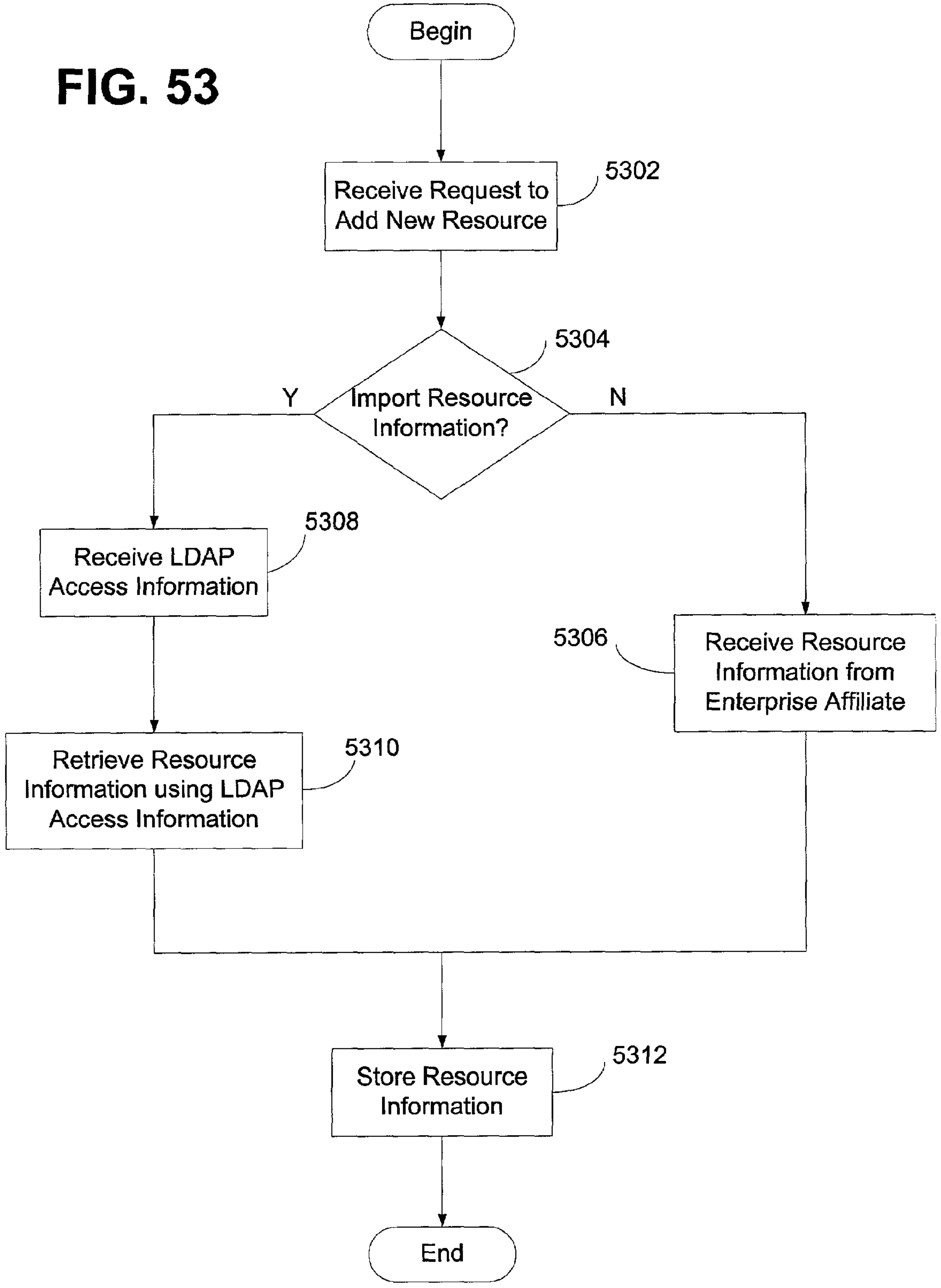
FIG. 53 depicts a flow diagram illustrating the addition of a resource by the tool of FIG. 2.
Figure 54:
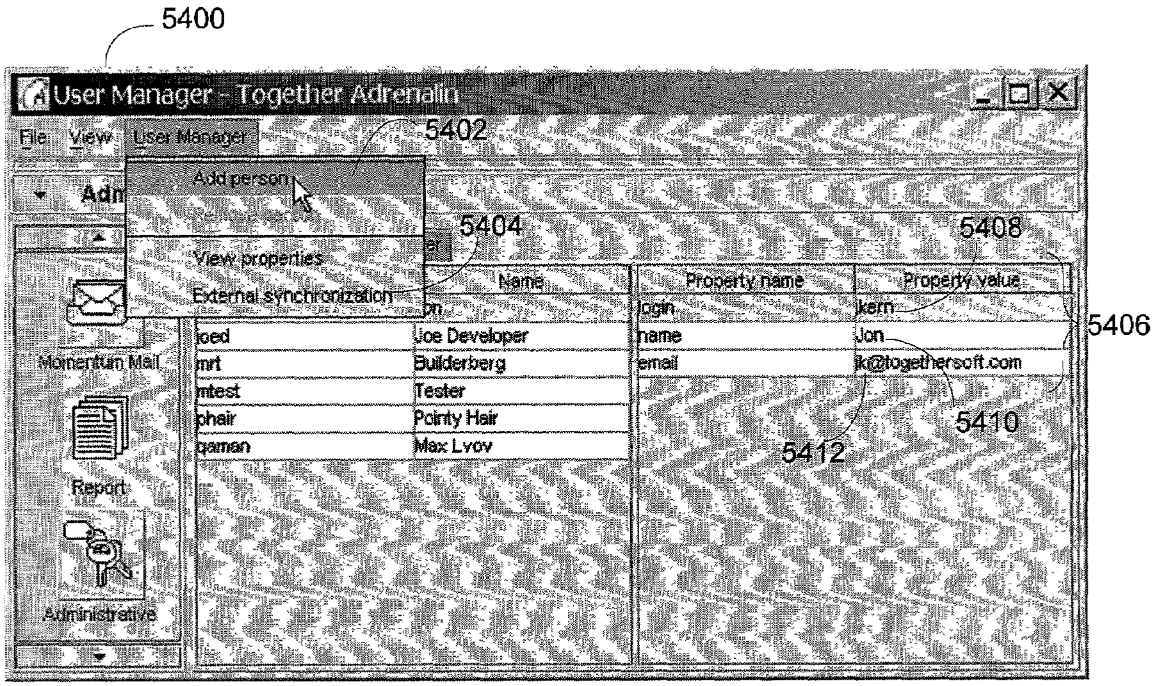
FIG. 54 depicts an exemplary user interface of the tool of FIG. 2 used to add a resource.

FIG. 53 depicts a flow diagram illustrating an exemplary process performed by the Client Interface 134 to add a new resource to the list of available resources. The Client Interface 134 may later assign the resource to a plan in accordance with methods and systems consistent with the present invention. Initially, the Client Interface 134 receives a request to add a new resource (step 5302). As shown in FIG. 54, the Client Interface 134 may receive the request to add a new resource via a pull-down menu selection 5402 and 5404 that is chosen by an enterprise affiliate. The enterprise affiliate may, however, use any known data input technique, such as an icon or keyboard input, to indicate the request to the Client Interface 134.

Next, the Client Interface 134 determines whether the request is to import the resource information (step 5304). In the implementation shown in FIG. 54, an enterprise affiliate requests that the Client Interface 134 import a resource profile containing the resource information by choosing the pull-down menu selection 5404. Alternatively, the enterprise affiliate may request that the Client Interface 134 create the resource profile from resource information that the enterprise affiliate provides to the Client Interface 134. Thus, if the request is not to import the resource information, the Client Interface 134 receives the resource information from the enterprise affiliate (step 5306). As shown in FIG. 54, the Client Interface 134 may receive resource information 5404 for an enterprise affiliate (e.g., a user or person) that may later be assigned to a plan by the Client Interface 134 in accordance with processes described in greater detail below. The Resource Information 5404 may include a login name 5408, a resource name 5410 that the Client Interface 134 is to use when assigning the resource to a task of a plan, and an e-mail address 5412 that the Client Interface 134 or the Workflow Engine 222 may use to notify the resource of an assignment or another event.

The Client Interface 134 may also receive other resource information (not shown) for other types of resources (e.g., equipment, facilities, computer systems, or other known entities) that may be assigned to any task of a plan. The other resource information may include: a resource name that the Client Interface 134 is to use when assigning the resource to a task of a plan; a resource owner name that identifies a manager or other enterprise affiliate who is responsible for the named resource; and an e-mail address for the named resource owner, which the Client Interface 134 or the Workflow Engine 222 may notify when the named resource is assigned to a task or for another associated event.

Resource information 5404 may also include one or more skill identifiers that indicate one or more capabilities that a task of a plan may require for the task to be completed. Skill identifiers may include any foreseeable skill for the named resource, including a user, equipment, facilities, computer systems, or other known entities that may be assigned to any task of a plan. For example, when the named resource is an enterprise affiliate, the skill identifiers that may be identified for the enterprise affiliate may include: "Java programming," "architecture," or "carpentry." When the named resource is equipment, the skill identifiers may include "punch-press," "printing," or "Windows NT Operating System." Or, when the resource is another system, skills may involve the ability to execute specific functions (much like distributed or web services, "credit card validation," "shop for best air freight shipper prices"). Resource information 5404 may also include a skill strength (not shown) for each skill identifier. The skill strength may be used by the tool to differentiate one resource from another resource when matching a resource to a role of a task in a plan.

Resource information 5404 may also include an availability timetable (not shown) that indicates to the Client Interface 134 the calendar days, the hours in a weekday, and the hours in a weekend day that the named resource is available to work. Resource information 5404 may also include an assignment timetable (not shown) that has assigned calendar days. The assigned calendar days indicate to the Client Interface 134 which calendar days the named resource has been assigned to one or more tasks. In addition, the assignment timetable may include unique identifiers or URLs for the one or more tasks to which the named resource has been assigned. Thus, the Client Interface 134 or the Workflow Engine 222 may access the one or more tasks that the named resource has been assigned when performing processing for resource leveling of a plan in accordance with methods and systems consistent with the present invention.

Figure 55:
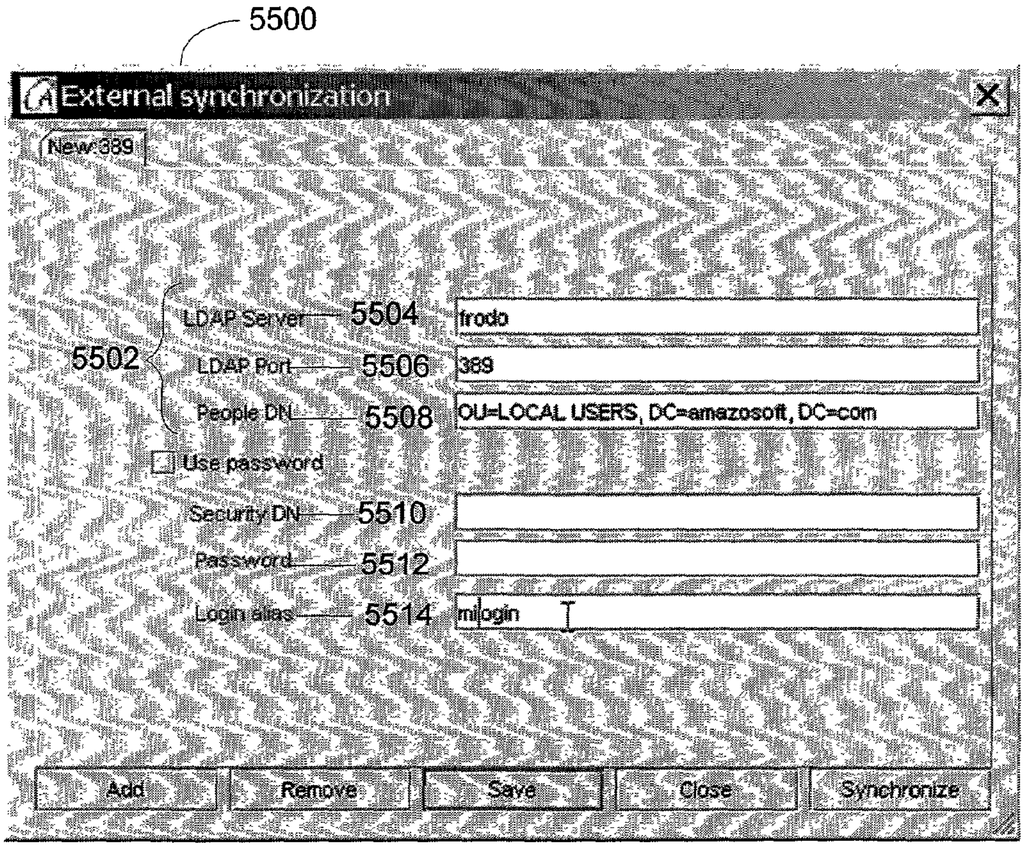
FIG. 55 depicts an exemplary user interface of the tool of FIG. 2 used to receive LDAP access information.

If the request is to import the resource information, the Client Interface 134 receives access information for a "Lightweight Directory Access Protocol (LDAP)" resource directory entry (e.g., a resource profile) on the network 108 of FIG. 1 (step 5308). FIG. 55 depicts an exemplary user interface 5500 showing access information 5502 received by the Client Interface 134. Access information 5502 includes an LDAP Server 5504 (e.g., "Frodo") on the network 108, an LDAP Port 5506 for the Client Interface 134 to communicate with the LDAP Server 5504, and a resource distinguished name (DN) 5508 identifying the location on LDAP Server 5504 where the resource profile may be found. The access information 5502 may be default access information that the Client Interface 134 retrieves from a configuration file (not shown) on the computer 102*a*, or it may be access information entered by an enterprise affiliate. In the implementation illustrated in FIG. 55, the access information 5502 may also include: a security distinguished name (DN) 5510, a password 5512, and a login alias 5514. Security DN 5510 identifies to the Client Interface 134 where a security profile for the enterprise affiliate is located. The Client Interface 134 uses the password 5512 and the login alias 5514 to access the resource information on the LDAP Server 5504 in accordance with privileges identified in the security profile.

Having received the access information for the LDAP directory entry on network 108, the Client Interface 134 retrieves the resource information using the LDAP access information (step 5310). The resource information that the Client Interface 134 retrieves includes resource profiles for a user, equipment, facilities, computer systems, or other known entities that may be assigned to any task of a plan.

After the resource information is received from the enterprise affiliate or is retrieved using LDAP access information, the Client Interface 134 stores the resource information in resource profiles on the WebDAV Storage 142 (step 5312).

FIG. 56 depicts an exemplary resource file 5600 that the Client Interface 134 may use to store resource profiles 5602, 5604, 5606, and 5608 on WebDAV Storage 142. As shown in FIG. 56, the resource profile 5600 includes a unique identifier or URL 5612 where the resource profile 5600 is to be stored on the WebDAV Storage 142. Each resource profile 5602, 5604, 5606, and 5608 may be stored separately by the Client Interface 134 on WebDAV Storage 142. In the implementation shown in FIG. 56, the resource profile 5602 includes resource information 5610 that corresponds to an enterprise affiliate that may be assigned to a task of a plan. In another implementation, the resource information 5610 may be added as properties rather than as the content of the resource profile 5602 on WebDAV Storage 142. This implementation may be advantageous as the Client Interface 134 or the Workflow Engine 222 may use a known WebDAV method to retrieve resource profiles from the WebDAV Storage 142 that have the same property. For example, the WebDAV "PropFind" method may be used by the Client Interface 134 or the Workflow Engine 222 to retrieve the resource profiles having a skill identifier of "Java Programming" so that an available resource having this skill can be assigned to a task in accordance with processes described below.

Managing a Plan

Figure 57A:
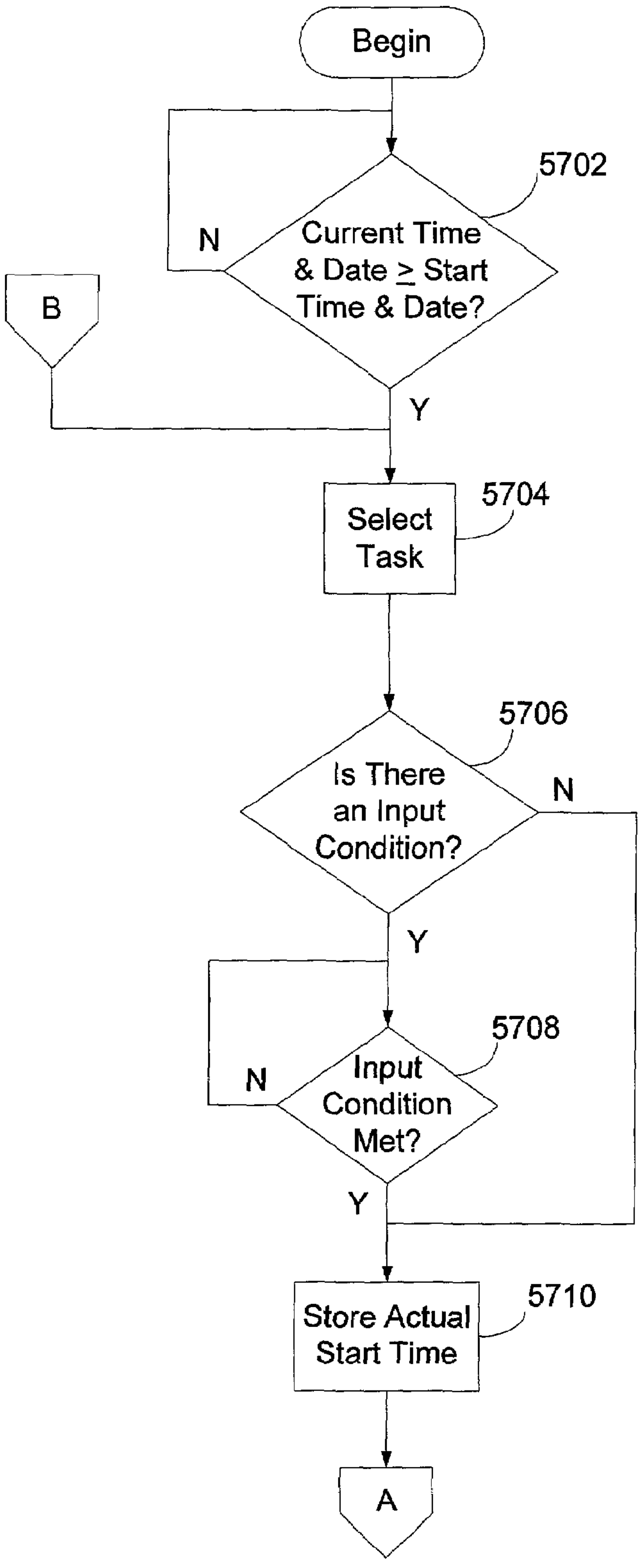
FIG. 57 depicts a flow diagram illustrating the management of an activated plan.
Figure 57B:
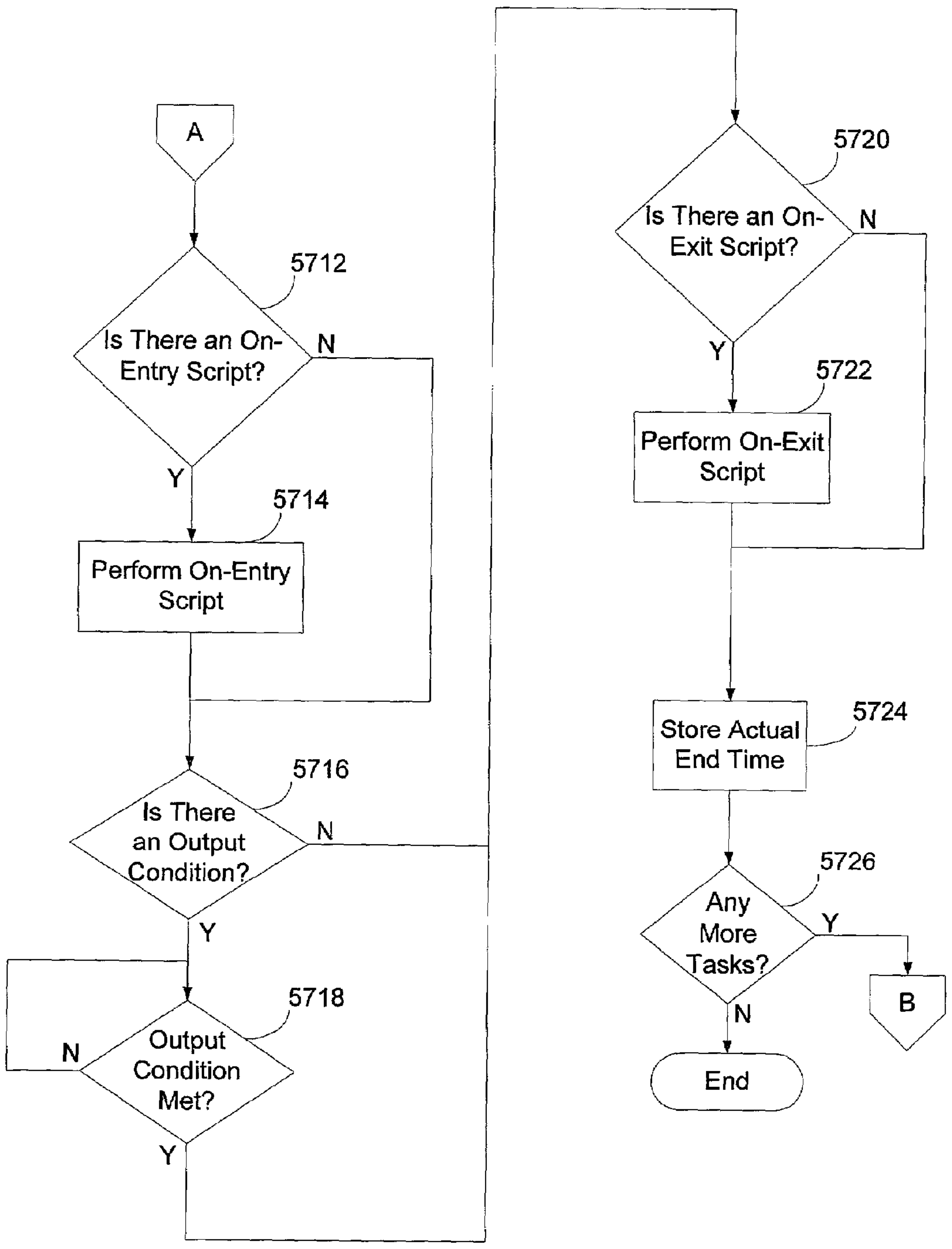

FIG. 57 depicts a flow diagram illustrating an exemplary process performed by the Workflow Engine 222 to manage the execution of an activated plan. The Workflow Engine 222 may execute the process in FIG. 57 for each activated plan stored on WebDAV Storage 142. Thus, the tool manages the execution of multiple plans simultaneously.

Initially, the tool 200 waits until the current time and date are later than the start time and date (step 5702) of the plan. Alternatively, a plan may not require a start time and date for each plan. Rather, the start time and date may be incorporated as an input condition for each task. At this point, the tool 200 selects the current next task (or tasks in the event of parallel tasks) from the activated project plan created from a workflow (step 5704). Note that the Workflow Engine 222 may retrieve the plan from WebDAV storage. Next, the tool 200 determines whether there is an input condition (step 5706). If there is an input condition, the tool 200 waits to see if the triggering event (described above) is met before it checks to see if the input condition is met (step 5708). If the input condition required monitoring of certain items on a periodic basis, the Workflow Engine 222 will add this event to its "Event Monitoring" log. After the input condition is met or if there is no input condition, the tool 200 stores the actual start time (step 5710). The next step performed by the tool 200 is to determine whether there is an on-entry script to execute, such as a message to send to the resource (step 5712 in FIG. 57B). If there is an on-entry script, the tool 200 performs the on-entry script (step 5714). After performing the on-entry script or if there is no on-entry script, the tool 200 determines whether there is an output condition (step 5716). If there is an output condition, the tool 200 waits to see if the triggering event (described above) is met before it checks to see if the output condition is met (step 5718). After the output condition is met or if there is no output condition, the tool 200 determines whether there is an on-exit script (step 5720). If there is an on-exit script, the tool 200 performs the on-exit script (step 5722). After performing the on-exit script or if there is no on-exit script, the tool 200 stores the actual end time (step 5724). Then the tool 200 determines whether there are any more tasks in the project plan (step 5726). If there are no more tasks, the process ends. Otherwise, the process returns to step 5704 and selects the next task.

Figure 58:
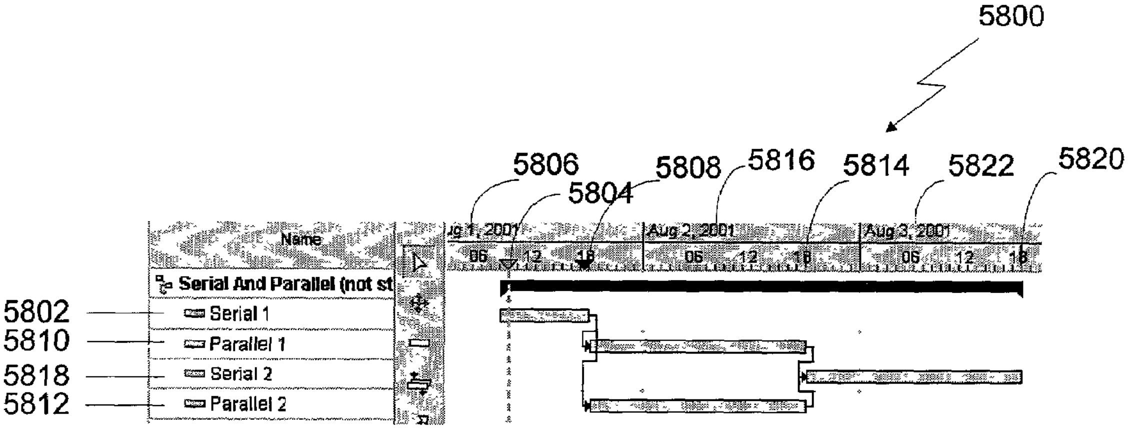
FIG. 58 depicts a timeline of the task created from the workflow of FIG. 5.

The plan 5800 created from the workflow 500 depicted in FIG. 5 is shown in FIG. 58. As shown in FIG. 58, "Serial 1" task 5802 is scheduled to begin at 9 a.m. 5804 on Aug. 1, 2001 (5806) and end at 6 p.m. 5808 on the same day. The parallel tasks 5810 and 5812 are scheduled to start at the completion of the "Serial 1" task 5808, and are scheduled to end at 6 p.m. 5814 on Aug. 2, 2001 (5816). The "Serial 2" task 5818 is scheduled to begin upon completion of the parallel tasks 5814 and is scheduled to end at 6 p.m. 5820 on Aug. 3, 2001 (5822). FIG. 59 depicts an exemplary project plan definition file 5900 corresponding to the plan 5800 of FIG. 58.

Upon activation, the "Serial 1" task 6002 begins execution, as depicted by the task 6004 in the Gantt chart 6000 of FIG. 60. Contrary to the plan, however, the "Serial 1" task ends earlier than planned. As depicted in FIG. 61, the actual properties 6100 of the "Serial 1" task 6102 include the actual-start-date 6104 (i.e., year—2001 month—8 day—1 hour—9) and actual-finish-date 6106 (i.e., year—2001 month—8 day—1 hour—14, i.e., 2 p.m.). The actual execution 6204 of the "Serial 1" task 6202 is shown in the Gantt chart 6200 of FIG. 62.

Because the "Serial 1" task 6202 ended earlier than planned, both the "Parallel 1" task 6206 and the "Parallel 2" task 6208 begin execution at 2 p.m. 6210 rather than waiting until their scheduled start time of 6 p.m. The earlier execution 6212 and 6214 of these tasks 6206 and 6208 is also depicted in the Gantt chart 6200. As depicted in FIG. 63, the actual properties 6300 of the "Parallel 1" task 6302 and the "Parallel 2" task 6304 include the actual-start-date 6306 (i.e., year—2001 month—8 day—1 hour—14) and actual-finish-date 6308 (i.e., year—2001 month—8 day—2 hour—0). The actual execution 6406 and 6408 of the "Parallel 1" task 6402 and the "Parallel 2" task 6404 is shown in the Gantt chart 6400 of FIG. 64. The Gantt chart 6400 also visually indicates that the start time 6410 for the tasks 6402 and 6404 was 2 p.m. on Aug. 1, 2001, while the end time 6412 for the tasks 6402 and 6404 was 12 a.m. on Aug. 2, 2001.

Figures 65, 66:
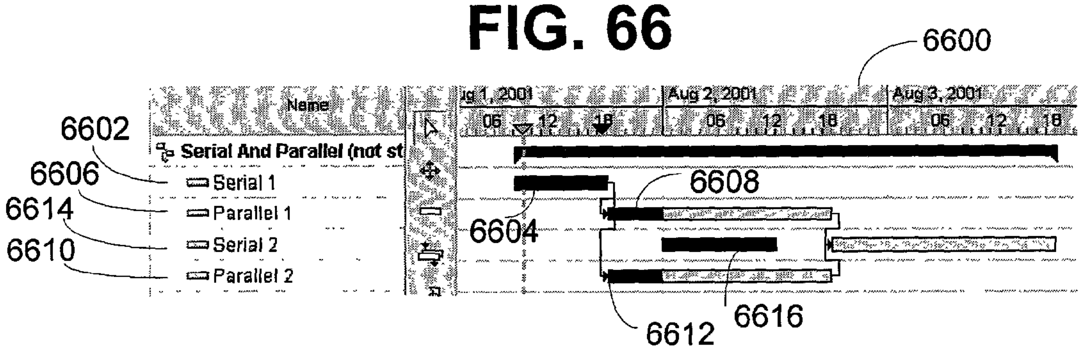

Finally, the execution of the "Serial 2" task 6414 begins at 12 a.m. on Aug. 2, 2001 (6412). As depicted in FIG. 65, the actual properties 6500 of the "Serial 2" task 6502 includes the actual-start-date 6504 (i.e., year—2001 month—8 day—2 hour—0) and actual-finish-date 6506 (i.e., year—2001 month—8 day—2 hour—12). The actual execution 6604 of the "Serial 1" task 6602, the actual execution 6608 of the "Parallel 1" task 6606, the actual execution 6612 of the "Parallel 2" task 6610, and the actual execution 6616 of the "Serial 2" task 6614, are shown in the Gantt chart 6600 of FIG. 66.

Auto-Instantiation of a Storage Hierarchy for a Plan Created from a Workflow

In addition to the functionality described above, the tool 200 in FIG. 2 allows an enterprise affiliate to increase the performance efficiency of the enterprise by enforcing an enterprise strategy or vision for storing artifacts (e.g., records, documents, or files) of a plan upon all enterprise affiliates that are involved in creating or using the artifacts during the execution of the plan. In particularly, the tool 200 allows the enterprise affiliate to define a storage hierarchy in association with a workflow that models a process, to generate a plan from the workflow that reflects an instance of the process, and to automatically generate container(s) in accordance with the storage hierarchy definition when the plan is generated from the workflow. The container(s) may be physical file folders on a local or network storage medium (e.g., second storage device 116, 118, or 120 in FIG. 1) or virtual file folders created on a network storage medium, such as WebDAV storage 142 in FIG. 2, using a virtual file system server, such as WebDAV server 140 in FIG. 2. Thus, for each plan that is generated from the workflow, the tool 200 is able to enforce the organizational strategy of the enterprise for storage of artifacts by generating a hierarchy of container(s) in accordance with the storage hierarchy definition. As a result, enterprise affiliates may move easily from participating in one project plan created from a workflow to a different plan created from the same workflow and still have a sense of familiarity with the organization of the artifacts of the different plan.

In general, the storage hierarchy definition may include one or more container identifications stored in a peer-to-peer or a subordinate-to-superior relationship within a file as indicated by the enterprise affiliate using the tool 200 in accordance with methods and systems consistent with the present invention as described below. The tool 200, when prompted by an enterprise affiliate to generate a plan from a workflow, automatically accesses the storage hierarchy definition file associated with the workflow to generate the container(s) for the plan in accordance with the storage hierarchy definition. Alternatively, the storage hierarchy definition may include a pointer (or other reference) to a set of containers organized in the peer-to-peer or subordinate-to-superior relationship as specified by the enterprise affiliate using the tool 200. In this implementation, the set of containers may serve as a template for the storage hierarchy definition associated with the workflow. The tool 200, when prompted by an enterprise affiliate in this implementation to generate a plan from a workflow, automatically accesses the pointer to locate the template for the storage hierarchy definition in order to generate the container(s) for the plan.

Figure 67A:
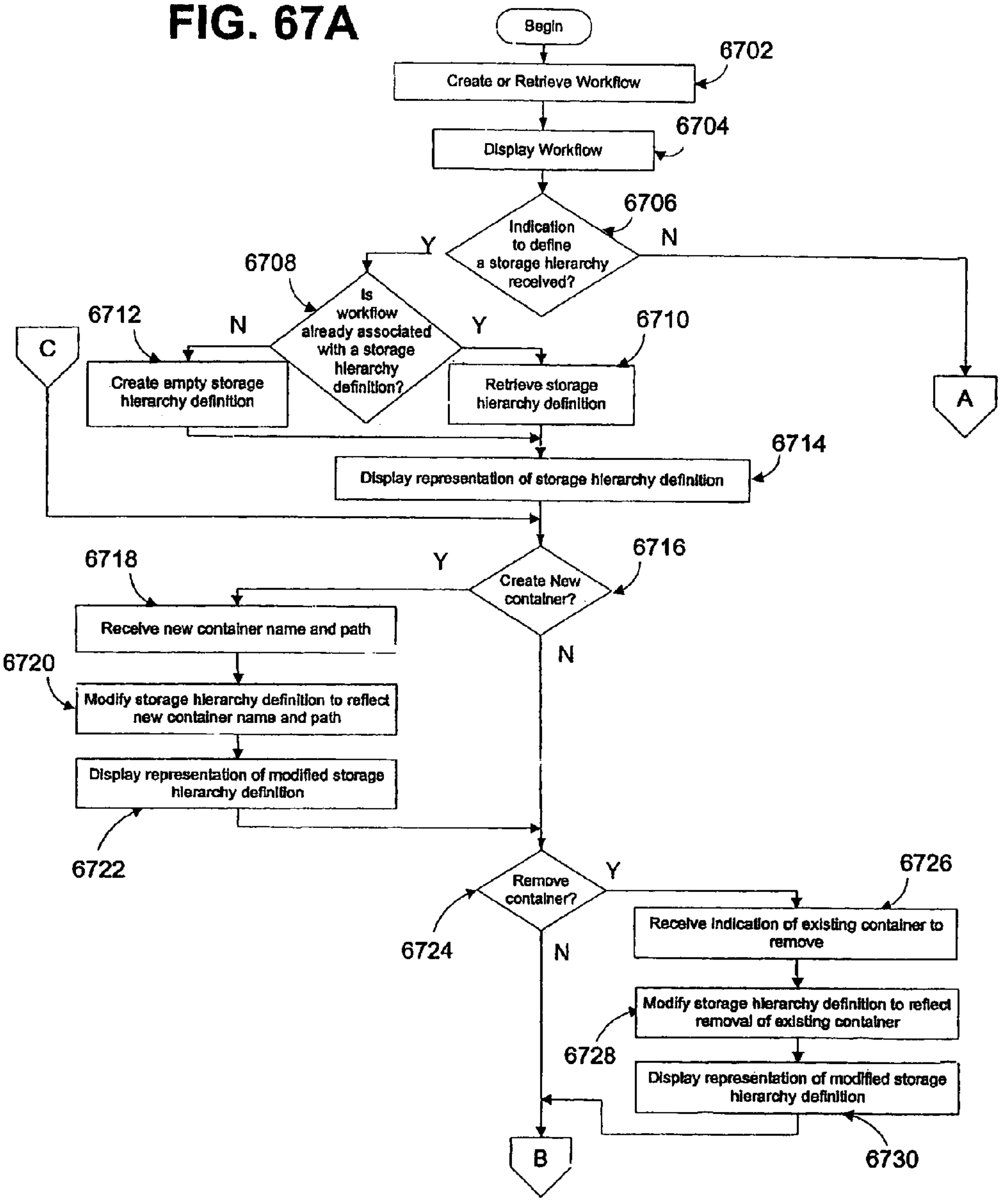
FIGS. 67A and B depict a flow diagram illustrating an exemplary process performed by the tool of FIG. 2 for defining a storage hierarchy in association with a workflow.
Figure 67B:
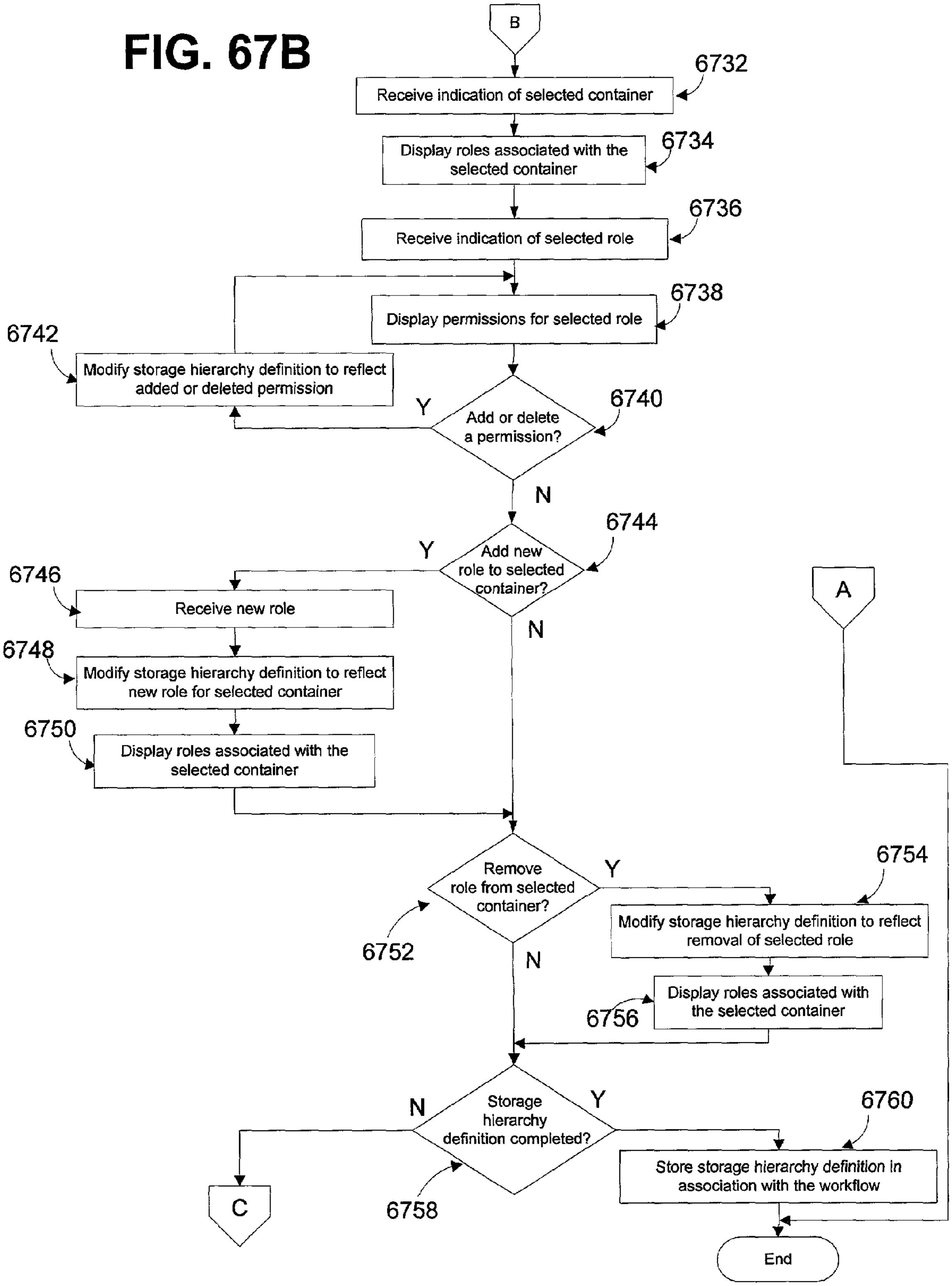
Figure 68:
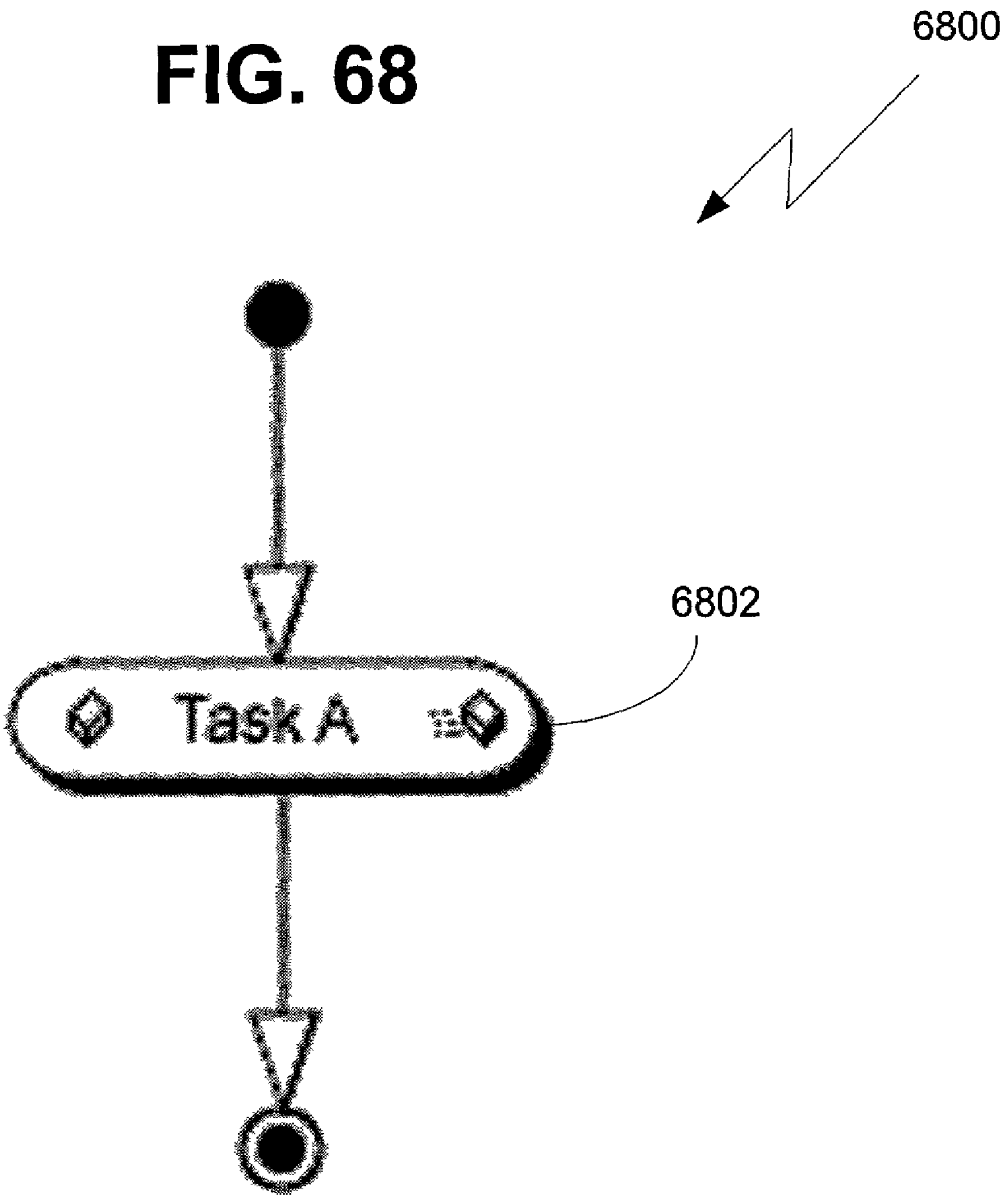
FIG. 68 depicts an exemplary workflow created or retrieved using the tool of FIG. 2.

FIGS. 67A–B depict a flow diagram illustrating an exemplary process performed by the tool 200 for defining a storage hierarchy in association with a workflow. Initially, the tool 200 creates or retrieves a workflow (step 6702). The tool 200 then displays the workflow (step 6704). The processing performed by the tool 200 for creating or retrieving a workflow is described above in reference to step 302 in FIG. 3 and further described in greater detail in reference to FIGS. 28A–C. FIG. 68 depicts an exemplary workflow 6800 that the enterprise affiliate may create or retrieve using the tool 200. The workflow 6800 includes an activity 6802 called "Task A." In accordance with methods and systems consistent with the present invention as discussed above, the tool 200 may generate a task for a plan from the activity 6802 of the workflow 6800. FIG. 69 depicts an exemplary workflow definition file 6900 that is produced by the tool 200 when the workflow 6800 depicted in FIG. 68 is created. The name 6902 of the workflow, "SampleForStorageHierarchy," is identified in the workflow definition file 6900. The element 6904 in the workflow definition file 6900 represents the "Task A" activity 6802 in FIG. 68. To define a storage hierarchy in association with the workflow 6800 using the tool 200, the enterprise affiliate need not have completed the creation of the workflow 6800. Thus, in this example, the tool 200 allows the enterprise affiliate to create activity 6802 in FIG. 68 and its corresponding element 6904 in the workflow definition file 6900 in FIG. 69 after defining a storage hierarchy to be associated with the workflow. This flexibility of the tool 200 advantageously allows the enterprise affiliate, such as a manager with knowledge of the enterprise strategy for organizing the storage of artifacts in association with a plan created from the workflow 6800, to define the storage hierarchy to be associated with the workflow 6800 before other affiliates complete the creation of the workflow 6800. The other affiliates may then use the tool 200 to create activities for the workflow 6800 with links to the storage hierarchy as described in greater detail below. Thus, the enterprise affiliate may use the tool 200 to define a storage hierarchy at any point during the creation of the workflow 6800 so long as the enterprise affiliate has identified the workflow 6800 to the tool 200 before the creation of a plan from the workflow 6800.

The next step performed by the tool 200 is to determine whether an indication to define a storage hierarchy has been received (step 6706). The enterprise affiliate may use any known data input technique, such as a pull-down menu or keyboard input (not shown in figures), to provide an indication to the tool 200 that a storage hierarchy is to be defined in association with the workflow 6800. If the tool 200 does not receive an indication to define a storage hierarchy, the process ends. While the enterprise affiliate may elect not to define a storage hierarchy to be associated with the workflow 6800, the tool 200 may still generate container(s) for a plan generated from the workflow 6800 in accordance with a default storage hierarchy definition as further explained below.

If the tool 200 receives an indication to define a storage hierarchy, the tool 200 then determines whether the workflow is already associated with a storage hierarchy definition (step 6708). In one implementation, the tool 200 searches for a storage hierarchy definition file stored in the same location as the workflow definition file 6900. In another implementation, the tool 200 may search for a storage hierarchy definition file that has the same name 6902, "Sample-ForStorageHierarchy," as the workflow definition file 6900 in FIG. 69 but that has a unique extension, such as ".sh." In this implementation, the storage hierarchy definition file may be located on any computer 102*a*, 102*n*, 104, or 106 of the data processing system 100. In yet another implementation, the tool 200 may search the workflow definition file 6900 in FIG. 69 for a URL 6906 designating the location of the associated storage hierarchy definition file on the data processing system 100. In still another implementation, the tool 200 may use the URL 6904 as a pointer to a root container of a hierarchy of containers that serves as a template for the storage hierarchy definition associated with the workflow 6800. In this implementation, the tool 200 replicates the hierarchy of containers for each plan created from the workflow 6800. The containers may be physical file folders stored on a network storage medium, such as secondary storage device 116, 118, or 120 of FIG. 1, or virtual file folders stored using a virtual file system server (e.g., WebDAV server 140 of FIG. 1) on a database system, such as WebDAV storage 142.

If the tool 200 determines that a storage hierarchy definition is already associated with the workflow, then the tool 200 retrieves the associated storage hierarchy definition (step 6710). If the tool 200 determines that a storage hierarchy definition is not already associated with the workflow, then the tool 200 creates an empty storage hierarchy definition (step 6712).

Figure 70:
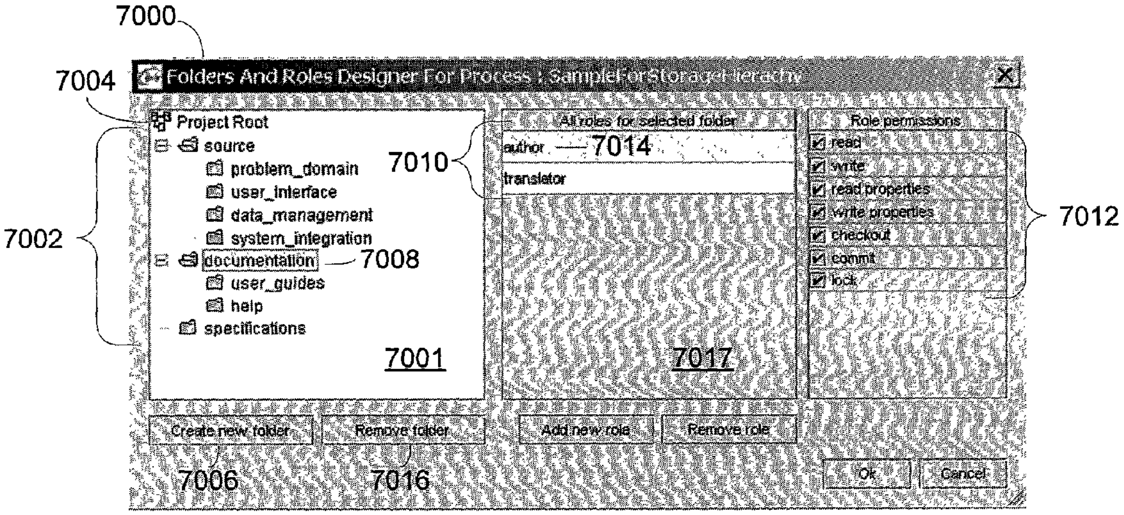
FIG. 70 depicts an exemplary user interface of the tool of FIG. 2 used to display and to edit a storage hierarchy definition associated with the workflow of FIG. 68.

Next, the tool 200 displays a representation of the empty or retrieved storage hierarchy definition (step 6714). FIG. 70 depicts an exemplary user interface 7000 of the tool 200 used to display a representation of the storage hierarchy definition associated with the workflow 6800. As shown in FIG. 70, the storage hierarchy definition may include one or more container identifications 7002 associated with the workflow 6800. Each of the container identifications 7002 represents a container that the tool 200 automatically creates for a plan created from the workflow 6800 to store artifacts used or produced by the plan. The tool 200 displays the container identification(s) 7002 in pane 7001 in the hierarchical relationship in which they have been defined by the enterprise affiliate using the tool 200.

The storage hierarchy definition may include roles 7010 associated with a selected container identification 7008 and permissions 7012 associated with a selected role 7014. As discussed above, the tool 200 (via Resource Manager Module 206 in FIG. 2) allows an enterprise affiliate to identify a role or role profile (representing a "capability" or "skill set") that may be assigned to an activity of the workflow and to identify a resource or user profile that may be associated with the role to indicate that the resource or user is capable of handling the role. As further discussed below, the tool 200 uses the role or roles associated with a container generated for a plan to manage access to the artifacts stored in the container.

Figure 71:
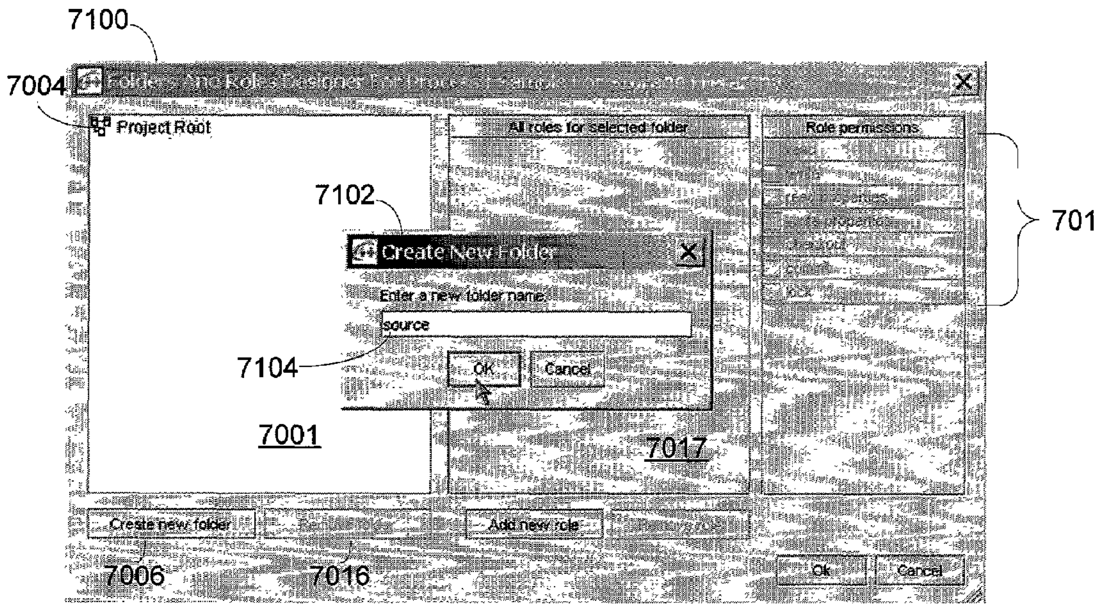
FIG. 71 depicts an exemplary user interface of the tool of FIG. 2 used to receive a new container identification for the storage hierarchy definition associated with the workflow of FIG. 68.

In the implementation shown in FIG. 70, the tool 200 displays container identifications 7002 under the root container 7004 ("Project Root") to indicate that the container(s) generated in accordance with the storage hierarchy definition for each plan created from the workflow 6800 are located subordinate to the same root container 7004 on the network storage medium (e.g., WebDAV storage 142 in FIG. 2). Thus, if multiple plans are created from the workflow 6800, an enterprise affiliate is able to locate and easily access artifacts from any of the multiple plans for quality control evaluation or for other purposes. For an empty storage hierarchy definition, the tool 200 may just display root container 7004 in pane 7001 as shown in FIG. 71 to indicate that containers have yet to be defined for the storage hierarchy associated with the workflow 6800.

The next step performed by the tool 200 is to determine whether to create a new container for the storage hierarchy associated with the workflow 6800 (step 6716 of FIG. 67A). As shown in FIGS. 70 and 71, the enterprise affiliate may indicate to the tool 200 to create a container by selecting the "Create new folder" button 7006.

If the tool 200 receives an indication to create a new container, then the tool 200 receives a new container name and path (step 6718). In the implementation shown in FIG. 71, to indicate the path for a new container the enterprise affiliate selects a container (e.g., root container 7004) identified in pane 7001 of FIG. 71 and enters via dialog box 7102 the identification or name 7104 of the new container. Alternatively, the enterprise affiliate may enter via dialog box 7102 the full path and name of the new container.

Figure 72:
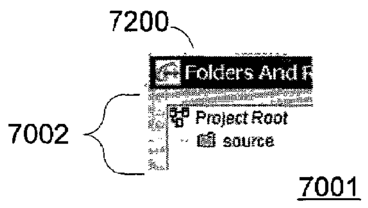
FIG. 72 depicts an exemplary user interface of the tool of FIG. 2 used to display the storage hierarchy definition associated with the workflow of FIG. 68 after adding a new container identification.

Next, the tool 200 modifies the storage hierarchy definition to reflect the new container path and name (step 6720). The tool 200 then displays a representation of the modified storage hierarchy definition (step 6722). As shown in FIG. 72, the tool 200 will subordinate the newly identified container to the selected container (e.g., root container 7004, in this example) in the storage hierarchy definition associated with the workflow and display the resulting hierarchical relationship of container identifications 7002 under the selected container. In one implementation, the container identifications 7002 are stored by the tool 200 as part of a file (as shown in FIG. 75) for the storage hierarchy definition associated with the workflow 6800 without generating a corresponding container on a network storage medium (e.g., WebDAV storage 142 of FIG. 2). In another implementation, the container identifications 7002 may represent corresponding containers generated by the tool 200 on the network storage medium to serve as a template of the storage hierarchy definition associated with the workflow 6800.

If the tool 200 does not receive an indication to create a new container, or after displaying a representation of the modified storage hierarchy definition following the addition of a new container, the tool 200 then determines whether to remove a container from the storage hierarchy associated with the workflow 6800 (step 6724). As shown in FIGS. 70 and 71, the enterprise affiliate may indicate to the tool 200 to remove a container by selecting the "Remove folder" button 7016. If the tool 200 receives an indication to remove a container, the tool 200 then receives an indication of an existing container to remove (step 6726). In the example shown in FIG. 70, the enterprise affiliate may indicate the existing container to remove by selecting one of the container identifications 7002 displayed in pane 7001. The tool 200 then modifies the storage hierarchy definition to reflect the removal of the existing container (step 6728). To reflect the removal of the existing container selected by the enterprise affiliate, the tool 200 removes the selected container and any of the container identifications 7002 that are subordinate to the selected container. The tool 200 then displays a representation (not shown in figures) of the modified storage hierarchy definition (step 6730).

Referring to FIG. 67B, the tool 200 next receives an indication of a selected container (step 6732). The tool 200 also performs this step if at step 6724 it does not receive an indication to remove a container. The enterprise affiliate may use any known data input technique, such as a mouse click, to indicate the selected container from among the container identifications 7002. The tool 200 then displays roles associated with the selected container (step 6734). In the example shown in FIG. 70, the enterprise affiliate selects the container identification 7008 ("documentation") and the tool 200 subsequently displays the roles 7010 in pane 7017 that have been previously associated with the container identification 7008. In the example shown in FIG. 71 for the initially empty storage hierarchy definition, the enterprise affiliate selects the root container 7004 ("Project Root") and the tool 200 subsequently displays pane 7017 empty to indicate that no roles have been associated with the root container 7004.

Next, the tool 200 receives an indication of a selected role (step 6736 in FIG. 67B). The tool 200 then displays permissions for the selected role (step 6738). As shown in FIG. 70, the enterprise affiliate may use any known data input technique, such as a mouse click, to indicate the selected role 7014 ("author") from among the roles 7010. In this implementation, the tool 200 displays a check next to each of the permissions 7012 that the enterprise affiliate has previously indicated are to be associated with the selected role 7014. Thus, any affiliate or user with the same role ("author") will be allowed to access the contents of the selected container 7008 ("specification") in accordance with the permissions 7012. Hence, the tool 200 allows the enterprise affiliate defining the storage hierarchy definition to carefully control access to the artifacts in each container subsequently generated by the tool in accordance with the storage hierarchy definition.

The next step performed by the tool 200 is to determine whether to add or delete a permission for the selected role (step 6740). In the implementation shown in FIG. 70, the tool 200 determines that a permission is to be added when the enterprise affiliate adds a check to the unchecked box next to the permission 7012 and that a permission is to be deleted when the enterprise affiliate removes a check from the box next to the permission 7012. The enterprise affiliate, however, may use any known data input technique to indicate that a permission is to be added or deleted for the selected role 7014. If a permission is to be added or deleted, the tool 200 modifies the storage hierarchy definition to reflect the added or deleted permission (step 6742). The tool 200 then continues processing at step 6738 to again display the permissions 7012 for the selected role 7014 to reflect the added or deleted permission.

Figure 73:
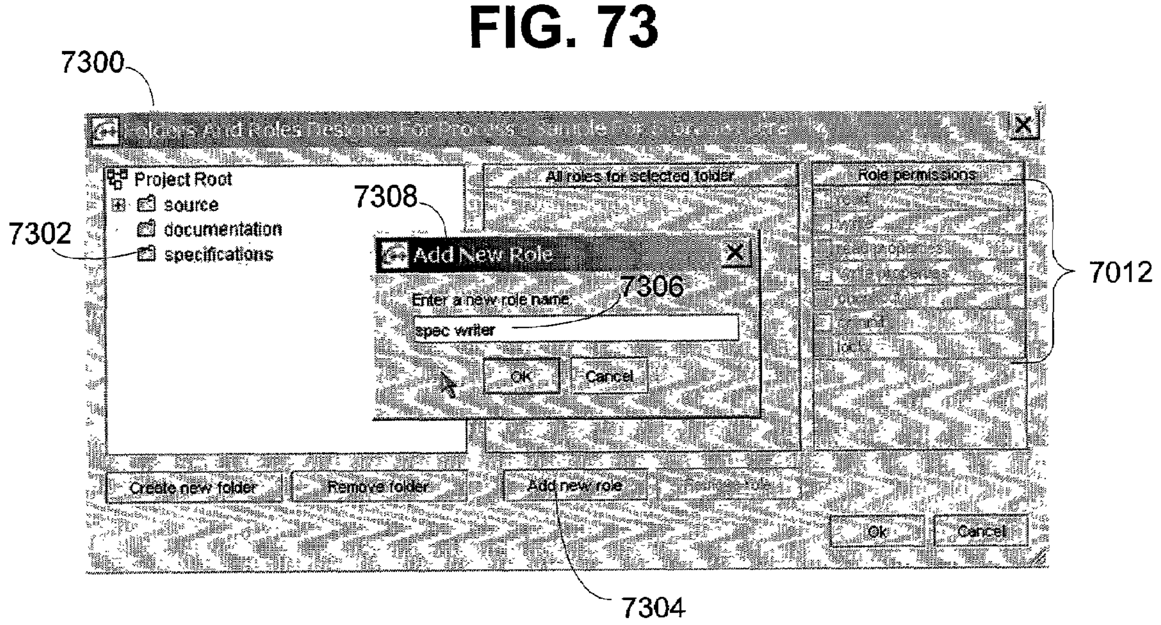
FIG. 73 depicts an exemplary user interface of the tool of FIG. 2 used to receive a new role to associate with a selected container identification of the storage hierarchy definition of the workflow.

If a permission is not to be added or deleted, the tool 200 next determines whether to add a new role to the selected container (step 6744). FIG. 73 depicts an exemplary user interface 7300 used to display the storage hierarchy definition associated with workflow 6800 after the tool 200 has added container identification 7302 ("specifications") as specified by the enterprise affiliate. In this example, container identification 7302 represents the selected container. The enterprise affiliate may then indicate to the tool 200 to add or associate a role to the container identification 7302 ("specifications") by selecting the "Add new role" button 7304 in FIG. 73.

Figure 74:
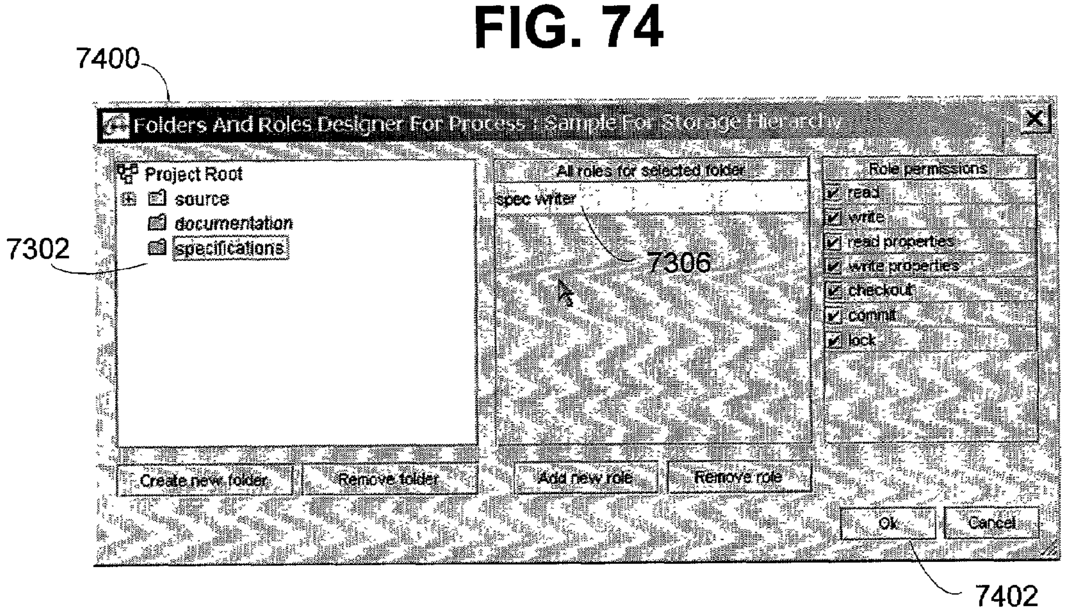
FIG. 74 depicts an exemplary user interface of the tool of FIG. 2 used to display the storage hierarchy definition associated with the workflow of FIG. 68 after adding a new role in association with a selected container identification.

If the tool 200 determines that a new role is to be added to the selected container, the tool 200 receives the new role (step 6746). In the implementation shown in FIG. 73, the tool 200 receives the new role 7306 ("spec writer") from the enterprise affiliate via dialog box 7308. The enterprise affiliate, however, may identify the new role 7306 to the tool 200 using any known data input technique, such as pull down menu selection of roles. Next, the tool 200 modifies the storage hierarchy definition to reflect the new role associated with the selected container (step 6748). The tool 200 then displays the roles associated with the selected container to reflect the addition of the new role (step 6750). In the example shown in FIG. 74, the tool 200 displays the new role 7306 ("spec writer") in association with the container identification 7302 ("specifications"), which represents the selected container in this example.

After displaying the roles for the selected container to reflect the addition of the new role or if the tool 200 determines that a new role will not be added, then the tool 200 next determines whether to remove a role from the selected container (step 6752). If a role is to be removed from the selected container, the tool 200 modifies the storage hierarchy definition to reflect the removal of the selected role (step 6754). The tool 200 then displays the roles associated with the selected container to reflect the removal of the selected role (step 6756).

The next step performed by the tool 200 is to determine whether the definition of the storage hierarchy is completed (step 6758). The enterprise affiliate may use any known data input technique, such as an "Ok" button 7402 on user interface 7400, to provide an indication to the tool 200 that the definition of the storage hierarchy associated with the workflow 6800 is completed. If the definition of the storage hierarchy is not completed, the tool 200 continues processing at step 6716 to again determine if a new container is to be created in the storage hierarchy associated with the workflow.

If the definition of the storage hierarchy is completed, the tool 200 stores the storage hierarchy definition in association with the workflow (step 6760) before the process ends. FIG. 75 depicts an exemplary file 7500 produced by the tool 200 to store the storage hierarchy definition shown in FIG. 70 associated with the workflow 6800. To reflect that the storage hierarchy definition file 7500 is associated with the workflow 6800, the tool 200 may store in the storage hierarchy definition file 7500 the name 7502 of the workflow 6800 ("SampleForStorageHierarachy"), which corresponds to the name 6902 in workflow definition file 6900 of FIG. 69. To reflect the hierarchy of the container identifications 7002 in FIG. 70, the tool 200 stores corresponding XML type commands 7504. Each of the commands 7504 contains a "createFolder" identifier 7506 to indicate that the respective command represents the path and name of a container to be generated by the tool 200 for a plan created from the workflow 6800. To reflect the roles associated with each of the container identifications 7002 in FIG. 70 (e.g., roles 7010 associated with container identification 7008 "documentation"), the tool 200 stores corresponding XML type commands 7508 with an "addRole" identifier 7510. The "addRole" identifier 7510 indicates to the tool 200 that a role 7512 with the respective command is to be added to the container 7514 identified within the command when the tool 200 generates the container 7514 for a plan created from the workflow 6800. The tool 200, however, may also store the storage hierarchy definition associated with the workflow 6800 in other structures known in the art, such as in a flat file with known delimiters between container identifications 7002, a database, or as an object serialized to a file on a network storage medium.

Figure 76:
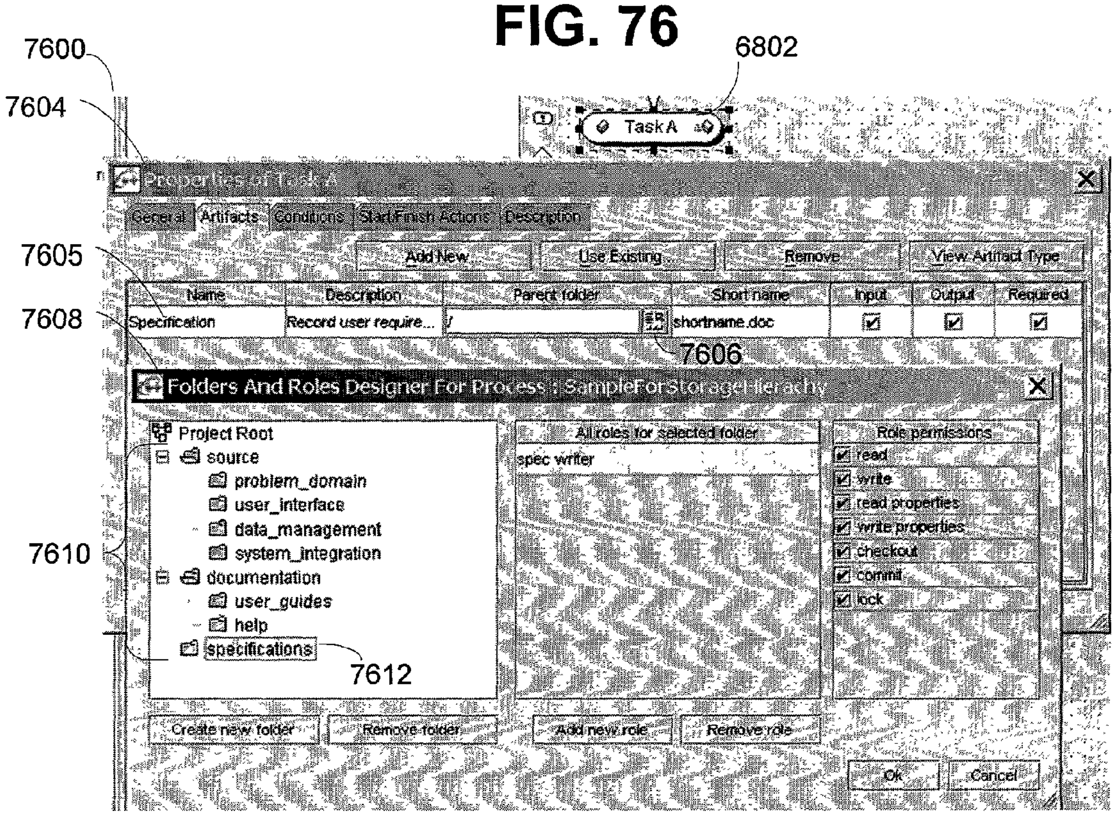
FIG. 76 depicts an exemplary user interface of the tool of FIG. 2 used to identify a link from an input or output artifact of an activity of a workflow to the storage hierarchy associated with the workflow.
Figure 77:
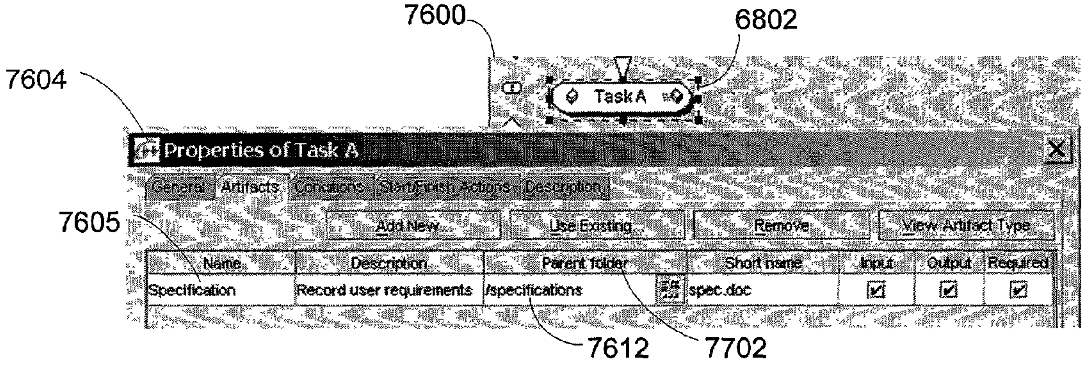
FIG. 77 depicts an exemplary user interface of the tool of FIG. 2 used to display an identified link from an input or output artifact of an activity of a workflow to the storage hierarchy associated with the workflow.

As discussed above, the enterprise affiliate using the tool 200 may define the storage hierarchy associated with the workflow 6800 during or after the creation of the workflow 6800. For example, to define the storage hierarchy after the creation of the workflow or after the storage hierarchy definition file 7500 is completed and stored by the tool 200, the enterprise affiliate may select the activity 6802 "Task A"

on user interface 7600 in FIG. 76 in order to prompt the tool 200 to display user interface 7604 to edit the properties of the activity 6802. In order to identify the location for artifact 7605 "Specification" used by a task created from the activity 6802 by the tool 200, the enterprise affiliate may select the parent folder pop-up browser button 7606 to prompt the tool 200 to display the storage hierarchy definition (e.g., container identifications 7610) associated with workflow 6800 and stored in file 7500 of FIG. 75 by tool 200. The enterprise affiliate may select next one of the container identifications 7610 (e.g., container identification 7612 "specifications") to be the parent folder or container where the artifact 7605 "specification" is to be stored for a plan created from the workflow 6800. As shown in FIG. 77, a copy of the container identification 7612 is stored in association with the activity 6802 as the location property 7702 ("Parent folder") for the artifact 7605 "Specification." When the enterprise affiliate later prompts the tool 200 to create a plan from the workflow, a task created from the activity 6802 by the tool 200 is able to store or use the artifact 7605 "Specification" within the container generated by the tool 200 that corresponds to the container identification 7612.

Figure 78:
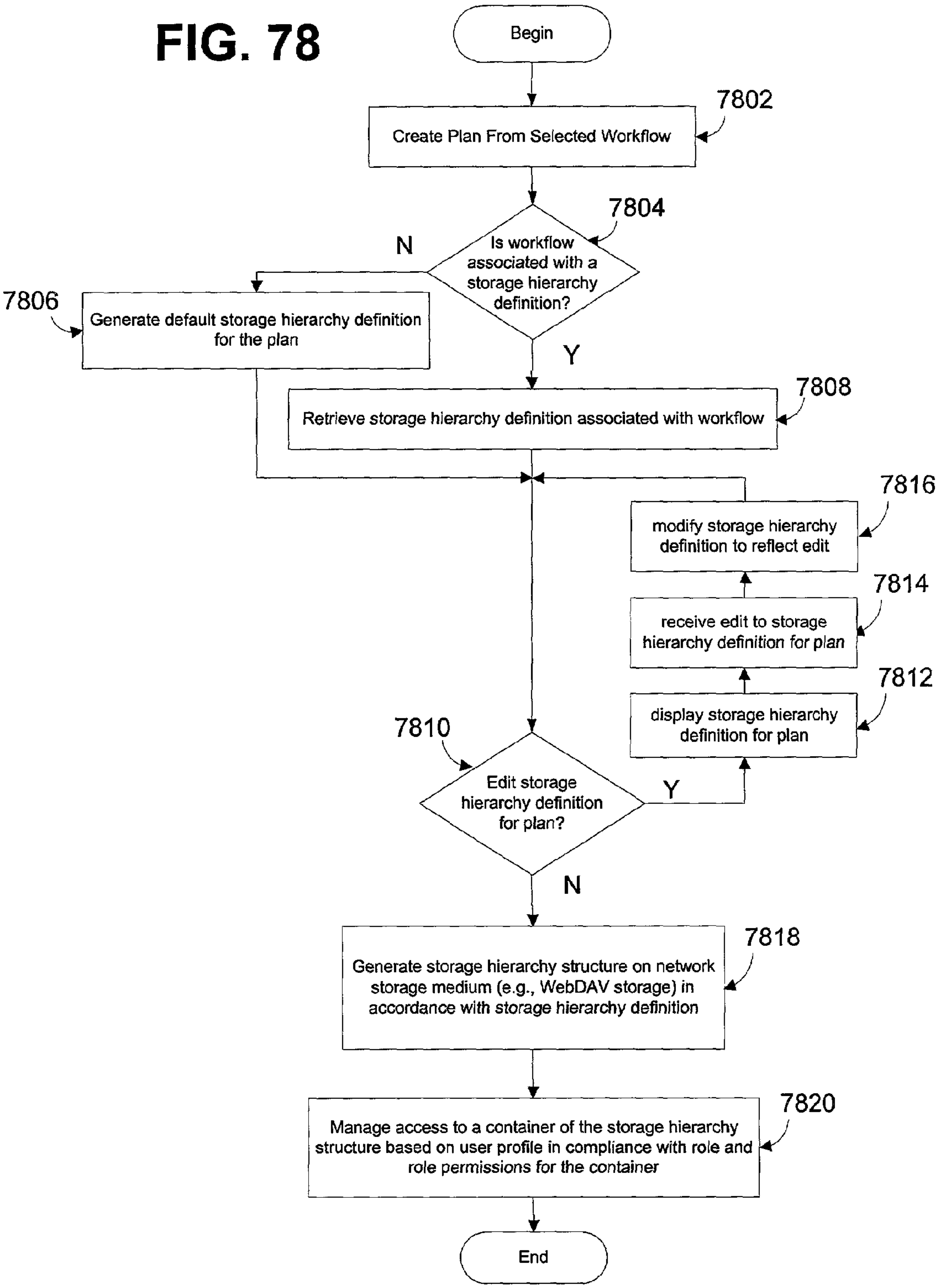
FIG. 78 depicts a flow diagram illustrating an exemplary process performed by the tool of FIG. 2 for generating and managing container(s) for a plan on a network storage medium in accordance with the storage hierarchy definition when the plan is generated from the workflow.

Having generated and stored the storage hierarchy definition in association with the workflow 6800, the tool 200 is able to automatically generate container(s) for each plan created from the workflow 6800 in accordance with the storage hierarchy definition (e.g., file 7500 of FIG. 75). FIG. 78 depicts a flow diagram illustrating an exemplary process performed by the tool 200 for generating and managing container(s) for a plan on a network storage medium in accordance with the storage hierarchy definition when the plan is generated from the workflow. Initially, the tool 200 creates a plan from a selected workflow (step 7802). The processing performed by the tool 200 for creating a plan from a selected workflow was previously described in reference to step 306 in FIG. 3 and further described in greater detail in reference to FIGS. 41A–B. At this point, the enterprise affiliate has already selected the workflow and the plan has or is in the process of being created by the tool 200. Thus, the tool 200 may perform the remaining steps of this process in conjunction with performing the process for creating a plan from the selected workflow. To provide clarity in the discussion to follow, it is assumed that the enterprise affiliate has selected to create a plan from the workflow 6800 depicted in FIG. 68, which has the workflow definition file 6900 shown in FIG. 69. A detailed explanation of the plan created from the workflow 6800 is not necessary for an understanding of the functionality associated with the process depicted in FIG. 78.

The next step performed by the tool 200 is to determine whether the workflow is associated with a storage hierarchy definition (step 7804). In one implementation, the tool 200 searches for a storage hierarchy definition file stored in the same location as the workflow definition file 6900. In another implementation, the tool 200 may search for a storage hierarchy definition file that has the same name 6902, "SampleForStorageHierarchy," as the workflow definition file 6900 in FIG. 69 but that has a unique extension, such as ".sh." In this implementation, the storage hierarchy definition file may be located on any computer 102*a*, 102*n*, 104, or 106 of the data processing system 100. In yet another implementation, the tool 200 may search the workflow definition file 6900 in FIG. 69 for a URL 6906 designating the location of the associated storage hierarchy definition file on the data processing system 100. In still another implementation, the tool 200 may use the URL 6906 as a pointer to a root container of a hierarchy of containers that serve as a template for the storage hierarchy definition associated with the workflow 6800. In this implementation, the tool 200 replicates the hierarchy of containers for each plan created from the workflow 6800. The containers may be physical file folders or virtual file folders stored in a database system, such as WebDAV storage 142 of FIG. 1.

If the workflow is not associated with a storage hierarchy definition, the tool 200 may generate a default storage hierarchy definition for the plan created from the workflow (step 7806). In one implementation, the tool 200 may default to identifying a flat hierarchy where all artifacts used or produced by the plan are stored at the same location on WebDAV storage 142 of FIG. 2, such as the location where the plan is stored. In another implementation, the tool 200 may create a separate container for each artifact that the tool 200 determines is used or produced by the plan. The tool 200 may generate each separate container to be subordinate to the location where the plan is stored by the tool 200 on WebDAV storage 142. The tool 200 may determine that a respective artifact is used or produced by the plan by identifying each activity element (e.g., element 6904 in FIG. 69) in the workflow definition file 6900 that has a required artifact 6908 identified for input or output.

If the workflow is associated with a storage hierarchy, the tool 200 retrieves the storage hierarchy definition associated with the workflow (step 7808). Assuming that an enterprise affiliate has used the tool 200 to associate the storage hierarchy definition stored in the file 7500 with the workflow 6800, the tool 200 is able to retrieve the storage hierarchy definition file 7500 by locating the file 7500 at the same location where the workflow definition file 6900 is stored or by using the URL 6906, which may be present in the workflow definition file 6900.

Figure 79:
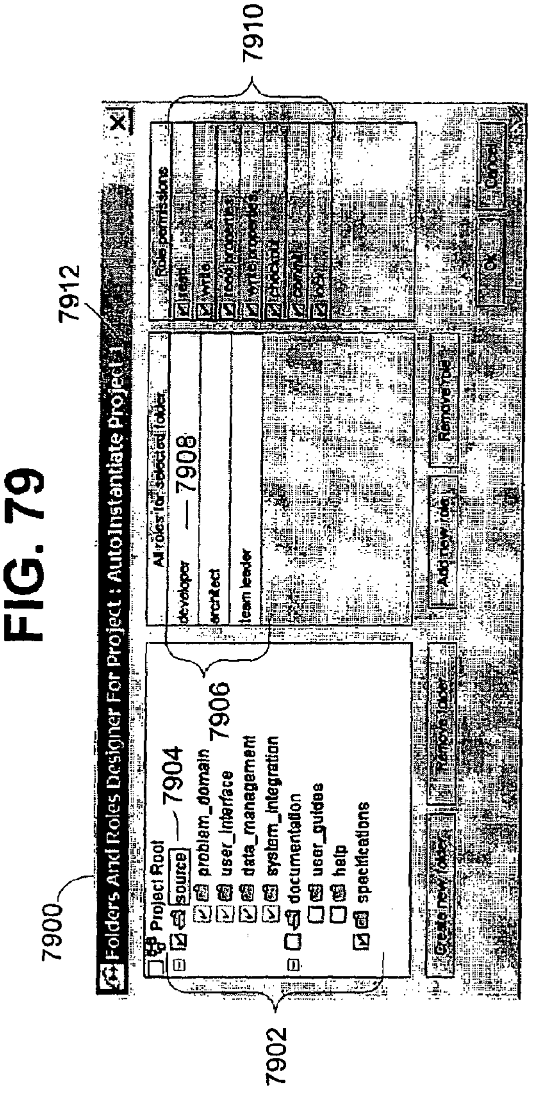
FIG. 79 depicts an exemplary user interface of the tool of FIG. 2 used to display and to edit a storage hierarchy definition associated with a plan created from the workflow of FIG. 68 before the creation of the plan.

Next, the tool 200 determines whether to edit the storage hierarchy definition for the plan (step 7810). The tool 200 also performs this step if a default storage hierarchy definition is generated at step 7806. The enterprise affiliate may use any known data input technique, such as a pull-down menu or keyboard input, to provide an indication to the tool 200 that the storage hierarchy definition 7500 associated with the workflow 6800 is to be edited. If the storage hierarchy definition for the plan is to be edited, the tool 200 next displays the storage hierarchy definition for the plan (step 7812). The tool 200 then receives an edit to the storage hierarchy definition for the plan (step 7814). The tool 200 subsequently modifies the storage hierarchy definition for the plan to reflect the edit (step 7816). FIG. 79 depicts an exemplary user interface 7900 of the tool 200 used to display and to edit the storage hierarchy definition for the plan created from the workflow 6800. As shown in FIG. 79, the container identifications 7902, the roles 7906 associated with a selected container 7904, and the permissions 7910 associated with a selected role 7908 may be edited in a similar manner to that described above for the user interface 7000 of the tool 200, which was used to originally define the storage hierarchy definition in association with the creation of the workflow 6800. The user interface 7900, however, has the additional capability of allowing the enterprise affiliate to identify that the artifacts within a designated container are to be under version control by the tool 200. The enterprise affiliate may indicate to the tool 200 that a container is be under version control by selecting the checkbox next to the respective container identification 7902. Version control indicates to the tool 200 that any change to an artifact in the course of completing the plan results in a new version of the artifact being stored by the tool 200 in the respective container.

Figure 80:
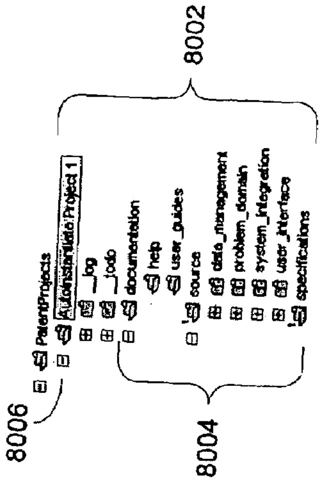
FIG. 80 depicts an exemplary user interface of the tool of FIG. 2 used to display the container(s) generated on WebDAV storage by the tool of FIG. 2 for a plan created from the workflow of FIG. 68.

After modifying the storage hierarchy definition to reflect the edit, the tool 200 continues processing at step 7810 to determine if the storage hierarchy definition for the plan is to be edited again. If the storage hierarchy definition for the plan is not to be edited, the tool 200 then generates a storage hierarchy structure on a network storage medium of the data processing system 100 (e.g., WebDAV storage 142 in FIG. 2) in accordance with the storage hierarchy definition for the plan (step 7818). The storage hierarchy structure includes one or more containers generated by the tool 200 to correspond hierarchically on a one-to-one basis with the container identifications 7902. For example, FIG. 80 depicts the storage hierarchy structure 8002 generated by the tool 200 on WebDAV storage 142 in accordance with the storage hierarchy definition shown in FIG. 79 for the plan identified as "AutoInstantiate Project 1" 7912. As shown in FIG. 80, the storage hierarchy structure 8002 has container(s) 8004 (graphically depicted) that correspond to the container identifications 7902. In this implementation, the tool 200 has generated the container(s) 8004 to be subordinate to a root container 8006 for the plan that has the same name ("AutoInstantiate Project 1") as the plan.

The next step performed by the tool 200 is to manage access to a container of the storage hierarchy structure based on a resource or user profile being in compliance with the role and role permissions for the container to be accessed (step 7820). Once a plan has been created and activated by an enterprise affiliate using the tool 200 in accordance with methods and systems consistent with the present invention, the storage container(s) (e.g., containers 8004) become available to enterprise affiliates that are users or resources (i.e., participants) of the plan. To manage access to a container, the tool 200 checks that at least one of the roles and associated permissions of the user wishing to access the container is the same as one of the roles and associated permissions associated with the container before allowing the user to access any artifact within the container.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method in a data processing system having a workflow that models a process, the method comprising the steps of:

determining whether or not the workflow is associated with an existing storage hierarchy definition;

generating a default hierarchy definition if the workflow is not associated with a storage hierarchy definition;

defining a storage hierarchy in association with the workflow;

adding a pointer to a set of containers organized in a peer-to-peer or subordinate-to-superior relationship;

generating a template for the storage hierarchy definition from the set of containers referenced by the pointer;

automatically accessing the pointer to locate the template for the storage hierarchy definition;

generating a plan from the workflow that reflects an instance of the process;

automatically generating a container by way of the located template in accordance with the storage hierarchy definition when the plan is generated from the workflow;

generating another plan from the workflow that reflects another instance of the process; and generating a different container in accordance with the storage hierarchy definition when another plan is generated from the workflow.

2. The method of claim 1, wherein the container is generated on a network storage medium connected to a virtual file system server.

3. The method of claim 2, wherein the virtual file system server is a WebDAV server.

4. The method of claim 1, wherein the step of defining the storage hierarchy comprises the steps of:

receiving an identification of the container;

receiving a role capable of accessing the container; and storing the role in association with the container identification within the storage hierarchy definition.

5. The method of claim 4, further comprising the step of managing user access to the container based on the role.

6. The method of claim 1, wherein the container is one of a plurality of related containers generated in accordance with the storage hierarchy definition when the plan is generated from the workflow.

7. The method of claim 6, wherein the step of defining the storage hierarchy comprises the steps of:

receiving an identification of the container;

receiving a path reflecting a relationship to another of the plurality of related containers; and storing the container identification in the storage hierarchy definition to reflect the relationship.

8. The method of claim 1, further comprising the steps of:

creating an activity for the workflow; and providing the activity with a link to the storage hierarchy definition, wherein the plan receives the link when a task of the plan is generated from the activity.

9. A method in a data processing system having a workflow, the method comprising the steps of:

determining whether or not the workflow is associated with an existing storage hierarchy definition;

generating a default hierarchy definition if the workflow is not associated with a storage hierarchy definition;

defining a storage hierarchy in association with the workflow wherein the storage hierarchy definition includes a container identification and a role associated with the container identification;

adding a pointer to a set of containers organized in a peer-to-peer or subordinate-to-superior relationship;

generating a template for the storage hierarchy definition from the set of containers referenced by the pointer;

automatically accessing the pointer to locate the template for the storage hierarchy definition;

receiving a user prompt to generate a plan from the workflow;

generating a container by way of the located template, the container having the container identification and the role in accordance with the storage hierarchy definition in response to the user prompt to generate the plan from the workflow;

managing access to the container based on the role;

receiving another user prompt to generate another plan from the workflow; and generating a different container having the container identification and the role in accordance with the storage hierarchy definition in response to the other user prompt to generate the other plan from the workflow.

10. The method of claim 9, wherein the container is generated on a network storage medium connected to a virtual file system server.

11. The method of claim 9, wherein the container is one of a plurality of related containers generated in accordance with the storage hierarchy definition when the plan is generated from the workflow.

12. The method of claim 11, wherein the step of defining the storage hierarchy comprises the steps of:

receiving the identification of the container;

receiving a path reflecting a relationship to another of the plurality of related containers; and storing the container identification in the storage hierarchy definition to reflect the relationship.

13. The method of claim 9, further comprising the steps of:

providing the workflow with a link to the storage hierarchy; and providing the plan with the link when the plan is generated from the workflow.

14. A computer-readable medium containing instructions for controlling a data processing system to perform a method, the data processing system having a workflow that models a process, the method comprising the steps of:

determining whether or not the workflow is associated with an existing storage hierarchy definition;

generating a default hierarchy definition if the workflow is not associated with a storage hierarchy definition;

defining a storage hierarchy in association with the workflow;

adding a pointer to a set of containers organized in a peer-to-peer or subordinate-to-superior relationship;

generating a template for the storage hierarchy definition from the set of containers referenced by the pointer;

automatically accessing the pointer to locate the template for the storage hierarchy definition;

generating a plan from the workflow that reflects an instance of the process;

automatically generating a container by way of the located template in accordance with the storage hierarchy definition when the plan is generated from the workflow;

generating another plan from the workflow that reflects another instance of the process; and generating a different container in accordance with the storage hierarchy definition when another plan is generated from the workflow.

15. The computer-readable medium of claim 14, wherein the container is generated on a network storage medium connected to a virtual file system server.

16. The computer-readable medium of claim 14, wherein the virtual file system server is a WebDAV server.

17. The computer-readable medium of claim 14, wherein the step of defining the storage hierarchy comprises the steps of:

receiving an identification of the container;

receiving a role capable of accessing the container; and storing the role in association with the container identification within the storage hierarchy definition.

18. The computer-readable medium of claim 17, wherein the method further comprises the step of managing user access to the container based on the role.

19. The computer-readable medium of claim 14, wherein the container is one of a plurality of related containers generated in accordance with the storage hierarchy definition when the plan is generated from the workflow.

20. The computer-readable medium of claim 19, wherein the step of defining the storage hierarchy comprises the steps of:

receiving an identification of the container;

receiving a path reflecting a relationship to another of the plurality of related containers; and storing the container identification in the storage hierarchy definition to reflect the relationship.

21. The computer-readable medium of claim 14, wherein the method further comprises the steps of:

creating an activity for the workflow; and providing the activity with a link to the storage hierarchy definition, wherein the plan receives the link when a task of the plan is generated from the activity.

22. A computer-readable medium containing instructions for controlling a data processing system to perform a method, the data processing system having a workflow, the method comprising the steps of:

determining whether or not the workflow is associated with an existing storage hierarchy definition;

generating a default hierarchy definition if the workflow is not associated with a storage hierarchy definition;

defining a storage hierarchy in association with the workflow wherein the storage hierarchy definition includes a container identification and a role associated with the container identification;

adding a pointer to a set of containers organized in a peer-to-peer or subordinate-to-superior relationship;

generating a template for the storage hierarchy definition from the set of containers referenced by the pointer;

automatically accessing the pointer to locate the template for the storage hierarchy definition;

receiving a user prompt to generate a plan from the workflow;

generating a container by way of the located template, the container having the container identification and the role in accordance with the storage hierarchy definition in response to the user prompt to generate the plan from the workflow;

managing access to the container based on the role;

receiving another user prompt to generate another plan from the workflow; and generating a different container having the container identification and the role in accordance with the storage hierarchy definition in response to the other user prompt to generate the other plan from the workflow.

23. The computer-readable medium of claim 22, wherein the container is generated on a network storage medium connected to a virtual file system server.

24. The computer-readable medium of claim 22, wherein the container is one of a plurality of related containers generated in accordance with the storage hierarchy definition when the plan is generated from the workflow.

25. The computer-readable medium of claim 22, wherein the step of defining the storage hierarchy comprises the steps of:

receiving the identification of the container;

receiving a path reflecting a relationship to another of the plurality of related containers; and storing the container identification in the storage hierarchy definition to reflect the relationship.

26. The computer-readable medium of claim 22, wherein the method further comprises the steps of:

providing the workflow with a link to the storage hierarchy; and providing the plan with the link when the plan is generated from the workflow.

27. A data processing system comprising:

a secondary storage device further comprising a workflow;

a memory device further comprising a program that generates a default storage hierarchy definition associated with the workflow if no storage hierarchy definition exists, the storage hierarchy definition having a plurality of related container identifications, adds a pointer to a set of containers organized in a peer-to-peer or subordinate-to-superior relationship, generates a template for the storage hierarchy definition from the set of containers referenced by the pointer, automatically accesses the pointer to locate the template for the storage hierarchy definition, generates a plan from the workflow when prompted by a user, automatically generates a plurality of containers by way of the located template in order to reflect the related container identifications in accordance with the storage hierarchy definition when the plan is generated from the workflow, generates another plan from the workflow, generates a different plurality of containers in accordance with the storage hierarchy definition when another plan is generated from the workflow; and a processor for running the program.

28. The data processing system of claim 27, wherein the plurality of containers are generated on a network storage medium connected to a virtual file system server.

29. The data processing system of claim 27, wherein the virtual file system server is a WebDAV server.

30. The data processing system of claim 27, wherein the storage hierarchy definition includes a role associated with one of the plurality of container identifications and wherein the program further manages user access to the one container based on the role.

31. The data processing system of claim 27, wherein the workflow has an activity with a link to the storage hierarchy definition and wherein the program further provides the link to the plan when a task of the plan is generated from the activity.

32. A system having a workflow that models a process, comprising:

means for determining whether or not the workflow is associated with an existing storage hierarchy definition;

means for generating a default hierarchy definition if the workflow is not associated with a storage hierarchy definition;

means for defining a storage hierarchy in association with the workflow;

means for adding a pointer to a set of containers organized in a peer-to-peer or subordinate-to-superior relationship;

means for generating a template for the storage hierarchy definition from the set of containers referenced by the pointer;

means automatically accessing the pointer to locate the template for the storage hierarchy definition:

means for generating a plan from the workflow that reflects an instance of the process;

means for automatically generating a container by way of the located template, the container being in accordance with the storage hierarchy definition when the plan is generated from the workflow;

means for receiving another user prompt to generate another plan from the workflow; and means for generating a different container having the container identification and the role in accordance with the storage hierarchy definition in response to the other user prompt to generate the other plan from the workflow.

* * * * *